(12) United States Patent
Zane et al.

(10) Patent No.: US 9,712,066 B2
(45) Date of Patent: Jul. 18, 2017

(54) ASSISTED ZERO VOLTAGE SWITCHING FOR A DC-TO-DC CONVERTER

(71) Applicants: The Regents of the University of Colorado, Denver, CO (US); Raytheon Company, Waltham, MA (US); Utah State University, North Logan, UT (US)

(72) Inventors: Regan A Zane, North Logan, UT (US); Daniel Seltzer, Los Angeles, CA (US); Dragan Maksimovic, Boulder, CO (US); Boris Jacobson, Westford, MA (US); Donald Desrosiers, Marlborough, MA (US)

(73) Assignee: UTAH STATE UNIVERSITY, North Logan, UT (US)

( * ) Notice: Subject to any disclaimer, the term of this patent is extended or adjusted under 35 U.S.C. 154(b) by 82 days.

(21) Appl. No.: 14/728,866

(22) Filed: Jun. 2, 2015

(65) Prior Publication Data

US 2015/0349648 A1 Dec. 3, 2015

Related U.S. Application Data

(60) Provisional application No. 62/006,734, filed on Jun. 2, 2014.

(51) Int. Cl.
*H02M 3/335* (2006.01)
*H02M 7/538* (2007.01)
(Continued)

(52) U.S. Cl.
CPC ..... *H02M 3/33507* (2013.01); *H02M 1/4241* (2013.01); *H02M 3/1584* (2013.01);
(Continued)

(58) Field of Classification Search
CPC ......... H02M 3/33569; H02M 3/33584; H02M 3/33592; H02M 2007/4811;
(Continued)

(56) References Cited

U.S. PATENT DOCUMENTS 5,546,294 A * 8/1996 Schutten ................. H02M 1/44
363/132
6,072,362 A * 6/2000 Lincoln ................ H03F 3/2173
330/10
(Continued)

OTHER PUBLICATIONS

F. Krismer et al: "Acutate Samll-Signal Model for the Digital Control of an Automotive Bidirectional Dual Active Bringe", IEE Transaction on Power Electronics, vol. 24 No. 12, Dec. 1, 2009.
(Continued)

*Primary Examiner* — Jeffrey Gblende
*Assistant Examiner* — Ishrat Jamali
(74) *Attorney, Agent, or Firm* — Kunzler Law Group

(57) ABSTRACT

An apparatus includes a first auxiliary switch connected to a positive connection of a switching leg of a DC-to-DC converter. The switching leg includes a first main switch and a second main switch connected at a main switch midpoint. A second auxiliary switch is connected between a negative connection of the switching leg and the first auxiliary switch. A connection point between the first and second auxiliary switches is an auxiliary midpoint. An auxiliary inductor connects the auxiliary midpoint and the main switch midpoint. The main switch midpoint is also connected to other converter elements. The first and second main switches include a first capacitance a second capacitance. A switch regulation module regulates the first and second auxiliary switches to control current in the auxiliary inductor to provide or remove charge from the first and second capacitances to induce zero voltage switching for the first and second main switches.

18 Claims, 48 Drawing Sheets

(51) Int. Cl.
- *H02M 1/42* (2007.01)
- *H02M 3/158* (2006.01)
- *H02M 7/5387* (2007.01)
- *H02M 7/48* (2007.01)
- *H02M 1/00* (2006.01)

(52) U.S. Cl.
CPC ... *H02M 3/33569* (2013.01); *H02M 3/33584* (2013.01); *H02M 3/33592* (2013.01); *H02M 7/5387* (2013.01); H02M 2001/0003 (2013.01); H02M 2007/4811 (2013.01); H02M 2007/4815 (2013.01); H02M 2007/4822 (2013.01); Y02B 70/1433 (2013.01)

(58) Field of Classification Search
CPC . H02M 2007/4815; H02M 2007/4822; H02M 7/5387
See application file for complete search history.

(56) References Cited

U.S. PATENT DOCUMENTS

| | | | |
|---|---|---|---|
| 6,351,401 | B1 | 2/2002 | Scheel |
| 6,574,125 | B2 | 6/2003 | Matsukawa |
| 7,679,337 | B2 | 3/2010 | Yoshida |
| 8,031,495 | B2 | 10/2011 | Sachdeva |
| 8,492,926 | B2 | 7/2013 | Collins |
| 8,970,161 | B1 * | 3/2015 | Cuadros ............... H02J 7/0068 320/101 |
| 2005/0279298 | A1 | 12/2005 | Degner |
| 2010/0246231 | A1 * | 9/2010 | Sirio ................... H02M 3/1588 363/132 |
| 2011/0181292 | A1 | 7/2011 | Oowada |
| 2012/0014138 | A1 * | 1/2012 | Ngo ................... H02M 3/33584 363/17 |
| 2014/0312789 | A1 | 10/2014 | Feng |
| 2014/0313790 | A1 | 10/2014 | Feng |
| 2015/0194909 | A1 * | 7/2015 | Pahlevaninezhad H02M 7/5387 363/132 |

OTHER PUBLICATIONS

Partial Search Report from Patent Cooperation Treat No. PCT/US2015/033852 filed Jun. 2, 2015, mailed Sep. 23, 2015.

F. Kismer et al, Accurate Small-Signal Model for the Digital Control of an Automotive Didirectional Dual Active Bridge, IEE Transactions on Power Electronics, vol. 24, No. 12, Dec. 1, 2009 (Dec. 1, 2009), pp. 2756-2768, XP055213479, ISSN 0885-8993, D01: 10.1109/TPEL.20092027904 p. 2763; figures 1,2,6.

International Searching Authority, Notification of Transmittal of The International Search Report a, 14 Dnd The Written Opinion of the International Searching Authority, or the Declaration of PCT Application No. PCT/US2015/033852, International Filing Date of Jun. 2, 2015, Mailed Dec. 14, 2015.

U.S. Appl. No. 14/728,837, filed Jun. 2, 2015, Notice of Allowance mailed Oct. 13, 2016.

U.S. Appl. No. 14/728,890, filed Jun. 2, 2015, Notice of Allowance mailed Oct. 27, 2016.

* cited by examiner

```
If(Q = 1):
    If (M ≤ 1):
        φ_AB = φ_PS
        φ_AD = φ_X + 1/2(φ_PS − π)
        φ_DC = π
    Else:
        φ_AB = π
        φ_AD = φ_X − 1/2(φ_PS − π)
        φ_DC = φ_PS Else:
    φ_AB = φ_DC = π
    φ_AD = φ_Y
```

(a)

(b)

| $V_N$ —— | 50 V/div | $i_{aux}$ —·—· | 1 A/div |
| $V_{N'}$ ·········· | 50 V/div | $i_x$ —··— | 1 A/div |

$V_{N'}$ is shifted 40 degrees from $V_N$

| $V_N$ —— | 50 V/div | $i_{aux}$ —·—· | 1 A/div |
| $V_{N'}$ ·········· | 50 V/div | $i_x$ —··— | 1 A/div |

$V_{N'}$ is shifted 39 degrees from $V_N$

ASSISTED ZERO VOLTAGE SWITCHING FOR A DC-TO-DC CONVERTER

CROSS-REFERENCES TO RELATED APPLICATIONS

This application claims the benefit of U.S. Provisional Patent Application No. 62/006,734 entitled "DIRECT CURRENT TO DIRECT CURRENT CONVERTER" and filed on Jun. 2, 2014 for Regan Zane, et al., which is incorporated herein by reference. "Modeling and Control of the Dual Active Bridge Series Resonant Converter," Ph.D. dissertation of Daniel Seltzer, submitted to the Faculty of the Graduate School of the University of Colorado, Department of Computer, and Energy Engineering, Jul. 18, 2014 is hereinafter incorporated by reference.

FIELD

This invention relates to direct current ("DC") to DC converters and more particularly relates to assisted zero voltage switching for DC-to-DC converters.

BACKGROUND

As electrical systems increasingly come to dominate modern life, the power conversion technologies that enable these systems to efficiently connect to one another are becoming increasingly important. With the expanding demand for such technologies in ever diversifying areas, the demands placed on power converters have increased in kind. For many years switching converters have been able to keep up with these increasing requirements by adopting ever more complex power converter topologies and control schemes. One major development in this area is the class of resonant switching converters, such as the series resonant converter. These types of converters have allowed higher efficiency power conversion with faster response times in a variety of applications. Their cost lies in the greater difficulty with which they are modeled (and thus controlled), and is frequently substantial.

SUMMARY

An apparatus for assisted zero voltage switching is disclosed. A system and method also perform the functions of the apparatus. The apparatus includes a first auxiliary switch connected to a positive connection of a switching leg of a direct current ("DC") to DC converter. The switching leg includes a first main switch and a second main switch, where the first and second main switches are connected at a main switch midpoint. The apparatus includes a second auxiliary switch connected between a negative connection of the switching leg and the first auxiliary switch, where a connection point between the first and second auxiliary switches is an auxiliary midpoint. The apparatus includes an auxiliary inductor connected between the auxiliary midpoint and the main switch midpoint. The main switch midpoint is also connected to elements of the converter in addition to the first and second main switches and the auxiliary inductor. The first and second main power switches turn on and off as part of operation of the converter. The first main switch includes a first capacitance and the second main switch includes a second capacitance. The apparatus also includes a switch regulation module that regulates switching of the first and second auxiliary switches to control current in the auxiliary inductor. The auxiliary inductor provides or removes charge from the first capacitance and the second capacitance to adjust voltage across the first main switch and the second main switch to induce zero voltage switching for the first and second main switches.

In one embodiment, the first capacitance may be capacitance of the first main switch and/or a capacitor connected in parallel with the first main switch, and the second capacitance may be capacitance of the second main switch and/or a capacitor connected in parallel with the second main switch. In another embodiment, the apparatus includes a current sensing module that senses current in the auxiliary inductor and in the connection between the elements of the converter and the main switch midpoint. The switch regulation module uses current sensed by the current sensing module and switching states of the first and second main switches to regulate switching in the first and second auxiliary switches to adjust current in the auxiliary inductor to adjust voltage across the first and second main switches to achieve zero voltage switching.

In one embodiment, the switch regulation module controls current in the auxiliary inductor by controlling a phase angle between a voltage transition at the auxiliary midpoint and the main switch midpoint. In another embodiment, the switch regulation module controls the phase angle according to the equation:

$$\Phi_N \geq \frac{4\pi f_s L_{aux}}{t_d}\left(2C_N - \frac{\lambda}{V_A}\int_{t_d} i_x(t)\,dt\right)$$

where
$\Phi_N$ is the phase angle between the voltage transition at the auxiliary midpoint and the main switch midpoint;
$f_s$ is the switching frequency of the converter;
$L_{aux}$ is inductance of the auxiliary inductor;
$t_d$ is a dead time between switching of the first main switch and the second main switch;
$C_N$ is capacitance of one of the first capacitance and the second capacitance;
$V_A$ is voltage of the power source;
$i_x(t)$ is current in the connection between the elements of the converter and the main switch midpoint; and
$\lambda$ is +1 when the first main switch is on and −1 when the second main switch is on.

In one embodiment, the converter is a resonant power converter. In another embodiment, the resonant power converter includes at least one stage of a dual active bridge series resonant converter ("DABSRC"). In another embodiment, the first and second main switches include a first switching leg of a full bridge switching network of the converter, where the converter includes a third main switch connected to the positive connection of a second switching leg and a fourth main switch connected to negative connection of the second switching leg. The first and second switching legs form a full bridge switching network, which includes a third auxiliary switch connected to the positive connection of the second switching leg, a fourth auxiliary switch connected to a negative connection of the second switching leg, and a second auxiliary inductor connected to a second auxiliary midpoint between the third and fourth auxiliary switches and a second main switch midpoint between the third and fourth main switches. The third main switch includes a third capacitance and the fourth main switch includes a fourth capacitance.

In the embodiment, the switch regulation module regulates switching of the third and fourth auxiliary switches to control current in the second auxiliary inductor. The second auxiliary inductor provides or removes charge from the third capacitance and the fourth capacitance to adjust voltage across the third main switch and the fourth main switch to induce zero voltage switching for the third and fourth main switches. In a further embodiment, the converter is a DAB-SRC converter, where the full bridge switching network is a first full bridge switching network on a primary side of the converter and the converter also includes a second full bridge switching network on a secondary side of the converter and each switching leg of the second full bridge switching network includes two auxiliary switches and an auxiliary inductor controlled by a switch regulation module to achieve zero voltage switching of switches in the second full bridge switching network.

In one embodiment, the switch regulation module operates independent of feedback control loops of the converter. In another embodiment, the apparatus includes a ZVS activation module that activates switching of the first and second auxiliary switches and the switch regulation module when the converter is in a hard switching condition. In another embodiment, the converter includes a DABSRC converter with a current feedback loop, where the current feedback loop includes compensation implemented using a gain scheduled feedback controller. The gain scheduled feedback controller includes one or more output control signals that vary over a plurality of control regions, where the gain scheduled feedback controller implements a different compensation equation for each control region.

In a further embodiment, the converter includes one or more phase shift modulators controlled by the one or more output control signals, where the one or more output control signals control according to a minimum current trajectory ("MCT") control technique. The MCT substantially minimizes circulating current within the converter. In another further embodiment, the gain scheduled feedback controller maintains at least a portion of the main switches of the converter in a ZVS region while minimizing circulating current by following a trajectory a fixed distance from an MCT for a portion of operating regions of the converter and the switching regulation module controls auxiliary switches connected to at least a portion of the main switches of the converter to maintain zero voltage switching when the main switches connected to the auxiliary switches operate in a hard switching operating region.

A system for assisted ZVS includes a DC-to-DC converter with one or more switching legs. Each switching leg includes two main switches connected at a main switch midpoint where a first main switch of the switching leg is connected between a positive connection of the switching leg and the main switch midpoint and a second main switch of the switching leg is connected between the main switch midpoint and a negative connection of the switching leg. Each switching leg includes a portion of a half bridge switching network or a full bridge switching network. The system includes an assisted ZVS apparatus connected to one or more switching legs of the converter. Each ZVS apparatus of a switching leg includes a first auxiliary switch connected between an auxiliary midpoint of the switching leg and the positive connection of the switching leg, a second auxiliary switch connected between the auxiliary midpoint and the negative connection of the switching leg, and an auxiliary inductor connected between the auxiliary midpoint and the main switch midpoint of the switching leg. The main switch midpoint connects to elements of the converter in addition to the first and second main switches of the switching leg. The first and second main power switches turn on and off as part of operation of the converter, and the first main switch includes a first capacitance and the second main switch includes a second capacitance. Each switching leg with auxiliary switches and an auxiliary inductor also includes a switch regulation module that regulates switching of the first and second auxiliary switches to control current in the auxiliary inductor, where the auxiliary inductor provides or removes charge from the first capacitance and the second capacitance to adjust voltage across the first main switch of the switching leg and the second main switch of the switching leg to induce zero voltage switching for the first and second main switches. In one embodiment, the system includes an electronic device powered by the converter.

A method for zero voltage switching includes regulating switching of a first auxiliary switch and a second auxiliary switch to control current in an auxiliary inductor. The auxiliary inductor provides or removes charge from a first capacitance of a first main switch of a switching leg and a second capacitance of a second main switch of the switching leg to adjust voltage across the first main switch and the second main switch to induce zero voltage switching for the first and second main switches. The switching leg includes a portion of a DC-to-DC converter. The first and second main power switches turn on and off as part of operation of the converter. The first auxiliary switch is connected to a positive connection of the switching leg and to an auxiliary midpoint, the second auxiliary switch is connected between the auxiliary midpoint and a negative connection of the switching leg, and the auxiliary inductor is connected between the auxiliary midpoint and a main switch midpoint, the main switch midpoint is a connection between the first main switch and the second main switch, and the main switch midpoint connected to elements of the converter in addition to the first and second main switches and the auxiliary inductor.

In one embodiment, the method includes sensing current in the auxiliary inductor and in the connection between the elements of the converter and the main switch midpoint and regulating switching of the first and second auxiliary switches includes using the current sensed in the auxiliary inductor and in the connection between the elements of the converter and the main switch midpoint and using switching states of the first and second main switches to regulate switching in the first and second auxiliary switches to adjust current in the auxiliary inductor to adjust voltage across the first and second main switches to achieve zero voltage switching. In another embodiment, regulating switching of the first and second auxiliary switches includes controlling current in the auxiliary inductor by controlling a phase angle between a voltage transition at the auxiliary midpoint and the main switch midpoint. In another embodiment the switching leg is a first switching leg of the converter and the converter includes additional switching legs and the method includes regulating switching of first and second auxiliary switches to control current in an auxiliary inductor associated with each additional switching leg to achieve zero voltage switching in the main switches of each additional switching leg.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 24 depicts phase shift modulated half-bridge ("PSM-HB") waveforms, showing ZVS assistance current flowing in the correct direction for ZVS at both $Q_1$ and $Q_2$ turn on;

with $\Phi_{DC}=180°$, and $\Phi_{AD}=90°$.

with $\Phi_{AB}=180°$, and $\Phi_{DC}=180°$.

with $\Phi_{AB}=180°$, $\Phi_{AD}=90°$;
FIG. 57 reports the experimental tank current and voltages $v_{AB}(t)$ and $v_{DC}(t)$ for a 1.1 kW forward power operating point, at which the measured efficiency was 96%.

DETAILED DESCRIPTION

Figure 1:
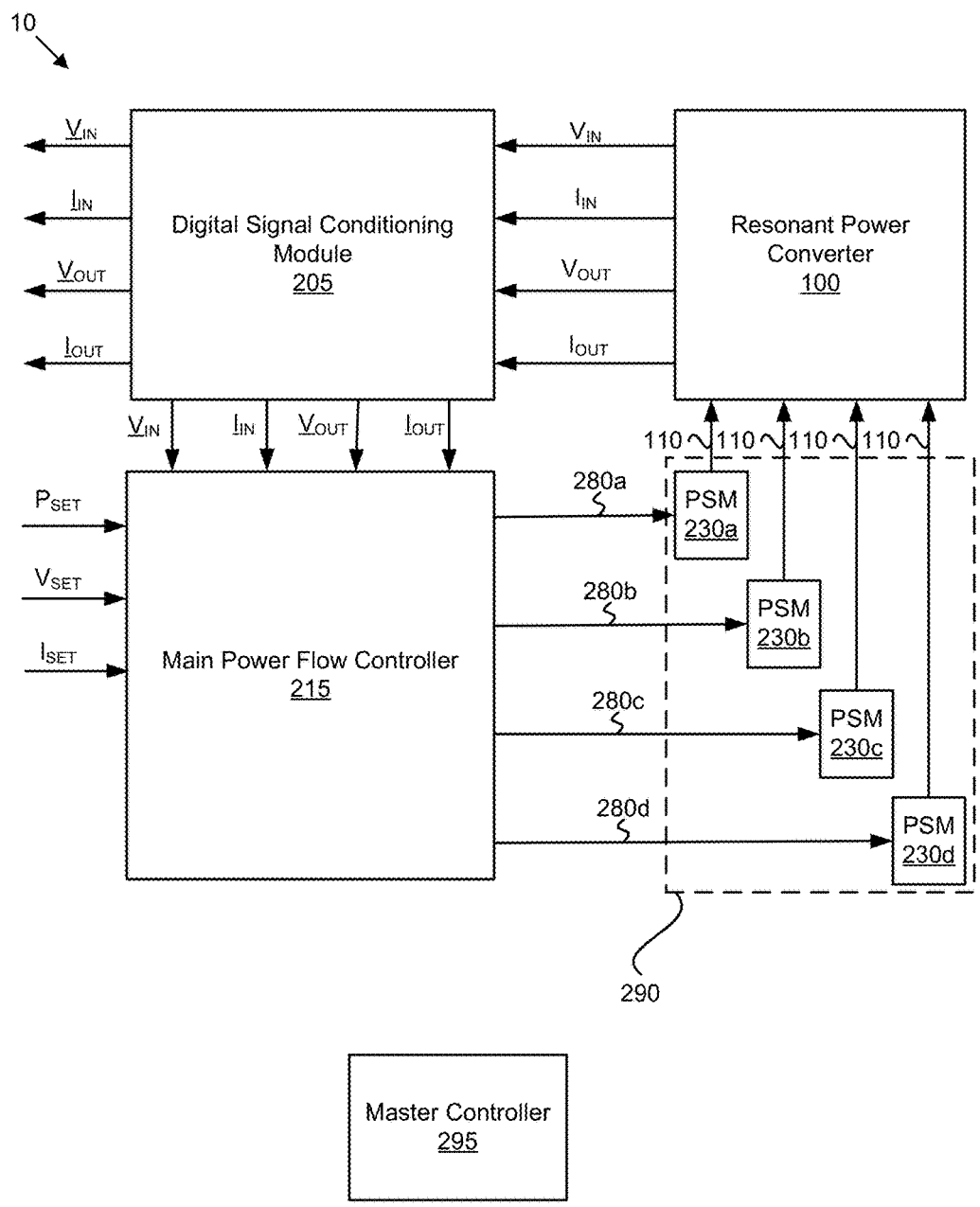
FIG. 1 is a schematic block diagram illustrating one embodiment of a DC to DC converter.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a computer, partly on the computer, as a stand-alone software package, partly on the computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be implemented in hardware, may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

I. Definitions and Notation

Full signal quantities are defined as the sum of both large signal (generally constant) portions of a signal as well as the time varying small signal portion. Lower case letters with capital subscripts are used to represent these full signal quantities, $$i_T = I_T + \tilde{i}_t, \quad (1)$$

where the large signal component is represented using a capital letter and a capital subscript. The small signal portion of a signal is represented using both lowercase letters and subscripts with the addition of a tilde. Time domain signals use parenthesis, as in $v_{IN}(t)$ for the time varying signal '$v_{IN}$', while frequency domain signals are represented by their Fourier series coefficients using square brackets and an over-hat. Using this notation the signal $v_{IN}(t)$ would be represented by its Fourier series coefficients as $\hat{v}_{IN}[n]$ in the frequency domain. Phasor signals are represented with an over-bar, such that phasor $\bar{s}_x$ satisfies $$s_x(t,\omega_s) = Re[\bar{s}_x e^{+j\omega_s t}]. \quad (2)$$

The frequency that a phasor exists in is determined either by the context of the specific derivation or by an explicit statement. Phasors at zero frequency are assumed to exist and are equivalent to constant quantities such that the DC voltage $v_{IN} = \bar{v}_{IN}$.

Complex quantifies use the variable 'j' to represent the complex variable. Double bars are used to represent the magnitude of complex quantities, with an angle symbol representing phase. Additionally the use of a super script represents the complex conjugate of a number, while a "*" used between elements designates convolution. Super scripts are used to designate the parameter with which a quantity has been derived in respect to. Finally, angled brackets are used for normalized values with a possible subscript to designate the normalizing quantity. Digitized signals may be represented as underlined symbols, e.g. the digitized output voltage $V_{OUT}$ is $\underline{V}_{OUT}$, which may be used interchangeably with $\bar{V}_{OUT}$.

II. Converter Topologies and the DABSRC

Due to the many demonstrated advantages of a dual active bridge series resonant converter ("DABSRC"), a DABSRC topology is selected for this work. This typically topology provides high efficiency and good power density for the 1 kW, 500 V target operating range. Additionally, the DABSRC is a well-known converter which provides input/output isolation and bidirectional power flow. Other topologies may also be used with regard the embodiments of the proposed invention described herein.

II.1 Overall System

FIG. 1 is a schematic block diagram illustrating one embodiment of a direct current ("DC") to DC converter 10. The DC to DC converter 10 includes a resonant power converter 100, a digital signal conditioning module 205, a main power flow controller 215, and a modulator 290. In addition, the DC to DC converter 10 may include a master controller 295. In one embodiment, the converter 10 may power an electronic device, such as a laptop computer, a music player, a tablet and the like. The converter may also provide power from a source to a battery where the battery then provides power to a load through the converter 10 where the source is disconnected and the load is connected. For example, the converter 10 may provide power to charge a battery of an electric vehicle and then may provide power in a reverse direction through the converter 10 to the electric vehicle.

In one embodiment, the resonant power converter 100 is a DABSRC, as will be shown hereafter. Alternatively, the resonant power converter 100 may be a half bridge resonant converter as will be shown hereafter. In other embodiments, the resonant power converter 100 may include other resonant converter topologies. The resonant power converter 100 receives gate drive signals 110 from the modulator 290 and in response to the gate drive signals 110 converts an input DC voltage to an output DC voltage as will be described hereafter. The resonant power converter 100 may have a sensed output voltage $V_{OUT}$, a sensed input voltage $V_{IN}$, a sensed output current $I_{OUT}$, and a sensed input current $I_{IN}$. One or more sensors may measure the sensed output voltage $V_{OUT}$, the sensed input voltage $V_{IN}$, the sensed output current $I_{OUT}$, and the sensed input current $T_{IN}$. The sensed output voltage $V_{OUT}$, the sensed input voltage $V_{IN}$, the sensed output current $I_{OUT}$, and the sensed input current $I_{IN}$ may be digital or analog signals.

In one embodiment, the digital signal conditioning module 205 receives the sensed output voltage $V_{OUT}$, sensed input voltage $V_{IN}$, sensed output current $I_{OUT}$, and sensed input current $I_{IN}$ and generates digital representations converter output voltage $\underline{V}_{OUT}$, an converter input voltage $\underline{V}_{IN}$, an converter output current $\underline{I}_{OUT}$, and an converter input current $\underline{I}_{IN}$ as will be described hereafter. In one embodiment, the converter output voltage $\underline{V}_{OUT}$, the converter input voltage $\underline{V}_{IN}$, the converter output current $\underline{I}_{OUT}$, and the converter input current $\underline{I}_{IN}$ are equivalent to the sensed output voltage $V_{OUT}$, the sensed input voltage $V_{IN}$, the sensed output current $I_{OUT}$, and the sensed input current $T_{IN}$ respectively. The converter output voltage $\underline{V}_{OUT}$, the converter input voltage $\underline{V}_{IN}$, the converter output current $\underline{I}_{OUT}$, and the converter input current $\underline{I}_{IN}$ may be digital signals.

The main power flow controller 215 may receive the converter output voltage $\underline{V}_{OUT}$, the converter input voltage $\underline{V}_{IN}$, the converter output current $\underline{I}_{OUT}$, and the converter input current $\underline{I}_{IN}$. In addition, the main power flow controller 215 may receive reference signals such as a power reference $P_{SET}$, a voltage reference $V_{SET}$, and a current reference $I_{SET}$.

The master controller 295 may generate the power reference $P_{SET}$, voltage reference $V_{SET}$, and current reference $I_{SET}$.

The main power flow controller 215 may generate control signals 280 that drive a plurality of phase shift modulators 230 of the modulator 290 to generate the gate drive signals 110 that operate the resonant power converter 100. The main power flow controller 215 may operate the resonant power converter 100 with a resonant tank current equal to a dynamic target resonant current. The dynamic target resonant current may be selected to minimize the resonant tank current. In one embodiment, the dynamic target resonant current is selected to minimize the resonant tank current while achieving a desired resonant converter output power. In a certain embodiment, the dynamic target resonant current is selected to satisfy (3):

$$\min_{v_\varphi \in C_s} |I_{RMS}(v_\varphi)| : \begin{cases} P_o(v_\varphi) = \overline{P}_o \\ -P_{o,max} \leq \overline{P}_o \leq +P_{o,max} \end{cases} \quad (3)$$

In one embodiment, each phase shift modulator 230 of the modulator 290 generates 50% duty cycle square wave pulses that control the semiconductor switches 105. The functions of the elements of the DC to DC converter 10 are described hereafter.

II.2 DABSRC Description

Figure 2A:
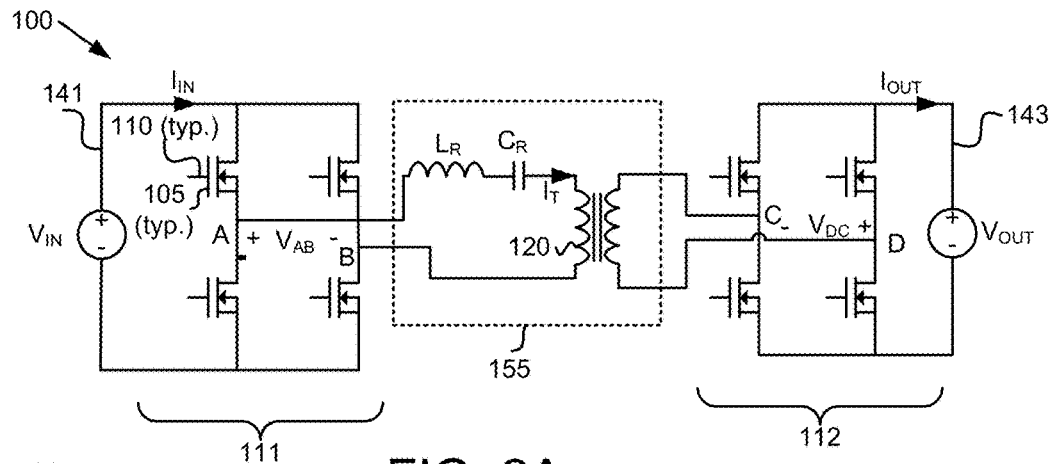
FIG. 2A is a schematic diagram illustrating one embodiment of a resonant power converter.

FIG. 2A is a schematic diagram illustrating one embodiment of the resonant power converter 100. In the depicted embodiment, the resonant power converter 100 is a DABSRC. A voltage applied to an input 141 may be converted to a desired voltage at an output 143. The sensed input voltage $V_{IN}$ and the sensed input current $I_{IN}$ may be measured by one or more sensors at the input 141. In addition, the sensed output voltage $V_{OUT}$ and the sensed output current $I_{OUT}$ may be measured by one or more sensors at the output 143.

The resonant power converter 100 includes a plurality of semiconductor switches 105 and a resonant tank 155. Each semiconductor switch 105 is activated and deactivated in response to a gate drive signal 110.

In the depicted embodiment, the resonant tank 155 includes an inductor $L_R$, a capacitor $C_R$, and a transformer 120. The gate drive signals 110 activate and deactivate first switches 111 to generate an alternating voltage and a resonant tank current 257 across the resonant tank 155. The gate drive signals 110 further activate and deactivate second switches 112 to rectify the alternating voltage and generate a desired DC voltage at the output 143.

Figure 2B:
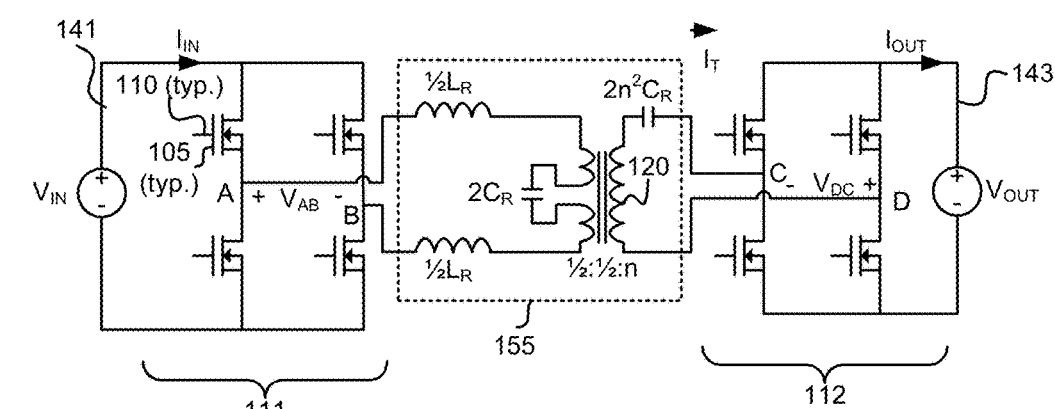
FIG. 2B is a schematic diagram illustrating another embodiment of a resonant power converter.

FIG. 2B is a schematic diagram illustrating one alternate embodiment of a resonant power converter 101. In the depicted embodiment, the resonant power converter 101 is a variation of the resonant converter depicted in FIG. 2A. The inductor $L_R$ is split between the positive and negative legs of the resonant tank 155 and the capacitor $C_R$ is also split. The values of the inductors and capacitors are chosen to be equivalent to the values of the inductor and capacitor in the resonant converter 100 of FIG. 2A.

Figure 2C:
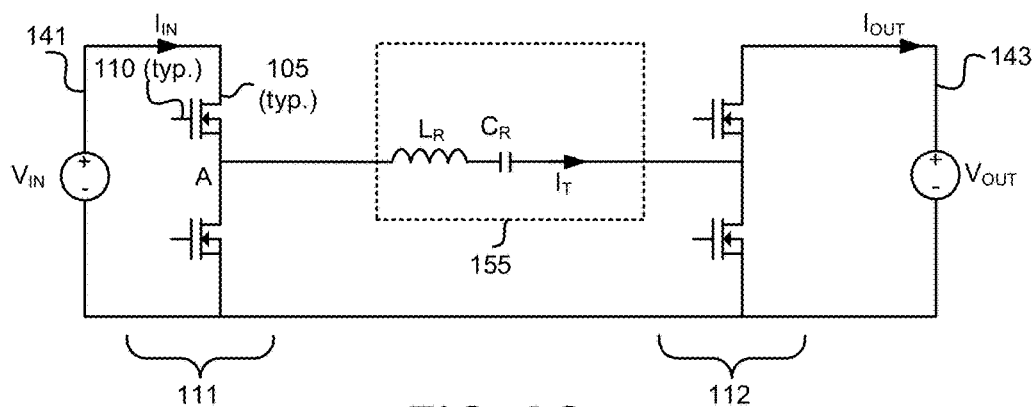
FIG. 2C is a schematic diagram illustrating one alternate embodiment of a resonant power converter.

FIG. 2C is a schematic diagram illustrating another alternate embodiment of a resonant power converter 102. In the depicted embodiment, the resonant converter 102 is a half bridge resonant converter. As in FIG. 2A, for the resonant converters 101, 102 of FIGS. 2B and 2C, a voltage applied to an input 141 may be converted to a desired voltage at an output 143. The sensed input voltage $V_{IN}$ and the sensed input current $I_{IN}$ may be measured by sensors at the input 141. In addition, the sensed output voltage $V_{OUT}$ and the sensed output current $I_{OUT}$ may be measured by sensors at the output 143. The resonant power converter 100 includes a plurality of semiconductor switches 105 and a resonant tank 155. Each semiconductor switch 105 is activated and deactivated in response to gate drive signal 110.

In the depicted embodiments, the resonant tank 155 includes an inductor $L_R$ and a capacitor $C_R$. The gate drive signals 110 activate and deactivate first switches 111 to generate an alternating voltage and a resonant tank current 257 across the resonant tank 155. The gate drive signals 110 further activate and deactivate second switches 112 to rectify the alternating voltage and generate a desired DC voltage at the output 143.

In order to achieve a high bandwidth output current control, a new model for the DABSRC is derived based on the phasor analysis and equivalent transformer work previously developed. This new model is used to derive control to output transfer functions for the DABSRC, and exposes the high degree of variability in control to output gain based on converter operating point experienced in the topology. Because the converter being designed must operate over a wide range of both power levels and conversion rations, a gain scheduled approach may be used for feedback regulation of output current.

A fixed frequency phase shift modulated switching method is selected for the DABSRC. By adopting the MCT approach, RMS tank currents $I_T$ are kept to a minimum, thus increasing overall converter efficiency. Although a number of other switching methods are possible, the MCT approach lends itself well to variable conversion ratio application.

In order to achieve soft switching of the DABSRC over the wide range of operating conditions required by this application, a PSM auxiliary leg approach is taken. This method is used without the DC blocking capacitors typically employed, based on work showing that in certain cases inductively linked half bridges do not require the DC blocking capacitors.

Figure 3:
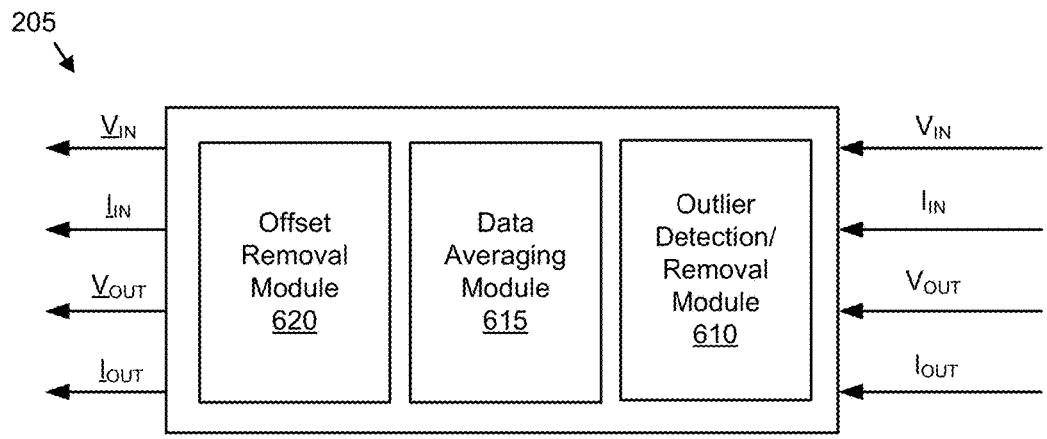
FIG. 3 is a schematic block diagram illustrating one embodiment of a digital signal conditioning module.

FIG. 3 is a schematic block diagram illustrating one embodiment of the digital signal conditioning module 205. The digital signal conditioning module 205 receives the sensed output voltage $V_{OUT}$, sensed input voltage $V_{IN}$, sensed output current $I_{OUT}$, and sensed input current $I_{IN}$ and generates the converter output voltage $\underline{V}_{OUT}$, converter input voltage $\underline{V}_{IN}$, converter output current $T_{OUT}$, and converter input current $\underline{I}_{IN}$. The digital signal conditioning module 205 includes an outlier detection/removal module 610, a data averaging module 615, and an offset removal module 620.

The outlier detection/removal module 610 may filter out spurious signals, noise, and other outlier values from the sensed output voltage $V_{OUT}$, sensed input voltage $V_{IN}$, sensed output current $I_{OUT}$, and sensed input current $I_{IN}$. The data averaging module 615 may calculate a moving average for each of the sensed output voltage $V_{OUT}$, sensed input voltage $V_{IN}$, sensed output current $I_{OUT}$, and sensed input current $T_{IN}$. The offset removal module 620 may remove value offsets and/or signal bias from each of the sensed output voltage $V_{OUT}$, sensed input voltage $V_{IN}$, sensed output current $I_{OUT}$, and sensed input current $I_{IN}$ to generate the converter output voltage $\underline{V}_{OUT}$, converter input voltage $\underline{V}_{IN}$, converter output current $\underline{I}_{OUT}$, and converter input current $\underline{I}_{IN}$.

III Modeling the DABSRC

In order to achieve a high bandwidth output current regulation, a new model for the DABSRC is developed. The model sought relates each of the three possible control angles for the DABSRC independently to both the input and output currents of the converter. The derivation begins with an analysis of the active bridge switch network. This analysis leads to the equivalent transformer as a way to linearize the effects of the switch network. This linearization enables the use of common circuit analysis techniques in order to derive the desired control to output relations for the DAB-SRC.

III.1 the Equivalent Transformer in Steady State

The equivalent transformer allows active switch networks in power converters to be replaced with a "transformer" model with a time varying conversion ratio. When the equivalent transformer is constrained to a single frequency it is the same as the phasor transformer, and performs the function of converting DC waveforms into phasor waveforms. This process is equivalent to using fundamental analysis to solve a circuit although graphically it tends to be more intuitive. The derivation of the full equivalent transformer model begins with harmonic analysis of a general half bridge switch network. This analysis leads to the full equivalent transformer model, which is then simplified to the phasor transformer.

Figure 4:
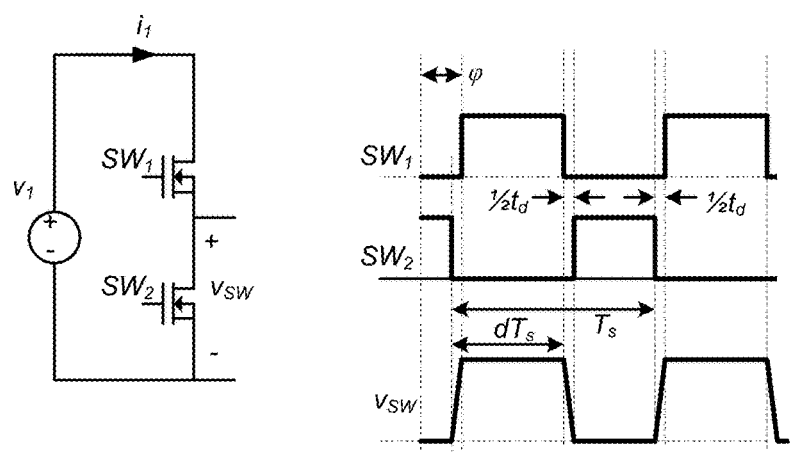
FIG. 4 is a schematic block diagram of a switching leg and associated timing diagram.

FIG. 4 is a schematic block diagram of a switching leg and associated timing diagram. The switch node voltage of a pair of switches setup as in FIG. 4 can be defined as a piecewise linear function of the bridge voltage $v_1$, the dead-time $t_d$, the switching period $T_s$, and the duty cycle d. For the remainder of this section, $v_1$ is assumed to be constant, $t_d$ is assumed much smaller than the constant switching period $T_s$, and duty cycle d is assumed to operate at a fixed value of ½. Although the switch node voltage during the dead time is unknown, it can in general be assumed symmetric around ½$v_1$ for rising and falling transitions. Under this assumption, the shape of the voltage during the dead-time does not affect the average value of the switch node voltage over integer multiples of switching period $T_s$. The most noticeable effect of the dead-time in this case is a small phase shift in the switch node output voltage frequency spectrum which ranges from ½$t_d$ lead to ½$t_d$ lag. As most systems operate somewhere in between these limits with small dead-times, this effect will be ignored and harmonic analysis will proceed without the small dead-time phase shift taken into account.

Figure 5:
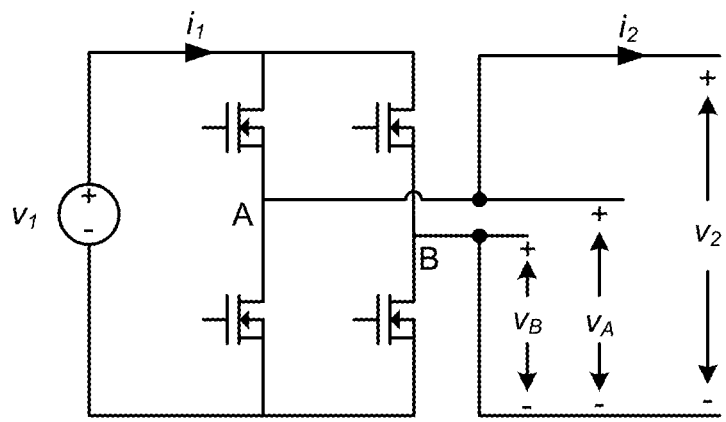
FIG. 5 is a schematic block diagram of a full bridge switching network and timing diagrams.
Figure 5:
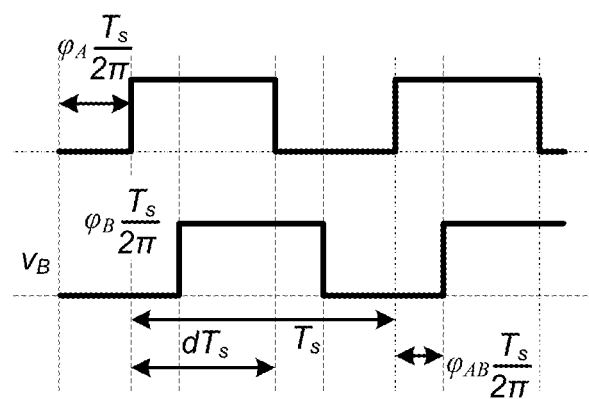

FIG. 5 is a schematic block diagram of a full bridge switching network and timing diagrams. Assuming zero dead-time, the switch node output voltages $v_A$ and $v_B$ of FIG. 5 can be defined in general as the infinite series $$v_{sw}(t, \varphi) = \sum_{n=-\infty}^{+\infty} \hat{v}_{sw}[n, \varphi] e^{j\omega_s nt} \quad (4)$$

$$\hat{v}_{sw}[n, \varphi] = \frac{\omega_s}{2\pi} \int_0^{\frac{2\pi}{\omega_s}} v_{sw}(t, \varphi) e^{-j\omega_s nt} dt, \quad (5)$$

where (5) represents the complex valued Fourier Series coefficients of (4) and angular switching frequency $\omega_s=2\pi/T_s$. Using (5) to represent the switch node voltage of a single half-bridge in the frequency domain the output voltage of a full-bridge switch network can be defined as the difference of two such series, $$\hat{v}_2[n] = \hat{v}_{sw}[n, \varphi_A] - \hat{v}_{sw}[n, \varphi_B] \quad (6)$$

$$= \hat{v}_A[n] - \hat{v}_B[n]$$

$$= \begin{cases} \frac{v_1 e^{-jn\varphi_A}}{jn\pi}(1 - e^{-jn\varphi_{AB}}) & n \neq 0, \text{ even} \\ 0 & \text{else} \end{cases},$$

with phase angles $\varphi_A$ and $\varphi_{AB}$ allowing phase shift modulated control of the full bridge network as seen in FIG. 5. Angle $\varphi_A$ is unconstrained, while angle $\varphi_{AB}$ is constrained to the region between 0 and $\pi$. Angles of $\varphi_{AB}$ between $-\pi$ and 0 are obtained by applying a $\pi$ degree phase shift to (5). With this in mind the original constraint does not reduce the generality of the approach while greatly simplifying the following derivations. By normalizing (6) with respect to the input bridge voltage $v_1$ a voltage independent series is defined $$\hat{s}_N[n] = \begin{cases} \frac{e^{-jn\varphi_A}}{jn\pi}(1 - e^{-jn\varphi_{AB}}) & n \neq 0, \text{ even} \\ 0 & \text{else} \end{cases}. \quad (7)$$

Series (7) relates the input and output voltage of the full bridge switch network in the same way as a transformer turns-ratio relates input and output voltages of an ideal transformer. For this reason it is defined as the "equivalent turns-ratio" of the full bridge switch network. As the reciprocal of (7) is not well defined in this form, the equivalent transformer only allows voltages to be computed from input to output, and current to be computed from output to input when stated in this way.

The output current of the full bridge switch network can be described as its own series $$\hat{i}_2[n] = k_2[n] e^{j\phi_2[n]} \quad (8)$$

where phase shift $\phi_2$ and gain $k_2$ are dependent on the impedance seen by the full bridge output and thus unknown. In a conventional transformer the output current (8) would be multiplied by turns ratio (7) in order to determine the input current. By using a discrete convolution in place of simple multiplication this is still the case in the frequency domain for the equivalent transformer, $$\hat{i}_1[n] = \hat{s}_N[n] * \hat{i}_2[n] \quad (9)$$

$$= \sum_{x=-\infty}^{+\infty} \hat{s}_N[n+x]\hat{i}_2[-x].$$

Applying the definition of convolution seen in (9) to the full bridge voltage relation as well, a symmetrical set of equations can be used to describe a full bridge switch networks voltage and current conversion ratios, $$\hat{i}_1[n] = \hat{s}_N[n] * \hat{i}_2[n], \quad (10)$$

$$\hat{v}_2[n] = \hat{s}_N[n] * \hat{v}_1[n]. \quad (11)$$

Equations (10) and (11) represent the voltage and current conversions performed by a full bridge switch network in a form similar to that of a traditional transformer, and allow such networks to be replaced with equivalent transformer models in the frequency domain.

To ease calculations the infinite series in (10) and (11) are commonly replaced with finite approximations. This can be done by selecting an integer N such that $$f(t) = \sum_{n=-N}^{+N} \hat{f}[n] e^{j\omega_s nt} + \varepsilon, \quad (12)$$

where the truncation error $\varepsilon$ has a computable upper bound and can be made arbitrarily small with larger values of N. As the magnitude of higher harmonics drops off sharply, (12) is an acceptable approximation for even small values of N. These two factors allow truncation error $\varepsilon$ to be ignored for most practical choices of N, resulting in a finite series representation for f(t) in the frequency domain using only a small number of Fourier series coefficients.

To ensure that harmonics above N are not reintroduced to the system through multiplication, a truncated form of discrete convolution is introduced, $$\hat{g}[n] = \hat{f}[n] * \hat{h}[n] \quad (13)$$
$$= \begin{cases} \sum_{x=-N}^{n+N} \hat{f}[x]\hat{h}[n-x] & n \in [-N, 0] \\ \hat{g}[-n]^* & \text{else} \end{cases}.$$

Figure 6:
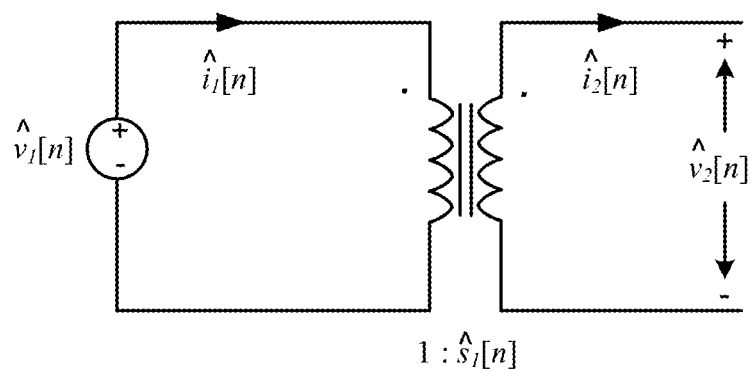
FIG. 6 is a schematic diagram of a full bridge switch network represented as an equivalent transformer.

This truncation is similar to assuming that a system does not exist above frequencies indexed by N, which is a common simplification when modeling converters. By substituting truncated series for all voltages and currents in (10) and (11) and using (13) for convolution, a finite series approximation of the equivalent transformer is defined. FIG. 6 is a schematic diagram of a full bridge switch network represented as an equivalent transformer. The same circuit as seen in FIG. 5 is represented. This equivalent transformer is represented in FIG. 6 as an arbitrarily accurate substitution for the full bridge switch network in FIG. 5.

In many systems approximating complex waveforms with their fundamental harmonic is accurate enough to allow meaningful results without overly complicated computation. This is easily achieved with the equivalent transformer model by setting N=1 in (12) and (13). Selecting this value for N allows many simplifications and results in the "phasor transformer" model of a full bridge switch network. This form of the equivalent transformer has previously been used to analyze time varying circuits and is derived here for use in resonant converters as a subset of the equivalent transformer. Although some of the final equations reached in this section have previously been seen, their relation to the full frequency content of converter signals has been neglected until now.

Because current $i_2$ and turns ratio $s_N$ both have zero average value and represent real-valued waveforms, (10) can be simplified into $$\hat{i}_1[n] = \begin{cases} 2\text{Re}[\hat{s}_N[+1]^* \hat{i}_2[+1]] & n = 0 \\ 0 & \text{else} \end{cases}. \quad (14)$$

Due to the relationship between a real signal's fundamental frequency phasor representation and its Fourier coefficients, $$\bar{g} = 2\hat{g}[+1] \quad (15)$$

where $\bar{g}$ is the phasor representation of g(t) at frequency $\omega_s$ further simplifications are possible, $$i_1 = \frac{1}{2}\text{Re}[(\bar{s}_N)^* \bar{i}_2]. \quad (16)$$

In (16), $\bar{s}_N$ and $\bar{i}_2$ exist as phasors at the fundamental frequency $\omega_s$, while $i_1$ exists as a phasor at zero frequency, written here as a constant time domain quantity for simplicity.

Equation (11) can also be simplified under the assumption that $s_N$ and $v_2$ both have zero average value. Beginning with the definition of the truncated Fourier series for $v_2$ from (13) with N=1, $$v_2(t) = \sum_{n=-1}^{+1} \hat{v}_2[n] e^{-j\omega_s nt} \quad (17)$$
$$= \hat{v}_1[0](\hat{s}_N[+1]e^{+j\omega_s t} + \hat{s}_N[-1]e^{-j\omega_s t}) + \frac{1}{2}\text{Re}[(\bar{s}_N)^* \bar{v}_1]$$
$$= \hat{v}_1[0]\text{Re}[\bar{s}_N e^{+j\omega_s t}] + \frac{1}{2}\text{Re}[(\bar{s}_N)^* \bar{v}_1].$$

For systems in which the input voltage is assumed constant, the phasor $\bar{v}_1$ in the fundamental frequency is zero. This results in $$v_2(t) = v_1 \text{Re}[\bar{s}_N e^{+j\omega_s t}] \quad (18)$$
$$= v_1 s_N(t)$$
$$\therefore \bar{v}_2 = v_1 \bar{s}_N.$$

Figure 7:
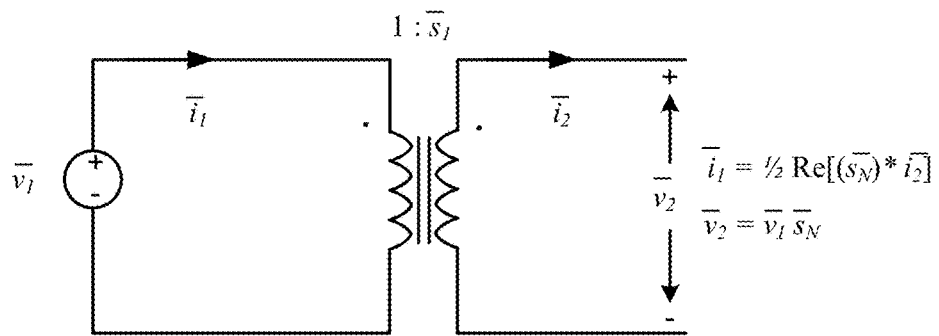
FIG. 7 is a phasor transformer model of a full bridge switch network with associated left-to-right voltage conversion and right-to-left current conversion ratios.

FIG. 7 is a phasor transformer model of a full bridge switch network with associated left-to-right voltage conversion and right-to-left current conversion ratios. Together (16) and (18) fully describe the equivalent transformer in a system which is approximated by limiting frequency content to lower frequencies than the fundamental harmonic and with constant voltage $v_1$. As all quantities are phasors this equivalent circuit model is defined as the "phasor transformer." These results are summarized below and in FIG. 7.

$$i_1 = \frac{1}{2}\text{Re}[(\bar{s}_N)^* \bar{i}_2], \quad (19)$$

$$\bar{v}_2 = v_1 \bar{s}_N. \quad (20)$$

Using these equations and the equivalent circuit for the phasor transformer as a model for switch networks greatly simplifies the analysis of the DABSRC. Equations (20) and (19) are all that is needed for steady state analysis, while small signal models follow by extension and are discusses below.

III.2 Steady State Analysis

Steady state analysis of the DABSRC focuses on enabling three tasks. First, it must be possible to design a converter whose output meets basic design specifications. Once this is accomplished maintaining reasonable component stresses becomes the focus. Finally, once a converter with acceptable output capabilities and reasonable component stresses has been designed the steady state control space must be investigated in order to achieve the highest steady state efficiency. In actuality these three areas are closely coupled with each other such that none may be individually optimized. As is generally the case in such situations, an iterative design methodology is applied. The rigorous three parameter constrained optimization problem possible in this situation is left to future work.

Although the design process for the DABSRC is of necessity iterative, logically the steps involved are well organized. First the tank currents and voltages are calculated, leading to expressions for RMS voltage and currents as well as component stress approximations. These expressions are then used to calculate power flow at both input and output for three angle control of the DABSRC. Finally the resonant tank values and switching components are selected based on the previous analysis.

Figure 8:
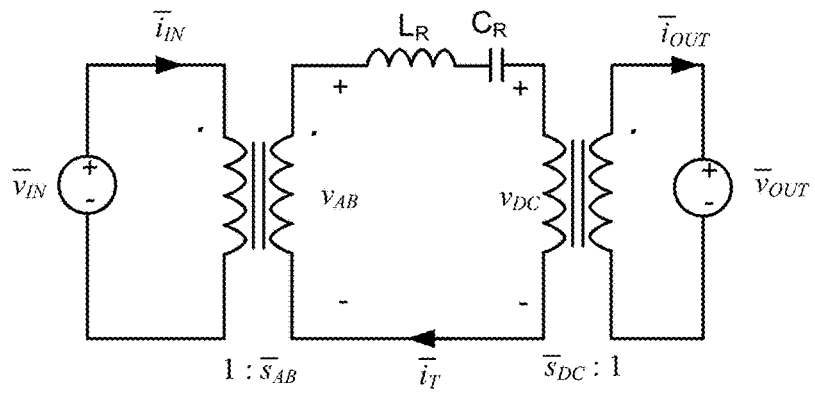
FIG. 8 is a phasor model of the Dual Active Bridge Series Resonant Converter.

FIG. 8 is a phasor model of the Dual Active Bridge Series Resonant Converter. The phasor transformer model replaces both active switch networks. Substitution of the phasor transformer derived above into the DABSRC results in the equivalent circuit of FIG. 8. The angle defined as $\phi_A$ in previous sections for the primary side phasor transformer is fixed at zero, while the other three available phasor transformer angles relate directly to the three angles used for power flow control in the DABSRC. The isolation transformer of FIG. 2B has been combined with the secondary side transformer, with the resulting two phasor turns ratios, $$\bar{s}_{AB}(\varphi_{AB}) = \frac{2}{j\pi}(1 - e^{-j\varphi_{AB}}) \tag{21}$$

$$= \frac{4}{\pi}\sin\left(\frac{\varphi_{AB}}{2}\right)e^{-j\frac{\varphi_{AB}}{2}}$$

$$= S_{AB}e^{-j\frac{\varphi_{AB}}{2}},$$

$$\bar{s}_{DC}(\varphi_{AD}, \varphi_{DC}) = \frac{2e^{-j(\varphi_{DC}+\varphi_{AD})}}{jn\pi}(e^{j\varphi_{DC}} - 1) \tag{22}$$

$$= \frac{4}{n\pi}\sin\left(\frac{\varphi_{DC}}{2}\right)e^{-j(\varphi_{AD}+\frac{\varphi_{DC}}{2})}$$

$$= S_{DC}e^{-j(\varphi_{AD}+\frac{\varphi_{DC}}{2})}.$$

for primary and secondary switch networks, respectively. Equations (21) and (22) result from application of (15) onto (7) with N=1. For the remainder of this paper, n is assumed to equal one in order to simplify examples and derivations.

Assuming a constant input and output voltage, the applied tank voltages $\bar{v}_{AB}$ and $\bar{v}_{DC}$ in FIG. 8 are found with (20), $$\bar{v}_{AB}(\varphi_{AB}) = v_{IN}\bar{s}_{AB}(\varphi_{AB}) \tag{23}$$

$$= v_{IN}S_{AB}e^{j\frac{\varphi_{AB}}{2}}$$

$$= V_{AB}e^{j\varphi_{VAB}},$$

$$\bar{v}_{DC}(\varphi_{AD}, \varphi_{DC}) = v_{out}\bar{s}_{DC}(\varphi_{AD}, \varphi_{DC}) \tag{24}$$

$$= v_{out}S_{DC}e^{-j(\varphi_{AD}+\frac{\varphi_{DC}}{2})}$$

$$= V_{DC}e^{j\varphi_{VDC}}.$$

Applying these voltages across the complex tank impedance with the inclusion of series resistor $R_r$ to model tank losses $$z_T(\omega_s) = R_r + j\left(\omega_s L_r - \frac{1}{\omega_s C_r}\right) = R_r + j\left(\frac{Z_o}{H_o(\omega_s)}\right) \tag{25}$$

$$H_o(\omega_s) = \frac{(\omega_o/\omega_s)}{1 - (\omega_o/\omega_s)^2}$$

$$Z_o = \sqrt{\frac{L_r}{C_r}}$$

$$\omega_o = \frac{1}{\sqrt{L_r C_r}},$$

evaluated at the switching frequency $\omega_s$ defines the steady state phasor tank current, $$\bar{i}_T = \frac{\bar{v}_{AB} - \bar{v}_{DC}}{z_T(\omega_s)} = K_T e^{j\varphi_T}, \tag{26}$$

$$K_T = \frac{v_{IN}\sqrt{S_{AB}^2 + M^2 S_{DC}^2 - 2MS_{AB}S_{DC}\cos(\varphi_{VAB} - \varphi_{VDC})}}{\|z_T(\omega_s)\|}.$$

Conversion ratio M is defined as output voltage $v_{OUT}$ over input voltage $v_{IN}$ times the transformer turns ratio n.

Using (26), the RMS tank current can be found as $$\text{RMS}[I_T] = \frac{K_T}{\sqrt{2}}, \tag{27}$$

with the theoretical maximum RMS tank current $$\max_{\varphi_{AB},\varphi_{AD},\varphi_{DC}}[\text{RMS}[I_T]] = \frac{2\sqrt{2}}{\pi}\frac{v_{IN}}{\|z_T(\omega_s)\|}(1+M), \tag{28}$$

when $\phi_{AB}=\phi_{AD}=\phi_{DC}=\pi$.

The peak resonant capacitor voltage can be found as the scaled magnitude of the time integral of $\bar{i}_T$. The actual value of this maximum voltage depends on whether a split capacitor is used or not, but is easily derived in either case. For a single capacitor on the secondary side of the tank isolation transformer, this voltage is found to be equal to $$\max_{\varphi_{AB},\varphi_{AD},\varphi_{DC}}[V_{CS}] = \frac{4v_{IN}}{n\pi\omega_s C_r\|z_T(\omega_s)\|}(1+M). \tag{29}$$

When a primary side resonant capacitor is used, the resulting in a maximum capacitor voltage is found to be n times (29). For a split capacitor system such as the one shown in FIG. 2B the maximum capacitor voltage is simply equal to ½ of the value shown above for the secondary side capacitor, and n times this value for the primary side capacitor.

Equations (28) and (29) relate to the maximum theoretical values across all possible control angles. When control angles are constrained to follow a set path in the three dimensional control space, these actual maximum values encountered may be far smaller.

Input and output currents for the DABSRC are found by applying (19) directly to the converter model in FIG. 8, $$i_{IN} = \frac{K_T S_{AB}}{2}\cos(\varphi_T - \varphi_{VAB}), \tag{30}$$

-continued $$i_{OUT} = \frac{K_T S_{DC}}{2} \cos(\varphi_T - \varphi_{VDC}). \quad (31)$$

Multiplying by the appropriate voltage results in expressions for the input and output powers with respect to the three control angles used. Doing so results in a simple expression for the maximum possible output power assuming an ideal tank, $$\left.\underset{\varphi_{AB},\varphi_{AD},\varphi_{DC}}{\text{MAX}[P_o]}\right|_{R_r=0} = P_o^{Max} = \frac{8M}{\pi^2} \frac{(v_{IN})^2}{\|z_T(\omega_s)|_{R_r=0}\|}, \quad (32)$$

achieved at $\phi_{AB}=\phi_{DC}=\pi$ and $\phi_{AD}=\pi/2$. Determining the maximum output power with a non-zero tank resistance is best done with a numerical optimization, as the resulting shift in tank current phase results in slightly modified control angles needed to achieve the maximum available power output.

Equations (26)-(32) along with the associated phase and magnitude for phasor quantities fully define all steady state signals of the DABSRC according to a fundamental approximation. These results allow a power stage to be intelligently designed according to project specifications.

Based on steady state analysis of the DABSRC, a $V_{IN}$=500 V converter is designed with a nominal conversion ratio of M=1. A switching frequency of $f_s$=100 kHz is chosen. Because the ratio of RMS tank current to delivered output current is lowest at a unity conversion ratio, a transformer turns ratio of n=1 is chosen. A nominal output power of $P_o^{MAX}$=1 kW is desired, helping to force the selection of tank parameters using (32). This output power must be maintained down to a conversion ratio of M=0.4, while at M=1 a pulsed power of $P_o^{BURST}$=2 kW must be delivered. These constraints allow (32) to be solved for the magnitude of the tank impedance necessary at the switching frequency, $$\|z_T(\omega_s)|_{R_r=0}\| = \frac{8M}{\pi^2} \frac{(v_{IN})^2}{P_o^{Max}}. \quad (33)$$

An additional constraint on the tank impedance is set by requiring the maximum resonant capacitor voltages to remain below 400 V for the split tank capacitor design seen in FIG. 2B. This maximum capacitor voltage constraint leads to a necessary ratio between the resonant tank frequency $\omega_o$ defined in (25) and the switching frequency $\omega_s$ of $$\frac{\omega_o}{\omega_s} = 0.61. \quad (34)$$

A combination of these constraints can now be used to determine the specific tank parameters, resulting in a resonant tank inductance of $L_r$=200 µH and a total resonant capacitance of $C_r$=34 nF. $C_r$ is implemented as a split capacitor using two capacitors of twice the nominal value located on either side of the isolation transformer. This is done in order to ensure that zero average current is maintained in both the primary and secondary windings of the tank transformer without the need for average current control. This simple approach for maintain zero average current has the drawback of increasing the tank volume. In order to remove this issue, it may be possible to use a single capacitor due to the inherent volt-second balancing achieved in some resonant converters, although this extension is left for future revisions. $L_r$, is additionally split in order to increase symmetry for the input bridges.

III.3 Small Signal Analysis of the DABSRC

Small signal analysis of the DABSRC begins with defining a small signal model of the phasor transformer. This derivation is done assuming that an ideal voltage source is used as an input on the primary side with an arbitrary impedance loading the secondary side of the transformer model. Perturbations are applied to control angles only with the input voltages of each equivalent transformer assumed to be constant. The primary side equivalent transformer input voltage is defined as the constant DABSRC input voltage, while the secondary side equivalent transformer input voltage is defined as the constant DABSRC output voltage. By perturbing each of the control angles, small signal voltage perturbations on the applied AC tank voltage is predicted. Once a small signal model for the phasor transformer has been derived, it is inserted into a linearized small signal model of the full DABSRC with small signal phasor tank impedance. This converter model is used to derive small signal tank currents, and used in conjunction with the large signal model of the converter derived in Section III.2 above in order to derive small signal input and output currents.

Beginning with the non-zero terms of (6), the first two terms of a two variable Taylor series expansion around a steady state phase vector $V_\Phi = \{\Phi_A, \Phi_{AB}\}$ can be used as a linear approximation of the equivalent transformer output voltage, $$\hat{v}_2[n] \approx \hat{v}_2[n]\bigg|_{V_\Phi} + \tilde{\varphi}_a \frac{\partial \hat{v}_2[n]}{\partial \varphi_A}\bigg|_{V_\Phi} + \tilde{\varphi}_{ab} \frac{\partial \hat{v}_2[n]}{\partial \varphi_{AB}}\bigg|_{V_\Phi} \quad (35)$$

$$\approx \hat{V}_2[n] + \tilde{\varphi}_a \hat{v}_2^A[n] + \tilde{\varphi}_{ab} \hat{v}_2^{AB}[n],$$

$$\approx \hat{V}_2[n] + \hat{v}_2[n],$$

$$\hat{v}_2^A[n] = -\frac{v_1 e^{-jn\Phi_A}}{\pi}(1 - e^{-jn\Phi_{AB}}), \quad (36)$$

$$\hat{v}_2^{AB}[n] = \frac{v_1}{\pi} e^{-jn(\Phi_A + \Phi_{AB})}. \quad (37)$$

Equations (36) and (37) represent the linear approximation of the effect of $\phi_A$ and $\phi_{AB}$ perturbations on $v_2$ and can be represented as two complex voltage sources in series on the secondary side of the equivalent transformer.

Due to the small signal voltage sources from (35), current $i_2$ will react dependent on the relation between $v_2$ and $i_2$ in circuit. Regardless of the specific relation, current $i_2$ will react with magnitude and phase perturbations, $$\hat{i}_2[n] = (K_2[n] + \tilde{k}_2[n]) e^{j(\phi_2[n] + \hat{\phi}_2[n])} \quad (38)$$

Applying the transformer relation from (10) to (38) results in a non-linear input current in terms of the magnitude and phase of $i_2$, as well as the phase control angles $\phi_A$ and $\phi_{AB}$. Using a four variable Taylor series expansion this expression can be linearized as a sum of small signal sources, $$\hat{i}_1[n] = \hat{s}_N[n] * \hat{i}_2[n] \quad (39)$$

-continued $$\approx I_1[n] + \tilde{\varphi}_a \hat{i}_1^A[n] + \tilde{\varphi}_{ab} \hat{i}_1^{AB}[n] + \tilde{k}_2 \hat{i}_1^k[n] + \tilde{\varphi}_2 \hat{i}_1^{\varphi}[n]$$

$$\approx \hat{I}_1[n] + \hat{\tilde{i}}_1[n].$$

The difficulty in directly applying (39) results from the need to expand the small signal tank magnitude and phase in terms of the two control angle variables. Because this expansion includes terms dependent on the unknown $v_2$-$i_2$ relation, (39) is left as is for the general form of the equivalent transformer small signal model. An example of expanding (39) once the tank impedance is known is given later in this section for the DABSRC.

Figure 9:
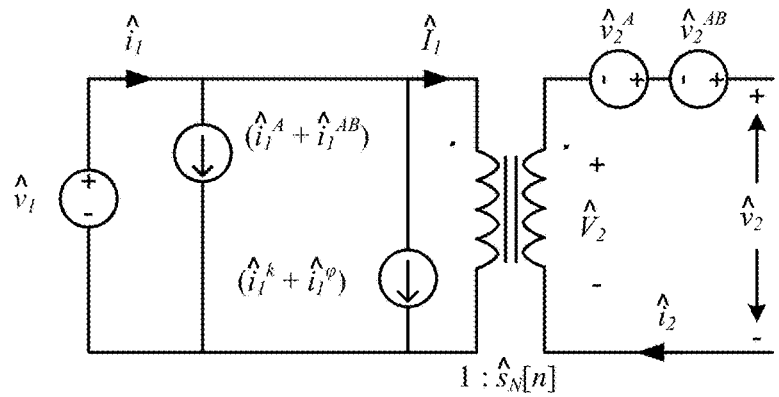
FIG. 9 is a general small signal model of a full bridge switch network represented as an equivalent transformer.

FIG. 9 is a general small signal model of a full bridge switch network represented as an equivalent transformer. Equations (38) and (39) are represented in circuit form in FIG. 9 and presented as the general small signal model of the equivalent transformer.

Figure 10:
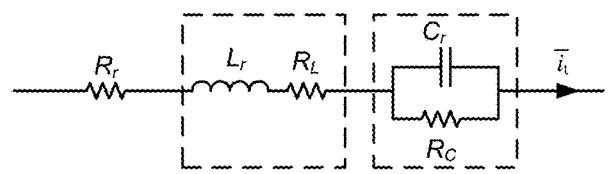
FIG. 10 is a small signal equivalent tank impedance for the DABSRC.

Phasor representation of inductors and capacitors as small signal elements has been previously dealt with. The results, duplicated here for clarity, show that capacitors and inductors require the addition of an imaginary resistance, $$R_C = \frac{1}{j\omega_s C_r}, \quad (40)$$

$$R_L = j\omega_s L_r, \quad (41)$$

where $R_C$ is added in parallel with $C_r$ and $R_L$ added in series with $L_r$ as seen in FIG. 10. FIG. 10 is a small signal equivalent tank impedance for the DABSRC. Imaginary resistors $R_L$ and $R_C$ are added to reactive elements, while $R_r$ models tank losses. These imaginary resistances represent the linearized effect of variations in switching frequency on the tank impedances. Although switching frequency is not varied in this work, the effect of phase shift variations results in an equivalent expression for imaginary resistance due to the relationship between switching frequency and phase shift. In FIG. 10 a series resistance is added in order to represent tank losses. The resulting small signal tank impedance takes the form $$z_t(\omega_s - js) = R_r + L_r(j\omega_s + s) + \frac{1}{(j\omega_s + s)C_r}, \quad (42)$$

This expression is equivalent to evaluating (25) at $(\omega_s$-$js)$. Resistors, current sources, and voltage sources retain their form, with voltage and current source values converted into their phasor equivalents. To complete the small signal model of the DABSRC, only the small signal representation of the phasor transformer need be applied.

Rephrasing (36) and (37) in terms of the converter control angles and applying (15) in order to achieve phasor quantities results in three small signal phasor sources. The single control angle applied to the primary switch network results in a single small signal source resulting from a sum of (36) and (37) evaluated with n=+1, $$\bar{v}_{ab}^{AB} \tilde{\varphi}_{ab} = \tilde{\varphi}_{ab} \frac{2V_{IN}}{\pi} e^{-j\Phi_{AB}}. \quad (43)$$

The secondary side switch network results in a pair of small signal sources, after collecting terms for each of the two control angles, $$\bar{v}_{dc}^{AD} \tilde{\varphi}_{ad} = -\tilde{\varphi}_{ad} \frac{j2MV_{IN}}{\pi} \sin\left(\frac{\Phi_{DC}}{2}\right) e^{j\left(\Phi_{AD} + \frac{\Phi_{DC}}{2}\right)}, \quad (44)$$

$$\bar{v}_{dc}^{DC} \tilde{\varphi}_{dc} = -\tilde{\varphi}_{dc} \frac{2MV_{IN}}{\pi} e^{-j(\Phi_{AD} + \Phi_{DC})}. \quad (45)$$

The small signal tank current is computed as a function of the three small signal voltage sources (43)-(45) applied across the tank impedance (42) and can be split into real and imaginary portions, $$\tilde{i}_t = \frac{1}{z_T(\omega_s - js)}(\bar{v}_{ab}^{AB} \tilde{\varphi}_{ab} + \bar{v}_{dc}^{AD} \tilde{\varphi}_{ad} + \bar{v}_{dc}^{DC} \tilde{\varphi}_{dc}), \quad (46)$$

$$= \tilde{i}_{tx} + j(\tilde{i}_{ty}).$$

To obtain magnitude and phase envelopes for the tank current of the DABSRC, the complex phasor relation in (46) is split into two real functions which separately relate magnitude and phase to each of the three control angle perturbations. This has previously been done for the magnitude envelope of a phasor signal, but not for the phase envelope of a phasor signal. Both equations are derived by linearizing the equations for the magnitude and phase of a complex number in rectangular form with a first order Taylor series expansion. For some phasor g with steady state complex value $G = G_X + jG_Y$ and small signal value $g = \tilde{g}_x + j\tilde{g}_y$ this results in $$\|\tilde{g}\| \approx \frac{\tilde{g}_x G_X + \tilde{g}_y G_Y}{\|G\|} \quad (47)$$

$$\angle \tilde{g} \approx \frac{\tilde{g}_y G_X - \tilde{g}_x G_Y}{\|G\|^2}. \quad (48)$$

Applying (47) and (48) to (46) results in expressions for the linearized effect of each of the three control angles on both the magnitude and the phase of the small signal tank current phasor, $$\|\tilde{i}_t\| \approx \tilde{i}_{tx}\cos(\Phi_T) + \tilde{i}_{ty}\sin(\Phi_T) \quad (49)$$

$$= k_t^{AB}\tilde{\varphi}_{ab} + k_t^{AD}\tilde{\varphi}_{ad} + k_t^{DC}\tilde{\varphi}_{dc}$$

$$= \tilde{k}_t,$$

$$\angle \tilde{i}_t \approx \frac{\tilde{i}_{ty}\cos(\Phi_T) - \tilde{i}_{tx}\sin(\Phi_T)}{K_T} \quad (50)$$

$$= \varphi_t^{AB}\tilde{\varphi}_{ab} + \varphi_t^{AD}\tilde{\varphi}_{ad} + \varphi_t^{DC}\tilde{\varphi}_{dc}$$

$$= \tilde{\varphi}_t.$$

The order of the transfer functions in (49)-(50) depends directly on the small signal tank impedance. Due to the form of (47) and (48), the three transfer functions in (49) have equal order to the number of zeroes in the small signal tank impedance, while the three transfer functions in (50) have a highest possible order of the number of zeroes in the small signal tank impedance squared.

To derive linear models for the input and output currents relation to each of the three control angles requires revisiting a large signal model of the DABSRC. Linearizing the large signal input and output currents in (30) and (31) results in expressions for small signal perturbation in terms of the tank current components found in (49) and (50). This is done by treating the tank current and phase as quantities with no dependence on control angle, and then using the chain rule to expand the result in terms of the dependence on each of the three control angles. After substituting the correct quantities, the desired results are achieved.

Beginning with the large signal input current of the DABSRC derived previously, $$i_{IN} = \frac{K_T S_{AB}}{2} \cos(\varphi_T - \varphi_{VAB}), \quad (51)$$

partial derivatives are taken with respect to both the tank current magnitude $K_T$ and tank current phase $\phi_T$, as well as with respect to the three control angles, $$\tilde{i}_{IN} = \tilde{k}_t \frac{\partial i_{IN}}{\partial k_T} + \tilde{\varphi}_t \frac{\partial i_{IN}}{\partial \varphi_T} + \tilde{\varphi}_{ab} \frac{\partial i_{IN}}{\partial \varphi_{AB}} + \tilde{\varphi}_{ad} \frac{\partial i_{IN}}{\partial \varphi_{AD}} + \tilde{\varphi}_{dc} \frac{\partial i_{IN}}{\partial \varphi_{DC}}. \quad (52)$$

For the input current, two of these terms are zero as there is no direct dependence on either $\phi_{AD}$ or $\phi_{DC}$. The dependence of $k_T$ and $\phi_T$ on the three control angles is dealt with by using the chain rule to expand the first two terms of (52), $$\tilde{k}_t \frac{\partial i_{IN}}{\partial k_T} = \tilde{k}_t \left( \frac{\partial i_{IN}}{\partial k_T} \frac{\partial k_T}{\partial \varphi_{AB}} + \frac{\partial i_{IN}}{\partial k_T} \frac{\partial k_T}{\partial \varphi_{AD}} + \frac{\partial i_{IN}}{\partial k_T} \frac{\partial k_T}{\partial \varphi_{DC}} \right) \quad (53)$$

$$\tilde{\varphi}_t \frac{\partial i_{IN}}{\partial \varphi_T} = \tilde{\varphi}_t \left( \frac{\partial i_{IN}}{\partial \varphi_T} \frac{\partial \varphi_T}{\partial \varphi_{AB}} + \frac{\partial i_{IN}}{\partial \varphi_T} \frac{\partial \varphi_T}{\partial \varphi_{AD}} + \frac{\partial i_{IN}}{\partial \varphi_T} \frac{\partial \varphi_T}{\partial \varphi_{DC}} \right). \quad (54)$$

Each of the six partial derivatives in (53) and (54) with respect to the three control angles have been previously derived in (49) for the tank current magnitude and in (50) for the tank current phase. Substituting the results into (53) and (54) and canceling terms results in expressions for the partial derivative of the input current with respect to both tank current and tank phase perturbations which are dependent on only the three control angles perturbations, $$\tilde{k}_t \frac{\partial i_{IN}}{\partial k_T} = \left( \frac{\partial i_{IN}}{\partial k_T} k_t^{AB} \tilde{\varphi}_{ab} + \frac{\partial i_{IN}}{\partial k_T} k_t^{AD} \tilde{\varphi}_{ad} + \frac{\partial i_{IN}}{\partial k_T} k_t^{DC} \tilde{\varphi}_{dc} \right), \quad (55)$$

$$\tilde{\varphi}_t \frac{\partial i_{IN}}{\partial \varphi_T} = \left( \frac{\partial i_{IN}}{\partial \varphi_T} \varphi_t^{AB} \tilde{\varphi}_{ab} + \frac{\partial i_{IN}}{\partial \varphi_T} \varphi_t^{AD} \tilde{\varphi}_{ad} + \frac{\partial i_{IN}}{\partial \varphi_T} \varphi_t^{DC} \tilde{\varphi}_{dc} \right). \quad (56)$$

Inserting (55) and (56) into (52) results in the desired equation for the small signal input current. These equations can now be rearranged into three separate terms, each relating a single control angle with small signal input current perturbations, $$\tilde{i}_{IN} = \tilde{\varphi}_{ab} i_{IN}^{AB} + \tilde{\varphi}_{ad} i_{IN}^{AD} + \tilde{\varphi}_{dc} i_{IN}^{DC}, \quad (57)$$

$$i_{IN}^{AB}(s) = \left( k_t^{AB} \frac{\partial i_{IN}}{\partial k_T} + \varphi_t^{AB} \frac{\partial i_{IN}}{\partial \varphi_T} + \frac{\partial i_{IN}}{\partial \varphi_{AB}} \right), \quad (58)$$

$$i_{IN}^{AD}(s) = \left( k_t^{AD} \frac{\partial i_{IN}}{\partial k_T} + \varphi_t^{AD} \frac{\partial i_{IN}}{\partial \varphi_T} \right), \quad (59)$$

$$i_{IN}^{DC}(s) = \left( k_t^{DC} \frac{\partial i_{IN}}{\partial k_T} + \varphi_t^{DC} \frac{\partial i_{IN}}{\partial \varphi_T} \right). \quad (60)$$

In (58)-(60), each of the partial derivatives is a gain term dependent on steady state operating point, while each of the multiplying terms is a transfer function as found previously.

Solving for the small signal output current follows the same process, beginning with the large signal output current, $$i_{OUT} = \frac{K_T S_{DC}}{2} \cos(\varphi_T - \varphi_{VDC}). \quad (61)$$

Taking partial derivatives with respect to each of the three control angles as well as the tank current magnitude and phase results in a sum of six quantities just as before, $$\tilde{i}_{OUT} = \tilde{k}_t \frac{\partial i_{OUT}}{\partial k_T} + \tilde{\varphi}_t \frac{\partial i_{OUT}}{\partial \varphi_T} + \tilde{\varphi}_{ab} \frac{\partial i_{OUT}}{\partial \varphi_{AB}} + \tilde{\varphi}_{ad} \frac{\partial i_{OUT}}{\partial \varphi_{AD}} + \tilde{\varphi}_{DC} \frac{\partial i_{OUT}}{\partial \varphi_{DC}}, \quad (62)$$

with the only difference being that the output current has a direct dependence on both $\phi_{AD}$ and $\phi_{DC}$, with no direct dependence on $\phi_{AB}$. The derivation proceeds from (62) just as it did for the input current, resulting in three terms which each relate a single control angle to small signal output current, $$\tilde{i}_{OUT} = \tilde{\varphi}_{ab} i_{OUT}^{AB} + \tilde{\varphi}_{ad} i_{OUT}^{AD} + \tilde{\varphi}_{dc} i_{OUT}^{DC}, \quad (63)$$

$$i_{OUT}^{AB}(s) = \left( k_t^{AB} \frac{\partial i_{OUT}}{\partial k_T} + \varphi_t^{AB} \frac{\partial i_{OUT}}{\partial \varphi_T} \right), \quad (64)$$

$$i_{OUT}^{AD}(s) = \left( k_t^{AD} \frac{\partial i_{OUT}}{\partial k_T} + \varphi_t^{AD} \frac{\partial i_{OUT}}{\partial \varphi_T} + \frac{\partial i_{OUT}}{\partial \varphi_{AD}} \right), \quad (65)$$

$$i_{OUT}^{DC}(s) = \left( k_t^{DC} \frac{\partial i_{OUT}}{\partial k_T} + \varphi_t^{DC} \frac{\partial i_{OUT}}{\partial \varphi_T} + \frac{\partial i_{OUT}}{\partial \varphi_{DC}} \right). \quad (66)$$

The desired results for both input and output current small signal models are found in (57) and (63). The transfer functions seen in these equations have orders dependent on the tank current transfer functions in (49) and (50). Each of these equations provides a linear relation between control action from any of three control inputs and either input or output current. The constants used in each of these equations are summarized in Table 1.

TABLE 1

Small Signal Current Constants
Small Signal Input and Output Current Constants

| | |
|---|---|
| $\dfrac{\partial i_{IN}}{\partial k_T}$ | $\dfrac{1}{\pi}(\sin(\Phi_{AB} + \Phi_T) - \sin(\Phi_T))$ |
| $\dfrac{\partial i_{IN}}{\partial \varphi_T}$ | $\dfrac{K_T}{\pi}(\cos(\Phi_{AB} + \Phi_T) - \cos(\Phi_T))$ |

TABLE 1-continued

Small Signal Current Constants
Small Signal Input and Output Current Constants

| | |
|---|---|
| $\dfrac{\partial i_{IN}}{\partial \varphi_{AB}}$ | $\dfrac{K_T}{\pi}\cos(\Phi_{AB}+\Phi_T)$ |
| $\dfrac{\partial i_{OUT}}{\partial k_T}$ | $\dfrac{1}{\pi}(\sin(\Phi_{AD}+\Phi_{DC}+\Phi_T)-\sin(\Phi_{AD}+\Phi_T))$ |
| $\dfrac{\partial i_{OUT}}{\partial \varphi_T}$ | $\dfrac{K_T}{\pi}(\cos(\Phi_{AD}+\Phi_{DC}+\Phi_T)-\cos(\Phi_{AD}+\Phi_T))$ |
| $\dfrac{\partial i_{OUT}}{\partial \varphi_{AD}}$ | $\dfrac{K_T}{\pi}(\cos(\Phi_{AD}+\Phi_{DC}+\Phi_T)-\cos(\Phi_{AD}+\Phi_T))$ |
| $\dfrac{\partial i_{OUT}}{\partial \varphi_{DC}}$ | $\dfrac{K_T}{\pi}\cos(\Phi_{AD}+\Phi_{DC}+\Phi_T)$ |

IV Control of the DABSRC

With the derivation of small signal models relating each of the three control angles to both input and output currents of the DABSRC completed, a feedback controller for the converter can be implemented.

Control of the DABSRC begins with determining the optimal set of control angles for steady state operation in terms of converter efficiency. This optimization can include both RMS tank currents as well as ZVS regions for the converter; although the future inclusion of PSM-HB auxiliary circuitry on all bridges means that an optimization on only RMS tank currents is performed. Once this is completed, the small signal models developed for the DABSRC are used to determine a feedback controller using the control angle trajectories determined decided upon.

Due to the way in which the ZVS circuitry is designed control of the PSM-HB auxiliary legs is dealt with completely separately from control of the main power stage as shown below with respect to PSM leg ZVS assistance control. This allows a greatly simplified derivation for a high bandwidth ZVS control loop.

Finally, once controllers for the DABSRC and its associated ZVS circuitry are derived, the input and output regulated converter is augmented with both voltage and power control loops. These output control loops allow for simplified series and parallel connection between converters, and are the last step in designing a controller for the DABSRC.

IV.1 Operation Along the MCT

For a lossless resonant tank, the steady state output power of the DABSRC assuming $P_{OUT}^{MAX}$ as seen in (30)

$$P_{OUT}=P_{OUT}^{MAX}\sin\!\left(\frac{\Phi_{AB}}{2}\right)\sin\!\left(\frac{\Phi_{DC}}{2}\right)\sin\!\left(\Phi_{AD}+\frac{\Phi_{DC}-\Phi_{AB}}{2}\right), \quad (67)$$

is a function of all three control angles, while the maximum output power is a function of the converter tank design, operating frequency, and input and output voltages. Normalizing by the maximum output power the expression for the normalized output power of the converter, $$\langle P_{OUT}\rangle_{P_{OUT}^{MAX}}=\sin\!\left(\frac{\Phi_{AB}}{2}\right)\sin\!\left(\frac{\Phi_{DC}}{2}\right)\sin\!\left(\Phi_{AD}+\frac{\Phi_{DC}-\Phi_{AB}}{2}\right) \quad (68)$$

is equal to the expression for the normalized output current of the converter assuming an ideal voltage source on the output of the DABSRC, $$\langle I_{OUT}\rangle_{I_{OUT}^{MAX}}=\sin\!\left(\frac{\Phi_{AB}}{2}\right)\sin\!\left(\frac{\Phi_{DC}}{2}\right)\sin\!\left(\Phi_{AD}+\frac{\Phi_{DC}-\Phi_{AB}}{2}\right). \quad (69)$$

Due to this equivalency, a normalized output command variable, $$U_{OUT}=\langle I_{OUT}\rangle=\langle P_{OUT}\rangle \quad (70)$$

is defined. With this notation, each desired normalized output $U_{OUT}$ has an associated actual output $U_{OUT}$ which exists between the maximum achievable normalized output $+U_{OUT,MAX}=1$ and the minimum achievable normalized output, $-U_{OUT,MAX}=-1$.

The RMS tank current of the DABSRC is also defined as a function of the three converter control angles, as seen previously in (27). As the RMS tank current is directly related to conduction losses, the optimal selection of steady state converter control angles is one which minimizes the RMS tank current while still achieving the desired normalized output command.

For a given steady state output command the goal is to operate the converter with the minimum RMS tank current possible. This objective is equivalently expresses by the following constrained minimization problem, $$\min_{v_\varphi \in C_s}[\text{RMS}[I_T]]: \begin{cases} U_{OUT}(v_\varphi)=U_{OUT} \\ -U_{OUT,MAX}\le U_{OUT}\le +U_{OUT,MAX} \end{cases}, \quad (71)$$

$$v_\varphi=[\varphi_{AB},\varphi_{AD},\varphi_{DC}], \quad (72)$$

$$C_s=v_\varphi: \begin{cases} -\pi \le \varphi_{AD}\le +\pi \\ 0\le \varphi_{AB}\le 2\pi \\ 0\le \varphi_{DC}\le 2\pi \end{cases}, \quad (73)$$

whose solutions are the minimum current points of $U_{OUT}$; as $U_{OUT}$ varies in the possible range of outputs, the solution describes a trajectory in the control space $v_\varphi$, referred to as the minimum current trajectory (MCT). Using the results from above regarding tank voltage and currents and steady state power flow with three angle modulation, (71) can be stated as a system of trigonometric equations, the solution of which can be put in closed form. The form of these solutions depends on the conversion ratio M as follows:

When M≤1: The MCT is a 2-D curve lying on the $\phi_{DC}=\pi$ plane. For $|U_{OUT}|\ge(1-M^2)^{1/2}$ the MCT consists of a single branch in which $\phi_{AB}=\pi$ while $\phi_{AD}$ controls converter output power/current. This branch along which only $\phi_{AD}$ varies is denoted as $\gamma_2$. For $|U_{OUT}|\le(1-M^2)^{1/2}$ the MCT splits into two branches, $\gamma_{1+}$ and $\gamma_{1-}$, on which power/current flow is controlled by both $\phi_{AD}$ and $\phi_{AB}$. Analytical expressions for the MCT in the M<1 case are $$\gamma_{1\pm}: \begin{cases} \varphi_{AB} = \pi \pm \pi \mp 2\arcsin\left(\sqrt{M^2 + (U_{OUT})^2}\right) \\ \varphi_{DC} = \pi \\ \varphi_{AD} = \frac{\varphi_{AB}}{2} + \arctan\left(\frac{U_{OUT}}{M}\right) - \frac{\pi}{2} \end{cases}, \text{ when } |U_{OUT}| \leq \sqrt{1-M^2} \quad (74)$$

$$\gamma_2: \begin{cases} \varphi_{AB} = \varphi_{DC} = \pi \\ \varphi_{AD} = \arcsin(U_{OUT}) \end{cases}, \text{ when } |U_{OUT}| \leq \sqrt{1-M^2}.$$

When $M \geq 1$: The MCT is a 2-D curve lying on the $\phi_{AB} = \pi$ plane. For $|U_{OUT}| \geq (1-M^2)^{1/2}$ the MCT consists of a single branch in which $\phi_{DC} = \pi$ while $\phi_{AD}$ controls converter output power/current. This branch along which only $\phi_{AD}$ varies is denoted as $k_2$ and is equivalent to $\gamma_2$. For $|U_{OUT}| \leq (1-M^2)^{1/2}$ the MCT splits into two branches, $\lambda_{1+}$ and $\lambda_{1-}$ on which power/current flow is controlled by both $\phi_{AD}$ and $\phi_{DC}$. Analytical expressions for the MCT in the M>1 case are $$\lambda_{1\pm}: \begin{cases} \varphi_{AB} = \pi \\ \varphi_{DC} = \pi \pm \pi \mp 2\arcsin\left(\sqrt{\left(\frac{1}{M}\right)^2 + (U_{OUT})^2}\right), \text{ when } |(U_{OUT})| \leq \sqrt{1-\left(\frac{1}{M^2}\right)} \\ \varphi_{AD} = \frac{-\varphi_{DC}}{2} + \arctan(M \cdot U_{OUT}) + \frac{\pi}{2} \end{cases} \quad (75)$$

$$\lambda_2: \begin{cases} \varphi_{AB} = \varphi_{DC} = \pi \\ \varphi_{AD} = \arcsin(U_{OUT}) \end{cases}, \text{ when } |U_{OUT}| \geq \sqrt{1-\left(\frac{1}{M}\right)^2}.$$

For either of the above cases when trajectories $\lambda_{1\pm}$ and $\gamma_{1\pm}$ are used the bridge with the higher voltage operates with a phase shift not equal to $\pi$, while the bridge with the lower voltage operates with a phase shift equal to $\pi$. This scheme results in a minimum voltage difference across the tank, as the high voltage bridge is modulated to reduce the applied voltage-second waveform. Due to the reduced difference in applied voltages across the tank the peak values of the tank current waveform are reduced, thus reducing the RMS value of the waveform. Both cases collapse to the same solution at a conversion ratio of M=1. At this conversion ratio single angle modulation of $\phi_{AD}$ alone along either $\gamma_2$ or equivalently $\lambda_2$ is shown to minimize RMS tank currents.

Figure 11:
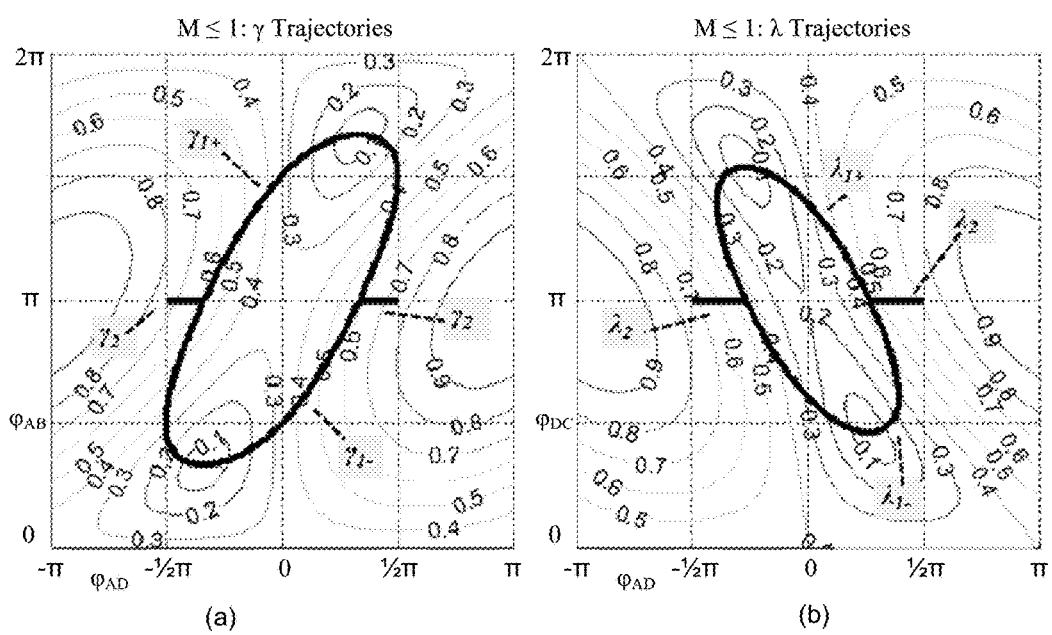
FIG. 11 depicts MCT (solid curve) and normalized RMS tank current contours (a) on the $\phi_{DC}=\pi$ plane for M=0.5 and (b) on the $\phi_{AB}=\pi$ plane for M=1.5.

FIG. 11 depicts MCT (solid curve) and normalized RMS tank current contours (a) on the $\phi_{DC} = \pi$ plane for M=0.5 and (b) on the $\phi_{AB} = \pi$ plane for M=1.5. In FIG. 11, depicts the MCT as the solid curve and normalized RMS tank current contours (a) on the $\phi_{DC} = \pi$ plane for M=0.5 and (b) on the $\phi_{AB} = \pi$ plane for M=1.5. In FIG. 11, the MCT is plotted for two different conversion ratios. In both plots, contours for the normalized RMS tank current are plotted beneath the MCT. Following the MCT curve from right to left on either plot transitions from maximum forward power or current to maximum reverse power or current while maintaining the minimum possible RMS tank currents at any given power or current level for the given conversion ratio. Converter tank parameter variations have minimal effect on the MCTs, allowing the same trajectories to be used regardless of component tolerances in the final design. This is due to the use of normalized variables in the derivation of the MCTs. Although tank parameter variations may affect the absolute value of tank currents and output power levels, the normalized values are unaffected leaving the MCTs unchanged.

It is useful to construct the tank phasor diagram as the operating point moves along the MCT from $P_{OUT}=0$ up to $P_{OUT}=P_{OUT}^{MAX}$. In what follows, the phasor associated with voltage $v_X(t)$ is denoted with $V_X$.

Figure 12:
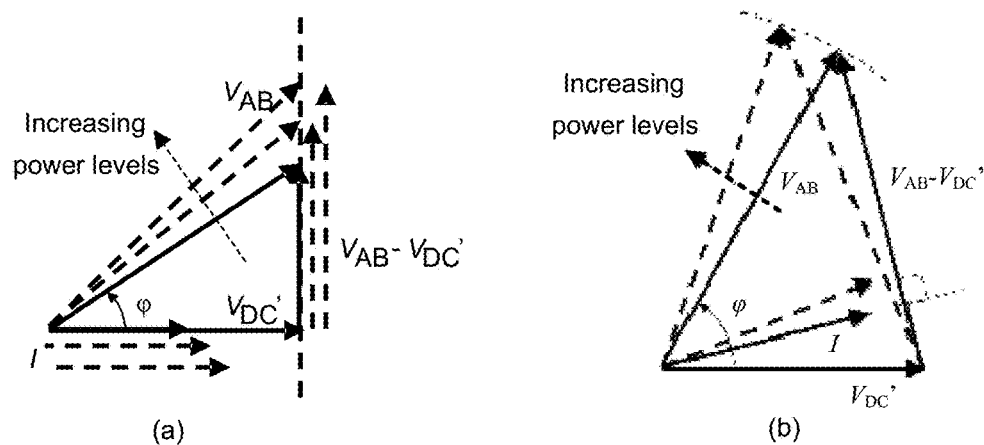
FIG. 12 depicts phasor diagrams in forward power mode along the MCT, M<1 case along branches $\gamma_{1+}/\gamma_{1-}$ (a) and along branch $\gamma_2$ (b)

Let us discuss case M<1 first. For $|U_{OUT}|<(1-M^2)^{1/2}$, two operating points $Q_{\gamma+}(P_{OUT})$ and $Q_{\gamma-}(P_{OUT})$ exist, as illustrated in FIG. 11(a), respectively located on the $\gamma_{1+}$ and $\gamma_{1-}$ branches of the MCT. It is easy to prove that such two operating points are physically equivalent, i.e. they correspond to the same tank phasor diagram. Branches $\gamma_{1+}$ and $\gamma_{1-}$ as well as branches $\lambda_{1+}$ and $\lambda_{1-}$ for the M>1 case, are equivalent in this sense. FIG. 12 depicts phasor diagrams in forward power mode along the MCT, M<1 case along branches $\gamma_{1+}/\gamma_{1-}$ (a) and along branch $\gamma_2$ (b). The typical phasor diagram corresponding to the condition $0<U_{OUT}<(1-M^2)^{1/2}$ is sketched in FIG. 12(a). Minimum current operation forces the tank current to be in phase with $V_{DC}'$; since the tank current is always orthogonal to $V_{AB}-V_{DC}'$, as the power increases the tip of phasor V slides along the perpendicular to the tip of $V_{DC}'$, i.e. the triangle defined by $V_{AB}$ and $V_{DC}'$ is rectangle. Along $\gamma_{1\pm}$, minimum current operation for M<1 can therefore be equivalently defined as the condition in which the output bridge delivers the maximum voltage ($\phi_{DC}=180°$) while angles $\phi_{AB}$ and $\phi_{AD}$ are modulated so as to maintain unity output power factor (i.e. I in phase with $V_{DC}'$)

The phasor arrangement illustrated in FIG. 12(a) is maintained up to the point in which the magnitude of $V_{AB}$ is maximized, i.e. up to $\phi_{AB}=180°$. This condition, which occurs at $|U_{OUT}|=(1-M^2)^{1/2}$ as predicted by (74), marks the separation between branches $\gamma_{1\pm}$ and branch $\gamma_2$. Above such power level, $V_{AB}$ rotates at constant magnitude as the power increases, and the tank current no longer stays in phase with $V_{DC}'$; along $\gamma_2$, the phasor diagram appears as shown in FIG. 12(b).

Reverse power operation ($P_{OUT}<0$) results in similar phasor diagrams, with the current phasor 180° phase-shifted with respect to FIG. 12 and $V_{DC}'$ now leading $V_{AB}$.

Case M>1 can be discussed using similar arguments but with the roles of the two bridges exchanged. Along $\lambda_1$, minimum current operation for M>1 can be equivalently defined as the condition in which the input bridge delivers the maximum voltage ($\phi_{AB}=180°$) while angles $\phi_{DC}$ and $\phi_{AD}$ are modulated so as to maintain unity input power factor (I in phase with $V_{AB}$). As predicted by (75), this condition can be maintained up to $|U_{OUT}|=(1-M^{-2})^{1/2}$. Beyond such point, the minimum current trajectory proceeds along $\lambda_2$.

Case M=1 can be regarded, at this point, as a boundary situation in which no phasor arrangement exists to force the tank current I to be in phase with $V_{AB}$ or $V_{DC}'$. This explains why only $\gamma_2$-like solutions exist in this case, as described by either (74) or (75).

The foregoing phasor analysis provides an explanation for the existence of different branches in the minimum current trajectories and of an intermediate power level above which the minimum current solution changes its analytical structure.

In this Section the switching behavior of the electronic devices when the DABSRC is operated along the minimum current trajectory is discussed. Only case M<1 is discussed in detail, as the symmetrical case M>1 can be treated similarly by exchanging the roles of the two bridges and by replacing M with 1/M in the analytical expressions.

Consider the phasor diagram illustrated in FIG. 12(b), corresponding to $|U_{OUT}|>(1-M^2)^{1/2}$, which implies $\phi_{AB}=\phi_{DC}=180°$. At these power levels, the tank current lags the input voltages $V_A$ and $V_B$, and leads output voltages $V_D$ and $V_C$. Hence, taking the sign of the device current at its turn-off instant as a simplified criterion to discriminate between soft or hard turn-on switching, for $|U_{OUT}|>(1-M^2)^{1/2}$ all the electronic devices turn on at zero-voltage. As the power level decreases below $|U_{OUT}|=(1-M^2)^{1/2}$ and the operating point enters branches $\gamma_{1\pm}$, phasor diagram shown in FIG. 12(a) is obtained, with the tank current in phase with the output voltage and the input bridge being modulated by $\phi_{AB}$. Therefore the output bridge tends to operate at the boundary between soft and hard switching. As far as the input bridge is concerned, an analysis based on the fundamental approximation predicts hard switching of the input bridge devices at both turn-on and turn-off over a power interval defined by $$|U_{OUT}| \leq \sqrt{M \cdot (1-M)} \tag{76}$$

Figure 13:
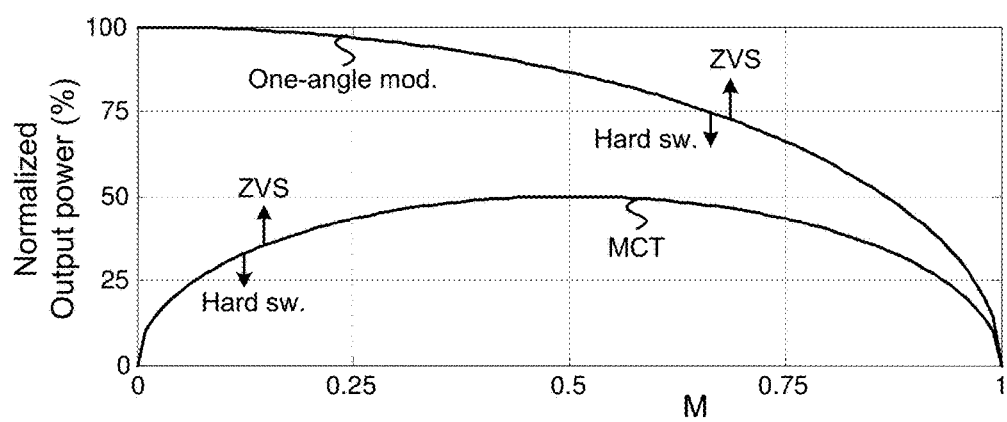
FIG. 13 depicts theoretical hard switching vs. soft switching boundary for the input bridge in the M<1 case: comparison between one-angle modulation and minimum current trajectory.

These results extend the analysis reported in [22], in which the zero-voltage switching boundary condition for the M<1 case was expressed as $\cos(\phi_{AD})=M$, here written according to the notation used in this paper. From (67) and with $\phi_{AB}=\phi_{DC}=180°$, the corresponding critical power level is found to be $|U_{OUT}|=(1-M^2)^{1/2}$, which represents the breaking point between the $\gamma_{1\pm}$ branches and the $\gamma_2$ branch in the minimum current trajectory as predicted by (9.a). FIG. 13 depicts theoretical hard switching vs. soft switching boundary for the input bridge in the M<1 case: comparison between one-angle modulation and minimum current trajectory. Below such power level, a one-angle modulation like the one considered in FIG. 13 necessarily induces the output bridge into hard-switching operation. If, on the other hand, the operating point follows the MCT along branches $\gamma_{1\pm}$, the output bridge is theoretically maintained at the soft/hard switching boundary. Such advantage comes at the price of the creation of a hard switching interval for the input bridge at light load, as indicated by (76).

Nonetheless, comparison between the hard switching vs. soft switching boundaries along the one-angle modulation trajectory and along the proposed MCT shows, as illustrated in FIG. 13 for M<1, that the hard switching interval along the MCT, given by (76), is consistently smaller than on the one-angle modulation trajectory. The difference between the two boundaries represents the additional ZVS interval gained by operating on the MCT rather than on the simple one-angle modulation path. Furthermore, it is shown in Section V that input hard-switching on the MCT is much less severe than hard-switching occurring along the one-angle trajectory.

IV.2 Gain Scheduling Feedback Control

Once steady state operating angles have been determined, a dynamic controller can be derived. Having previously generated small signal models relating control angle perturbations to input and output current perturbations, the small signal relation between the output command control variable and the minimum current trajectory control angles still must be derived. Once this has been completed, a small signal model of the DABSRC controlled along the minimum current trajectories may be assembled. Using this model, loop gains are analyzed and used to design a feedback controller for input and output current control. Due to the nature of the open loop system controlled in this way, a gain scheduled feedback controller is ultimately used.

In Section III.3 regarding small signal analysis of the DABSRC, transfer functions relating each of the three control angles to either the input or output current were derived. In order to control the DABSRC along the MCT, a small signal model must be derived relating the control input $U_{OUT}$ to the control angle vector. Once this relation has been derived, a full small signal model of the DABSRC controlled along the MCT is complete.

From the trajectories in (74) and (75), only branches $\gamma_{1+}$, $\gamma_2$, and $\lambda_{1+}$ will be used as they cover the whole control space. A similar derivation is possible if trajectories $\gamma_{1-}$, $\gamma_2$, and $\lambda_{1-}$ are chosen. The results are symmetric if a 180° rotation around $\phi_{AB}=\pi$, $\phi_{AD}=0$ for M<1 and $\phi_{DC}=\pi$, $\phi_{AD}=0$ for M>1 is performed.

Taking the partial derivative of branches $\gamma_{1+}$, $\gamma_2$, and $\lambda_{1+}$ with respect to the command variable $U_{OUT}$, $$A_\varphi(\gamma_{1+}) = \begin{cases} A_{AB}(\gamma_{1+}) = \dfrac{\partial \varphi_{AB}(\gamma_{1+})}{\partial u_{out}} \\ A_{AD}(\gamma_{1+}) = \dfrac{\partial \varphi_{AD}(\gamma_{1+})}{\partial u_{out}} \\ A_{DC}(\gamma_{1+}) = \dfrac{\partial \varphi_{DC}(\gamma_{1+})}{\partial u_{out}} \end{cases} \tag{77}$$

$$A_\varphi(\gamma_2) = \begin{cases} A_{AB}(\gamma_2) = \dfrac{\partial \varphi_{AB}(\gamma_2)}{\partial u_{out}} \\ A_{AD}(\gamma_2) = \dfrac{\partial \varphi_{AD}(\gamma_2)}{\partial u_{out}} \\ A_{DC}(\gamma_2) = \dfrac{\partial \varphi_{DC}(\gamma_2)}{\partial u_{out}} \end{cases} \tag{78}$$

$$A_\varphi(\lambda_{1+}) = \begin{cases} A_{AB}(\lambda_{1+}) = \dfrac{\partial \varphi_{AB}(\lambda_{1+})}{\partial u_{out}} \\ A_{AD}(\lambda_{1+}) = \dfrac{\partial \varphi_{AD}(\lambda_{1+})}{\partial u_{out}} \\ A_{DC}(\lambda_{1+}) = \dfrac{\partial \varphi_{DC}(\lambda_{1+})}{\partial u_{out}} \end{cases} \tag{79}$$

TABLE 2

Small Signal Gains for Operation on the MCT
MCT Small Signal Gains

| | |
|---|---|
| $A_{AB}(\gamma_{1+})$ | $\dfrac{-2U_{OUT}}{\sqrt{(1-M^2-U_{OUT}^2)(M^2+U_{OUT}^2)}}$ |
| $A_{AD}(\gamma_{1+})$ | $\dfrac{M}{M^2+U_{OUT}^2} + \dfrac{1}{2}A_{AB}(\gamma_{1+})$ |

TABLE 2-continued

Small Signal Gains for Operation on the MCT
MCT Small Signal Gains

| | |
|---|---|
| $A_{DC}(\gamma_{1+})$ | 0 |
| $A_{AB}(\gamma_2)$ | 0 |
| $A_{AD}(\gamma_2)$ | $\dfrac{1}{1 - U_{OUT}^2}$ |
| $A_{DC}(\gamma_2)$ | 0 |
| $A_{AB}(\lambda_{1+})$ | 0 |
| $A_{AD}(\lambda_{1+})$ | $\dfrac{M}{1 + M^2 U_{OUT}^2} + \dfrac{1}{2} A_{DC}(\lambda_{1+})$ |
| $A_{DC}(\lambda_{1+})$ | $\dfrac{-2 U_{OUT}}{\sqrt{\left(1 - \left(\dfrac{1}{M}\right)^2 - U_{OUT}^2\right)\left(\left(\dfrac{1}{M}\right)^2 + U_{OUT}^2\right)}}$ | results in nine gain terms. In (77)-(79) the partial derivatives of each control angle with respect to the output command are taken assuming that the control angle is on the trajectory given, with the results summarized in Table 2 above.

Using (77)-(79), piecewise linear gains are defined for each of the three control angles depending on converter operating point, $$A_{AB} = \begin{cases} M \leq 1 \begin{cases} |U_{OUT}| \leq \sqrt{1 - M^2} : A_{AB}(\gamma_{1+}) \\ |U_{OUT}| \geq \sqrt{1 - M^2} : A_{AB}(\gamma_2) \end{cases} \\ M \geq 1 \begin{cases} |U_{OUT}| \leq \sqrt{1 - \left(\dfrac{1}{M}\right)^2} : A_{AB}(\lambda_{1+}) \\ |U_{OUT}| \leq \sqrt{1 - \left(\dfrac{1}{M}\right)^2} : A_{AB}(\gamma_2) \end{cases} \end{cases} \quad (80)$$

$$A_{AD} = \begin{cases} M \leq 1 \begin{cases} |U_{OUT}| \leq \sqrt{1 - M^2} : A_{AD}(\gamma_{1+}) \\ |U_{OUT}| \geq \sqrt{1 - M^2} : A_{AD}(\gamma_2) \end{cases} \\ M \geq 1 \begin{cases} |U_{OUT}| \leq \sqrt{1 - \left(\dfrac{1}{M}\right)^2} : A_{AD}(\lambda_{1+}) \\ |U_{OUT}| \leq \sqrt{1 - \left(\dfrac{1}{M}\right)^2} : A_{AD}(\gamma_2) \end{cases} \end{cases} \quad (81)$$

$$A_{DC} = \begin{cases} M \leq 1 \begin{cases} |U_{OUT}| \leq \sqrt{1 - M^2} : A_{DC}(\gamma_{1+}) \\ |U_{OUT}| \geq \sqrt{1 - M^2} : A_{DC}(\gamma_2) \end{cases} \\ M \geq 1 \begin{cases} |U_{OUT}| \leq \sqrt{1 - \left(\dfrac{1}{M}\right)^2} : A_{DC}(\lambda_{1+}) \\ |U_{OUT}| \leq \sqrt{1 - \left(\dfrac{1}{M}\right)^2} : A_{DC}(\gamma_2) \end{cases} \end{cases} \quad (82)$$

Using these three gains relating each control angle to the output command, a final set of transfer functions is assembled to relate output command variations directly to output current variations using equations (63)-(66), $$\tilde{i}_{OUT} = \tilde{\varphi}_{ab} i_{OUT}^{AB} + \tilde{\varphi}_{ad} i_{OUT}^{AD} + \tilde{\varphi}_{dc} i_{OUT}^{DC} \quad (83)$$
$$= \tilde{u}_{out} A_{AB} i_{OUT}^{AB} + \tilde{u}_{out} A_{AD} i_{OUT}^{AD} + \tilde{u}_{out} A_{DC} i_{OUT}^{DC}$$
$$= \tilde{u}_{out} (A_{AB} i_{OUT}^{AB} + A_{AD} i_{OUT}^{AD} + A_{DC} i_{OUT}^{DC}).$$

$$H_{i_{out}}(s) = \frac{\tilde{i}_{OUT}}{\tilde{u}_{out}} = A_{AB} i_{OUT}^{AB} + A_{AD} i_{OUT}^{AD} + A_{DC} i_{OUT}^{DC}. \quad (84)$$

Equation (84) is the desired result, as it allows control of the DABSRC using an output command variable. Derivation of a transfer function useful for feedback control of the DABSRC using an input command variable follows the same steps as above, with all output quantities replaced by the equivalent input quantity.

Mathematically the gains seen in Table 2 present a problem at the point where the $\gamma_{1+}$ and $\gamma_2$ trajectories touch for M<1 and at the point where the $\lambda_{1+}$ and $\gamma_2$ trajectories touch for M>1. When these points are approached from lower magnitude output command towards higher magnitude power commands, the MCT begins to run parallel to contours of constant output command. At these points the small signal MCT gain reaches an infinite value, requiring an infinite change in control angle to achieve a change in output variable. The same phenomenon occurs at both the maximum and minimum output commands, for a similar reason. Although mathematically real and understandable, the effect is mitigated in a real system due to a number of non-idealities. The main consequence of this effect is that simulations must avoid these points in order to avoid non-finite transfer functions.

Figure 14:
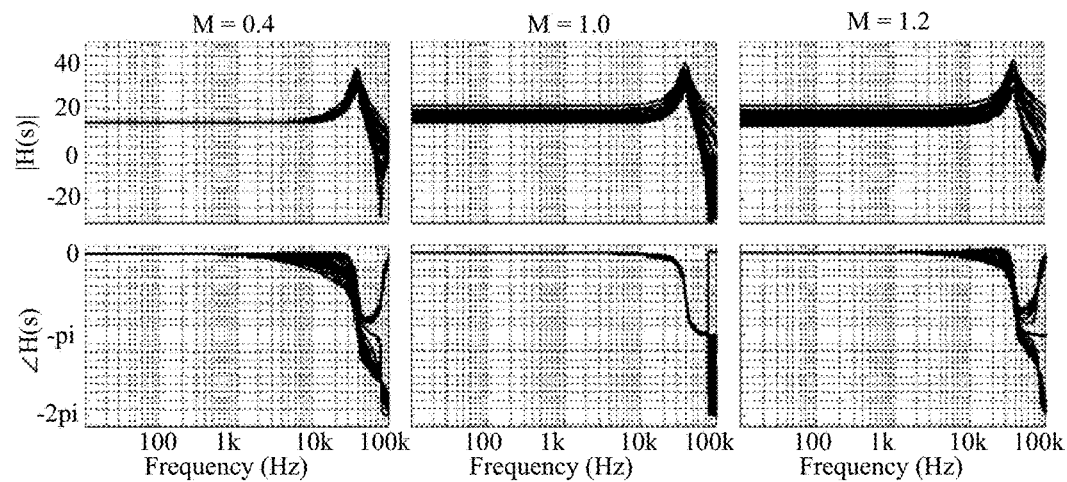
FIG. 14 depicts output command to output current transfer functions plotted for a sweep from 90% reverse power to 90% forward power.

FIG. 14 depicts output command to output current transfer functions plotted for a sweep from 90% reverse power to 90% forward power. Three different conversion ratios are shown, from left to right M=0.4 step down, M=1 unity conversion ratio, and M=1.2 step up conversion ratio. In FIG. 14, (84) is plotted for three separate conversion ratios, M=0.4, M=1.0, and M=1.2. For each conversion ratio, the output current command has been swept from 90% of the full possible reverse current to 90% of the full possible forward current. In each case, output current commands which are near the points of infinite small signal MCT gain and at a lower magnitude output level are shifted to lower powers such that there is a 3% of maximum output current buffer around these regions on the lower magnitude current side. With these modifications, FIG. 14 avoids including any anomalous operating points.

All plots exhibit a large spike in gain at a frequency equal to the switching frequency of the converter minus the tank resonant frequency as expected. Although located at the same frequency for all operating points, the associated phase drop can be seen to vary across both conversion ratio as well as output command. In addition to slight phase differences between operating points, a large variation in gain is seen in all plots, with both the low frequency gain as well as the resonant spike gain varying across both conversion ratio and output command.

Figure 15:
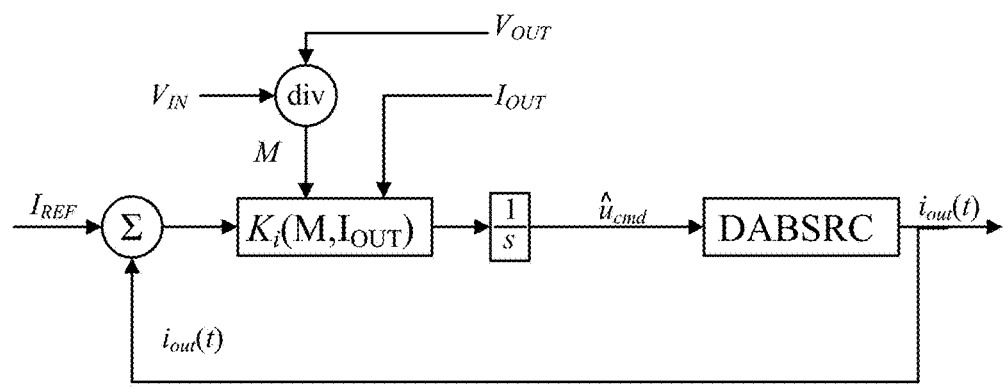
FIG. 15 is a schematic block diagram of a gain scheduled feedback loop for output current control.

Due to the variability in both gain and phase of the control to output transfer function (84) demonstrated in FIG. 14 a fixed controller is poorly suited for control of the DABSRC when operated over a wide range of power levels and conversion ratios. To overcome this, a gain scheduled feedback controller is used. Fortunately the general shape of the bode plots in FIG. 14 remain fairly constant at frequencies below the switching frequency of the converter. This allows an integral controller with an operating point dependent gain to be used, as seen in FIG. 15. FIG. 15 a schematic block diagram of a gain scheduled feedback loop for output current control. Three different conversion ratios are shown, from left to right M=0.4 step down, M=1 unity conversion ratio, and M=1.2 step up conversion ratio.

For applications which require a consistent response from the converter regardless of operating point, a gain schedule may be built which maintains a constant bandwidth regardless of operating points. With this approach, the worst case operating point is the operating point at which the lowest possible bandwidth is achieved while still maintaining phase margin $P_M \geq P_{M\_MIN}$ and gain margin $G_{-M} \geq G_{M\_MIN}$ for stability. At all other operating points, integral gains $K_i$ are solved for which maintain the bandwidth found at the worst case point, $BW_{SET}$. Although providing consistent response characteristics, this type of gain schedule results in larger than needed gain and phase margins over much of the operating space and a lower bandwidth than necessary at most operating points.

In contrast to a gain schedule which maintains a constant bandwidth, a gain schedule may be derived which maintains a fixed phase or gain margin across all operating points. With this type of a gain schedule, the maximum possible bandwidth at all points can be achieved while maintaining constant stability margins. While providing higher bandwidths than the previous approach, this type of controller results in a less consistent response characteristic as operating point is varied. For either gain scheduling approach, a script may be used to calculate a gain table based on scheduling variables $U_{CMD}$ and M. This two dimensional table is then referenced into using the converter operating point in order to select the proper gain.

Contrasting these two gain scheduled controllers is a fixed gain approach. In this case a single gain is solved to maintain stability at the worst case operating point. At this single worst case operating point, all three approaches provide the same response. As operating point is varied, a fixed gain controller results in excessive stability margins leading to low bandwidth responses, as well as an inconsistent response characteristic.

Figure 16:
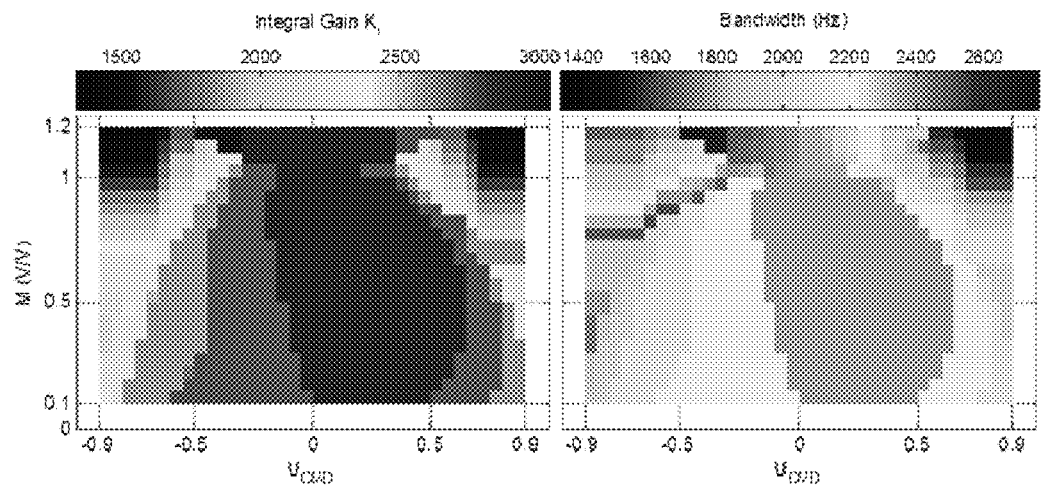
FIG. 16 depicts Gain Schedule for a $V_{IN}$=500 V DABSRC derived for maximum converter bandwidth at all points.
Figure 17:
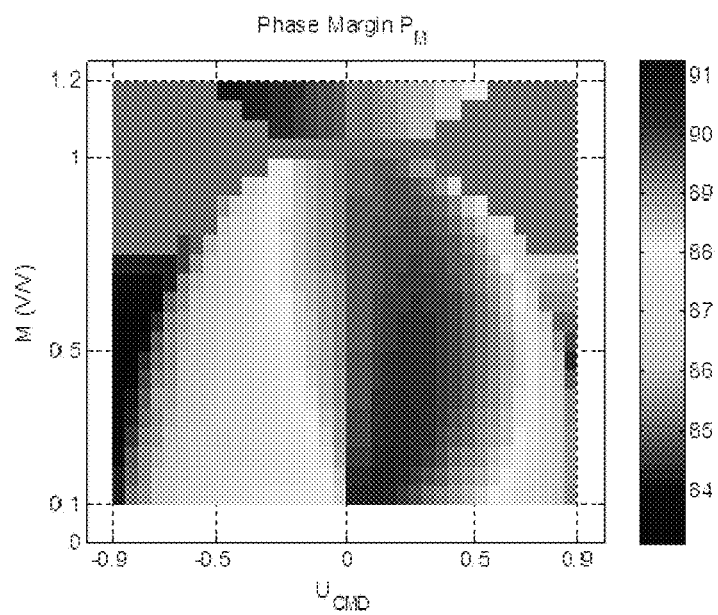
FIG. 17 depicts Gain Schedule phase margin for a $V_{IN}$=500 V DABSRC derived for maximum converter bandwidth at all points.

For the DABSRC design described above in Section III.2, a gain schedule is derived which provides the maximum possible bandwidth at all operating points. Stability is ensured by requiring a phase margin $P_M \geq 55°$ and a gain margin $G_M \geq 10$ dB. The input voltage is again assumed to be $V_{IN}$=500 V, with conversion ratios between M=0.1 and M=1.2, corresponding to output voltages between $V_{OUT}$=50 V and $V_{OUT}$=600 V. FIG. 16 depicts Gain Schedule for a $V_{IN}$=500 V DABSRC derived for maximum converter bandwidth at all points. Integral gains (left) result in converter bandwidths (right). In FIG. 16 the resulting gains and bandwidths are seen. Integral gains vary between 1338 units and 3039 units, achieving a maximum bandwidth of 2.76 kHz. The worst case operating point, found at a conversion ratio of M=1.2 and $U_{CMD}$=0.66 has a bandwidth of 1.33 kHz with an integral gain of 1338 units. A fixed gain implementation would use the same integral gain as found at this point, while a fixed bandwidth gain schedule implementation would result in a converter with a bandwidth of 1.33 kHz at all points. FIG. 17 depicts Gain Schedule phase margin for a $V_{IN}$=500 V DABSRC derived for maximum converter bandwidth at all points. In FIG. 17 the phase margins for a converter using the maximum bandwidth gain schedule controller are plotted. A constant gain margin of 10 dB is maintained throughout the operating space. The gain margin is the constraint limiting the controller gain while phase margins much higher than needed are seen, even though the controller results in the maximum bandwidth at all points. A more complex controller would be able to solve this issue, but is unneeded either to prove the suitability of the approach or for the application focused on here.

Although small signal stability is maintained at all points by the gain schedule designed above, a large signal analysis of stability with this approach has not been performed.

IV.3 Multi-Mode Control

In order to add the ability to regulate output voltage and output power to the current controlled DABSRC, multi-mode control is used. Not only does this extension provide the needed voltage and power regulation, but it also allows for the series and parallel connection of multiple converters into a single module with natural power sharing. This approach uses a limit curve for each of the three control variables (power, voltage and current) in order to achieve the desired results.

Figure 18:
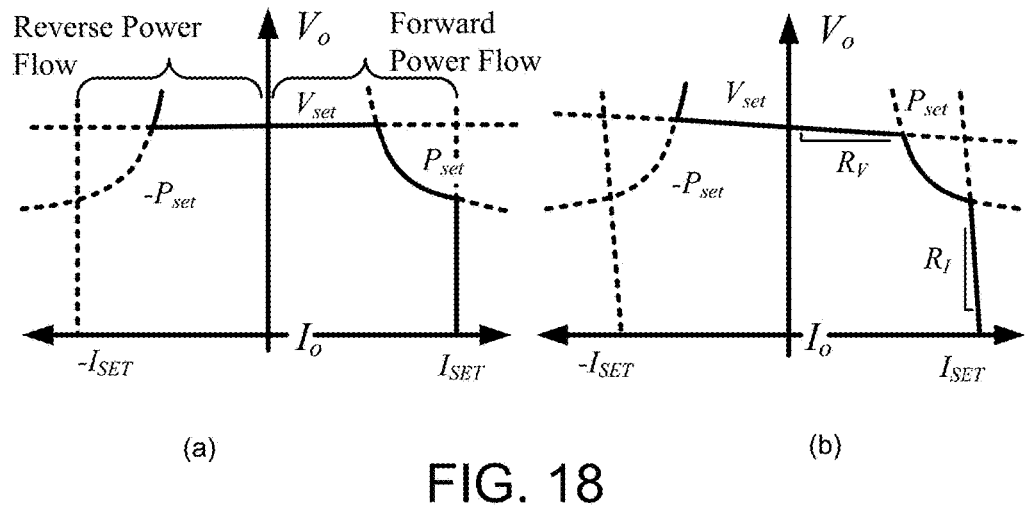
FIG. 18 depicts (a) multi-mode control output plane detailing of power, current, and voltage limit curves for a bidirectional converter, and (b) modified limit curves to enable inherent power, voltage, and current sharing.

An apparatus 7900 for multi-mode control of a converter is presented. The apparatus may be implemented with the converter 10 depicted in FIG. 1 and may include a main power flow controller 215 and/or master controller 295 implementing the multi-mode control apparatus. FIG. 18(a) depicts a multi-mode control output plane detailing of power, current, and voltage limit curves for a bidirectional converter. FIG. 18(b) depicts a modified limit curves to enable inherent power, voltage, and current sharing. To visualize the interaction of the three limit curves, the output plane of the converter is typically drawn of converter output current and voltage as seen in FIG. 18(a). In forward power, the converter regulates below the $V_{SET}$ line, while in reverse power the converter regulates above this line. The combination of these areas makes up the shaded portion of the limit line curves in FIG. 18, and defines the possible operating points for a converter dependent on the output load.

Figure 79:
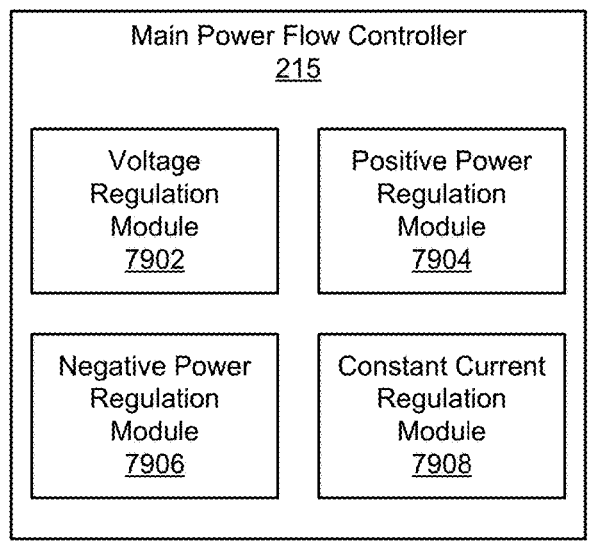
FIG. 79 is a schematic block diagram of one embodiment of a multi-mode control apparatus in accordance with one embodiment of the invention.

FIG. 79 is a schematic block diagram of one embodiment of a multi-mode control apparatus in accordance with one embodiment of the invention, which, in one embodiment, may be included with the main power flow controller 215. In one embodiment, the multi-mode control apparatus 7900 includes a voltage regulation module 7902 that controls output voltage of a DC to DC converter to an output voltage reference $V_{SET}$, which may be referred to as simply the voltage reference $V_{SET}$, over an output current range between an operating condition where output power of the converter reaches a positive power reference $P_{SET}$, or simply power reference $P_{SET}$, and output power of the converter reaches a negative power reference $P_{SET}$. The converter is a bidirectional converter. In one embodiment, the converter is a resonant power converter 100. In another embodiment, the resonant power converter includes at least one stage of a DABSRC. As depicted in FIG. 18(a), the voltage regulation module may regulate the output voltage $V_{OUT}$ to a value represented by the horizontal line $V_{SET}$.

The multi-mode control apparatus 7900 may also include a positive power regulation module 7904 that controls output power $P_{OUT}$ of the converter to the positive power reference $P_{SET}$ over a positive constant power range between the output voltage of the converter being at the output voltage reference $V_{SET}$ and output current $I_{OUT}$ of the converter being at a positive output current reference $I_{SET}$, which may be described simply as the current reference $I_{SET}$. As depicted in FIG. 18(a), the positive power module may regulate output power $P_{OUT}$ to the curved line by $P_{SET}$ between $V_{SET}$ and $I_{SET}$.

Figure 43:
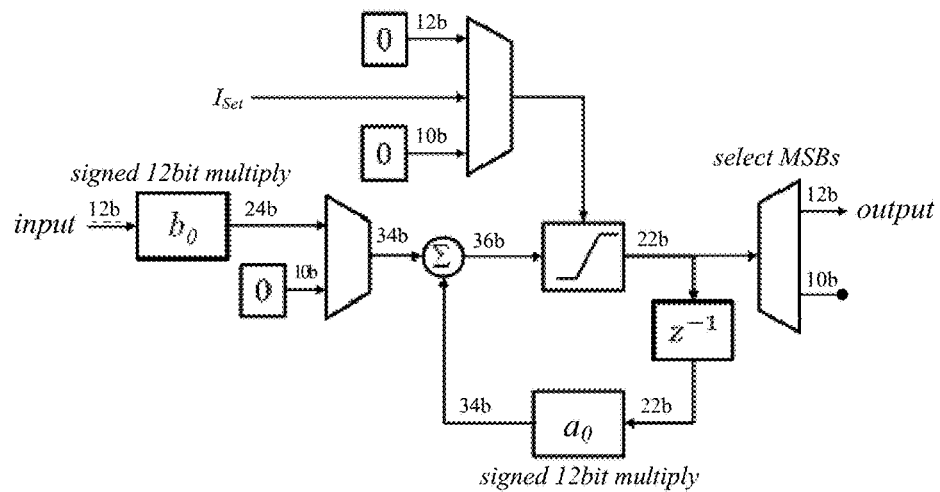
FIG. 43 is a schematic block diagram of a single pole controller implementation for a cascaded two pole MMC controller.
Figure 44:
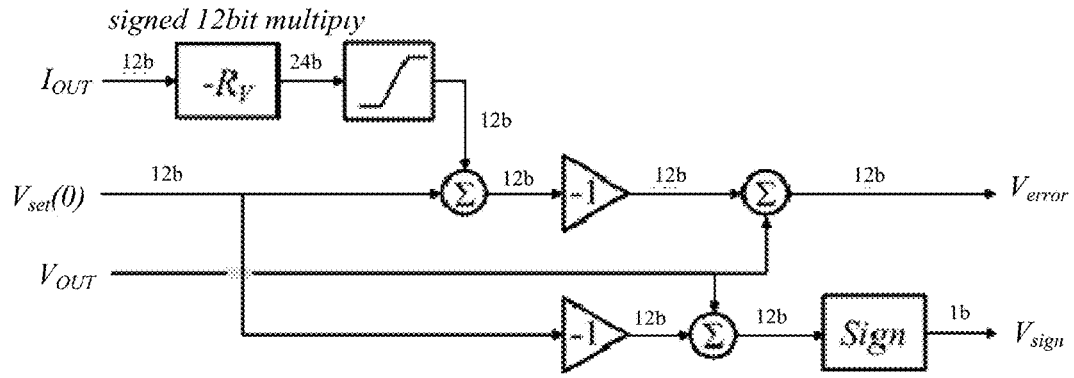
FIG. 44 is a schematic block diagram of one embodiment of a MMC voltage controller error generation including droop resistance.
Figure 46:
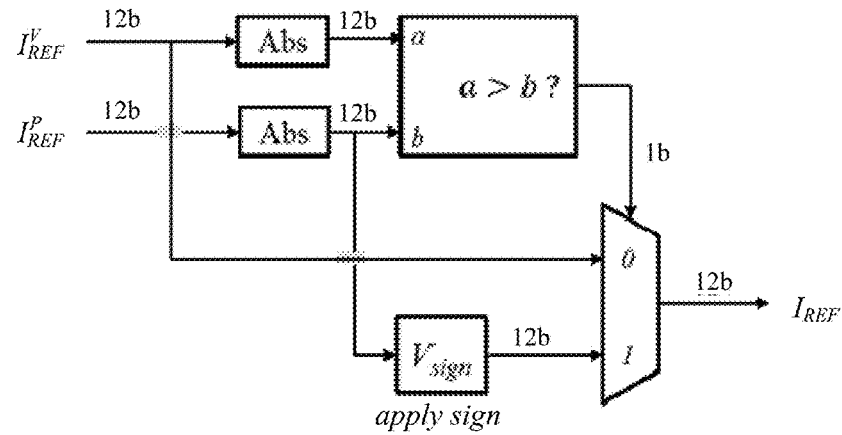
FIG. 46 is a schematic block diagram of one embodiment of current reference selection logic for MMC.

The multi-mode control apparatus 7900 may also include a negative power regulation module 7906 that controls output power $P_{OUT}$ of the converter to the negative power reference $-P_{SET}$ over a constant power range between output voltage $V_{OUT}$ of the converter being at the output voltage reference $V_{SET}$ and a maximum negative power limit of the converter. For example, the negative power reference $-P_{SET}$ may be set lower than the maximum negative power limit of the converter. As depicted in FIG. 18(a), the negative power module may regulate output power $P_{OUT}$ to the curved line by $-P_{SET}$ and increasing upward to a voltage higher than the voltage setpoint $V_{SET}$. In one embodiment, polarity of power flow (positive or negative) is determined by comparing the measured output voltage $V_{OUT}$ to the voltage set point $V_{SET}(0)$. If the measured voltage is greater than the set point, power flow is positive. If the measured voltage is below the set point, the power flow is negative. A signal determining power flow polarity is shown in FIG. 44, $V_{sign}$. The current limit is set by using $I_{SET}$ as the positive and negative internal limit for the voltage and power loop compensators, as shown in FIG. 43. This way, only the voltage and power loop output current references need to be compared and inherently have the current limit built in, and the polarity is already correct for positive and negative power flow. The final current reference used is found as shown in FIG. 46. The minimum of the absolute value of the current references from the voltage and power loops determines which loop to use, then the actual current references from the voltage loop (with sign) or the power loop (with sign added in) are used.

The multi-mode control apparatus 7900 may also include a constant current module 7908 that limits output current to a positive output current reference $I_{SET}$ in a range between a minimum output voltage and output power $P_{OUT}$ of the converter reaching the positive power reference $P_{SET}$. As depicted in FIG. 18(a), the vertical line on the right side next to $I_{SET}$ may represent the constant current module 7908 limiting the current to $I_{SET}$. In one embodiment, the minimum output voltage is zero. In another embodiment, the minimum output voltage may be a different value, such as a minimum output voltage that can be controlled or maintained by the converter 10 and controls. One of skill in the art will recognize other appropriate minimum output voltages.

Note that an input, i.e. 141 and an output, i.e. 143 may be a matter of perspective. For example, the input 141 may be connected to a voltage source and/or a load and the output may be connected to a load that is capable of syncing and sourcing current so that in one mode the voltage source provides power to the load and in another mode the load provides power to a load connected to the input 141 of the converter 10. In this embodiment, the input and output may switch when the load provides power to the converter 10. In this condition, the input and output of the converter 10 may be reversed and FIG. 18(a) may apply to the new input and output. In another embodiment, when power flows toward the input 141, the converter output power $P_{OUT}$ may follow a trajectory similar to the right side of FIG. 18(a) and the apparatus 7900 may include a negative current setpoint $-I_{SET}$. For example, the constant current module 7908 may further limit the output current $I_{OUT}$ to a negative output current reference $-I_{SET}$ in a range between a minimum output voltage and output power of the converter reaching the negative power reference $-P_{SET}$. For example, the constant current module 7908 may limit the output current $I_{OUT}$ to a negative output current reference $-I_{SET}$ as shown in FIG. 18(a) where the converter 10 may follow the path on the left end of the control diagram of FIG. 18(a).

Figure 19:
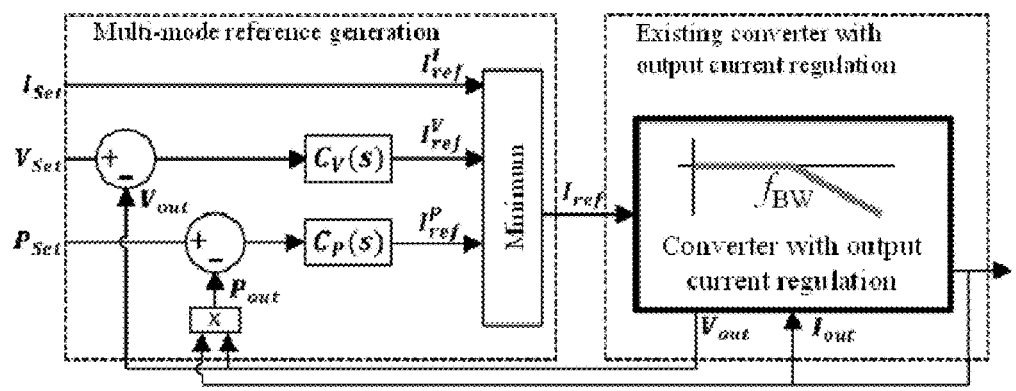
FIG. 19 is a schematic block diagram of one embodiment of a multi-mode control ("MMC") control loops showing a current regulated converter with an internal current feedback loop, as well as a power and voltage outer feedback loops.

In one embodiment, the constant current module 7908 includes a current feedback control loop that limits output current $I_{OUT}$ to below the positive output current reference $I_{SET}$. In another embodiment, the positive power regulation module 7904, the negative power regulation module 7906, and the voltage regulation module 7902 include feedback control loops and the current feedback control loop is an inner feedback control loop and the feedback control loops of the positive power regulation module 7904, the negative power regulation module 7906, and the voltage regulation module 7902 make up an outer feedback loop. The current feedback loop is discussed below. One implementation of the control loops is depicted in FIG. 19. FIG. 19 is a schematic block diagram of one embodiment of a multi-mode control ("MMC") control loops showing a current regulated converter with an internal current feedback loop, as well as a power and voltage outer feedback loops. Feedback controllers $C_V(s)$ and $C_P(s)$ provide improved voltage and power regulation respectively.

Figure 33:
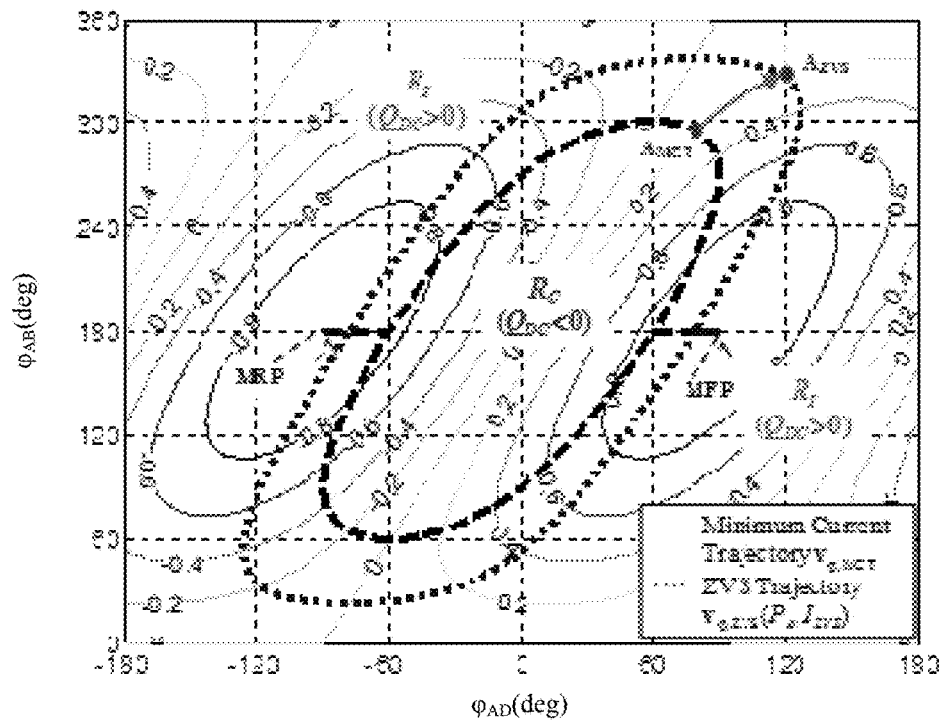
FIG. 33 depicts one example of normalized active power contours on the $\phi_{DC}=180°$ plane; the minimum current trajectory and a particular ZVS trajectory are shown for M=0.5, together with two corresponding operating points $A_{MCT}$.

In one embodiment, the constant current feedback loop includes compensation implemented using a gain scheduled feedback controller, as described above in Section IV.2 and may be configured as shown in FIG. 15. The gain scheduled feedback controller includes one or more output control signals that vary over a plurality of control regions. The gain scheduled feedback controller implements a different compensation equation for each control region. In another embodiment, the converter 10 includes one or more phase shift modulators 230 controlled by the one or more output control signals 280, where the one or more output control signals 280 control according to a MCT control technique. The MCT substantially minimizing circulating current within the converter 10. As used herein, substantially minimizing circulating current within the converter 10 includes following an MCT trajectory or following a trajectory that is close to the MCT. For example, substantially minimizing circulating current within the converter 10 may include operating the converter 10 as depicted in FIG. 33 or may include operating the converter 10 so that one or more switching legs follow an MCT or a trajectory as depicted in FIG. 33. One of skill in the art will recognize other ways to substantially minimize circulating current. In another embodiment, the gain scheduled feedback controller maintains the converter in a ZVS region while minimizing circulating current by following a trajectory a fixed distance from an MCT, such as depicted in FIG. 33.

In one embodiment, the output voltage reference $V_{SET}$ varies with output current $I_{OUT}$ such that the output voltage reference $V_{SET}$ decreases as output current $I_{OUT}$ increases. In another embodiment, the positive output current reference $I_{SET}$ varies with output voltage $V_{OUT}$ such that the positive output current reference $I_{SET}$, which may also be referred to herein as the converter current reference, decreases as output voltage $V_{OUT}$ increases. Operation of a module along a current limit curve may result in converter power sharing as long as all converters in a module are connected in parallel. Series operation of current limited converters may prove problematic in certain embodiments, as this leaves each individual converter with an uncontrolled output voltage. A simple approach with no communication between modules is to use droop control by adding a slope to the current limit line (FIG. 18(b)). Representing this slope with resistance R/the converter current reference $I_{set}$ is written as a function of the converter output voltage $V_{OUT}$, $$I_{Set}(V_{OUT}) = I_{Set}(0) - \frac{V_{OUT}}{R_I}. \tag{85}$$

When a module made up of series connected converters is operated in current regulation mode, the output voltage of any two converters may be mismatched by as much as the full module voltage, such that a single converter processes the full module power. The addition of $R_1$ reduces this theoretical maximum converter voltage offset when operated in series, $\|\Delta V_S\|$, to $$\|\Delta V_S\| = R_1 \Delta I_\epsilon, \qquad (86)$$

where $\Delta I_\epsilon$ represents the maximum current sensing error between converters.

Operation along a voltage limit line achieves inherent power sharing in modules made up of series connected converters, while parallel connected converters in a voltage regulating module are left with an uncontrolled output current. This issue is solved with the introduction of a slope on the voltage limit line (FIG. 18(b)), represented as $R_V$. The introduction of this slope allows the converter output voltage reference $V_{Set}$ to be written as a function of the converter output current $I_{OUT}$, $$V_{set}(I_O) = V_{Set}(0) - I_{OUT} R_V \qquad (87)$$

Without $R_V$ parallel connected converters regulating voltage may have an output current offset equal to the full current processed by the module. $R_V$ reduces this theoretical maximum converter current difference when operated in parallel, $\|\Delta I_P\|$, to $$\|\Delta I_P\| = \frac{1}{R_V} \Delta V_\varepsilon. \qquad (88)$$

When operating on the power limit curve, automatic power balance of both parallel and series converters are achieved naturally. As all interconnected converters in a single module share a common voltage (parallel connection) or a common current (series connection), all converters in that module regulate to the same operating point when given equal power commands. For power limit control the maximum difference in converter power processing is simply equal to the converter power sensing accuracy.

In a practical application, the voltage mode slope $R_V$ is a small value (ideally 0Ω), while the current mode slope $R_1$ is a large value (ideally infinite).

To simplify the extension of MMC to bidirectional converters it is assumed that symmetrical limit curves are used, such that the maximum forward current and power are the same as the maximum reverse current and power. The converter output voltage is assumed to remain positive.

FIG. 18 depicts multi-mode control loops showing a current regulated converter with an internal current feedback loop, as well as a power and voltage outer feedback loops. Feedback controllers $C_V(s)$ and $C_P(s)$ provide improved voltage and power regulation respectively. Converters that make up a module are assumed to have a well-designed internal current regulation loop already implemented. This internal feedback loop provides output current regulation with a high, constant bandwidth, which has been designed to meet all system specifications. The existence of this internal feedback loop greatly simplifies the design of the outer voltage and power feedback loops. Each of these loops need only act on the well behaved inner loop, which in many cases can be represented as a single pole system. A block diagram for this setup is seen in FIG. 19. MMC follows by generating an appropriate current reference for each mode. The operation mode is selected by determining the minimum of the absolute values of the three references. The corresponding mode is the one that regulates.

While operating in current regulation mode, the appropriate converter current reference is simply $I_{Set}(V_{OUT})$, $$I_{Ref}^i = I_{Set}(V_{OUT}) \qquad (89)$$

No additional compensator is needed, as the converter internal feedback loop already exists.

Using (87) and (89) for voltage and current reference points, controllers $C_V(s)$ and $C_P(s)$ in FIG. 19 can be derived in order to complete MMC of the DABSRC either as a stand-alone converter, or as a single converter in a module of multiple converters with arbitrary output topology.

The error signal for voltage regulation is the difference between the desired $V_{Set}$ value and the measured output voltage, $V_{OUT}$. The addition of a voltage regulating compensator, $C_V(s)$ results in a current reference for voltage regulation of $$I_{Ref}^v = C_V(V_{Set} - V_{OUT}). \qquad (90)$$

Figure 20:
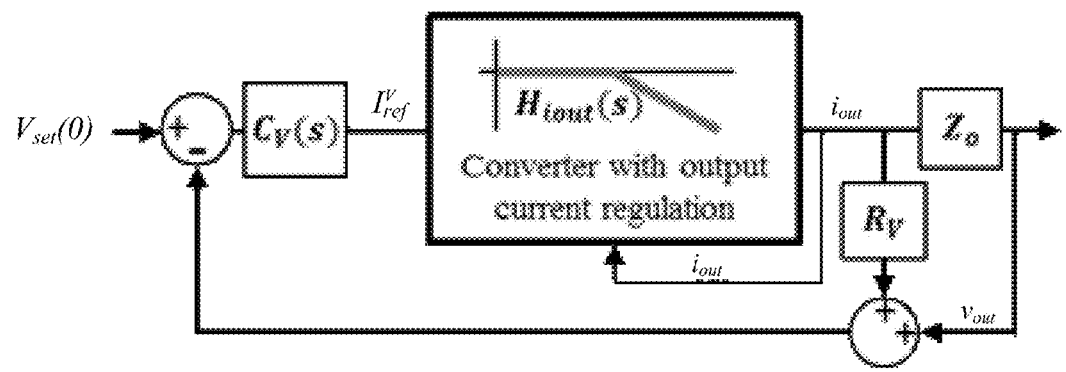
FIG. 20 depicts a voltage regulation loop for multi-mode control of the DABSRC.

FIG. 20 is a schematic block diagram of a voltage regulation loop for multi-mode control of the DABSRC. The voltage regulation loop is dependent on the converter output impedance, and can be drawn as seen in FIG. 20. The loop gain $T_V(s)$ can be written as $$T_V(s) = C_V H_{iout}(Z_O + R_V). \qquad (91)$$

Feedback control of a current regulated converter along a power limit line is complicated by the nonlinear relation between output current and output power $P_{OUT}$. Although a number of methods exist for dealing with nonlinear feedback loops, one solution is to simply linearize the element. For the system in question the resulting linearized output current to output power gain $K_V$ becomes dependent on the three set points such that it exists within a range $$2Z_o \frac{P_{Set}(0)}{V_{Set}(0)} \leq K_V \leq 2Z_o I_{Set}(0). \qquad (92)$$

In general this is not ideal as the power regulation controller must be designed at the worst case point operating point. With this highly variable gain in the feedback loop, this will likely require an overly conservative controller design.

Figure 21:
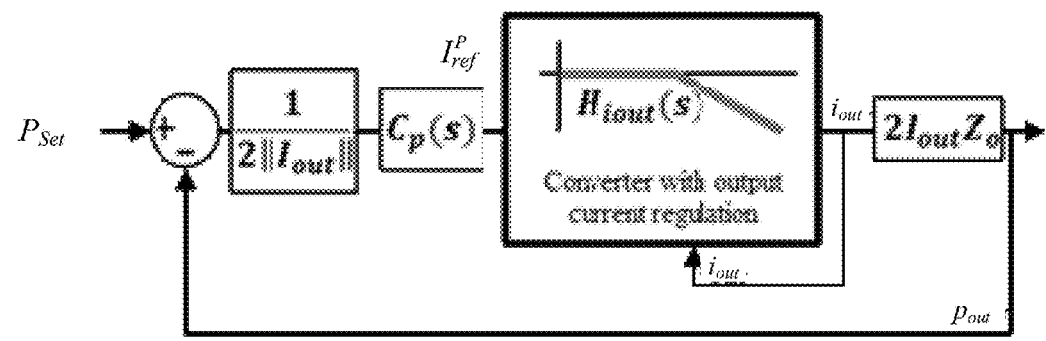
FIG. 21 is a schematic block diagram of a linearized power regulation loop for multi-mode control of the DABSRC.

FIG. 21 is a schematic block diagram of a linearized power regulation loop for multi-mode control of the DABSRC. In situations where the three limit lines change very little, this worst case controller may not be a bad choice. In other situations, a better option is to pre-scale the control effort in order to remove this set point dependence. This simple form of gain-scheduling can be achieved by dividing the controller gain by twice the output current magnitude, as seen in FIG. 21. This solution is easily implemented in a digital controller, and so is the preferred approach.

The loop gain for this setup takes the form $$T_P(s) = C_P H_{iout} Z_O. \qquad (93)$$

Assuming that $R_V$ is small in comparison with the worst case output impedance, both the voltage loop and the power loop gain are the same if the gain-schedule method previously discussed is adopted for power control. In this case only one controller needs to be derived.

Only a voltage controller is derived as it was shown above that the same controller may be used for both voltage and power regulation assuming small $R_V$. This controller is then used for the power control loop as well without further modification.

The voltage regulator is designed to provide a bandwidth of 2 kHz under the worst case load using a second order controller. Assuming an output capacitance of this results in $f_{z1}$=728 Hz, $f_{z2}$=1.15 kHz, and $A_V$=0.025, with $f_P$ set to a suitably high frequency of 10 $f_{z1}$. The controller is then converted into a digital form using a bilinear transform with frequency pre-warping at the desired crossover frequency of 2 kHz. The resulting Z-domain controller takes the form $$C(z) = 2.17 \times 10^{-2} \frac{(z - 0.96)(z - 0.93)}{(z - 1.00)(z - 0.63)}. \tag{94}$$

The controller in (94) is designed to achieve a bandwidth of approximately 10 times less than the current regulation internal loop. When used with the gain scheduled approach seen in Section VI.2 discussing a gain scheduled feedback controller this approach allows the external voltage and power loops to achieve high bandwidth as well.

V. Zero Voltage Switching Techniques for the DABSRC

A large variety of auxiliary circuitry aimed at ensuring soft-switching have been developed. These circuits can for the most part be grouped into two categories: passive (commonly using magnetizing inductance or shunt circuitry methods) and active (using active switching networks or advanced control schemes). Passive schemes have the benefit of little to no additional control complexity, while active auxiliary circuitry allows feedback and/or feed forward control of soft-switching assistance. This additional control freedom can translate to lower losses and higher system efficiency at the cost of increased control complexity.

Five different ZVS methods warrant consideration for the DABSRC. These include modifying tank magnetics in order to increase magnetizing inductance, two different forms of auxiliary leg assistance, inductively linking converter modules, and modifying the MCT in order to extend the natural ZVS regions of the converter.

Modifying tank magnetics requires reducing the magnetizing inductance of the isolation transformer in FIG. 2B. This reduction in magnetizing inductance causes extra circulating currents in the resonant tank which have the effect of increasing the ZVS range for some switches in the DABSRC. This technique may be applied in order to provide ZVS assistance to either the input bridge or the output bridge of the DABSRC for operation around a specific operating point but comes at the cost of increased tank currents and therefore increased conduction losses. The need to design for a specific operation point makes this approach a poor choice for systems which require operation over a wide range of power levels and conversion ratios. Additionally, the larger size and complexity of the tank transformer required for this approach makes it unattractive for a high power high density system.

Auxiliary legs used for ZVS assistance may be controlled in one of two ways. The first involves PWM control of the inductively linked auxiliary half-bridge switches in order to store energy needed for ZVS transition of the main switches. A resonant transition then discharges the inductor current into the main switch node in order to achieve ZVS. By relying on the resonant transfer of energy, this approach requires the main switch node capacitance to be well known. Due to the nonlinear nature of many switching devices output capacitances, this approach is suited only for converters which utilize relatively large additional switch node capacitance in order to slow down switching transitions. Additionally, this approach does not allow ZVS of the auxiliary switches turn on transition, and so is poorly suited for high voltage applications.

Similar to PWM control of auxiliary legs, phase shift modulated (PSM) control may also be used. This approach generates a trapezoidal current in the auxiliary inductor of sufficient magnitude to force ZVS of the main switch node. While larger RMS currents are required in the auxiliary inductor for this approach, its lack of dependence on a resonant transition makes it easier to control. In addition, ZVS transitions for all switching elements are achieved. For these reasons it is a more attractive option for ZVS assistance of higher voltage DABSRCs which do not employ extra switch node capacitance.

If multiple converters are operated together as a module, either the primary or secondary legs of two such converters may be inductively linked. The analysis of this approach is the same as for PSM auxiliary legs, with the added condition that both legs of the bridge being assisted will receive the same auxiliary current. Although this requirement may lead to excessive currents in one leg of each of the linked converters, it can be successfully employed when used in combination with other ZVS methods. One such approach which synergizes well is the use of modified MCTs.

In this chapter, the use of PSM auxiliary legs for ZVS assistance will be focused on first. This approach provides the most flexible ZVS assistance and does not lead to excessive conduction losses due to larger than needed current if controlled properly. A hybrid approach using inductively linked converters to provide primary side ZVS and modified MCTs for secondary side ZVS is described next.

V.1 PSM Leg ZVS Assistance Modeling

The phase shift modulated half-bridge (PSM-HB), also known as the auxiliary resonant pole ("ARP") is one type of active soft-switching assistance circuit specifically useful for maintaining zero voltage switching of half- and full-bridge switch networks. Analysis of this method focuses first on a single pair of half-bridge switch networks linked through an inductor. Although specifically focusing on PSM auxiliary legs, much of the same analysis is applicable to inductively linked converters.

Figure 22:
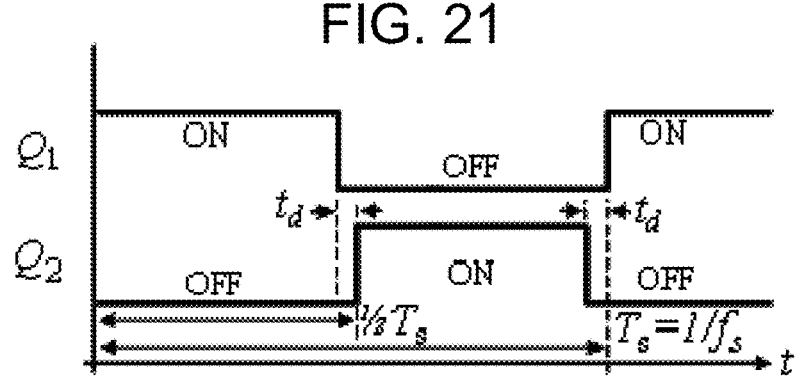
FIG. 22 depicts half-bridge switching where switches $Q_1$ and $Q_2$ are assumed to operate at a fixed frequency, $f_s$.

FIG. 22 depicts half-bridge switching where switches $Q_1$ and $Q_2$ are assumed to operate at a fixed frequency, $f_s$. $Q_1$ may be referred to as a first main switch and $Q_2$ may be referred to as a second main switch. Additionally, a duty cycle of d=0.5 is maintained, and a small dead time $t_d \ll T_s$ is used between switching transitions. Ensuring ZVS of a general MOSFET switching device requires that the voltage across the device reaches zero prior to device turn on. For switches in a half-bridge configuration driven as defined in FIG. 22, this requires that sufficient current be present during the dead-time between switching events such that the switch node capacitance can be fully discharged (for a lower switch) or charged (for an upper switch) before the next switching event. If natural switch node current of the converter $i_x(t)$ cannot accomplish this voltage commutation, an auxiliary half bridge connected in parallel with the first and coupled through an inductor (FIG. 23) can be used.

Figure 23:
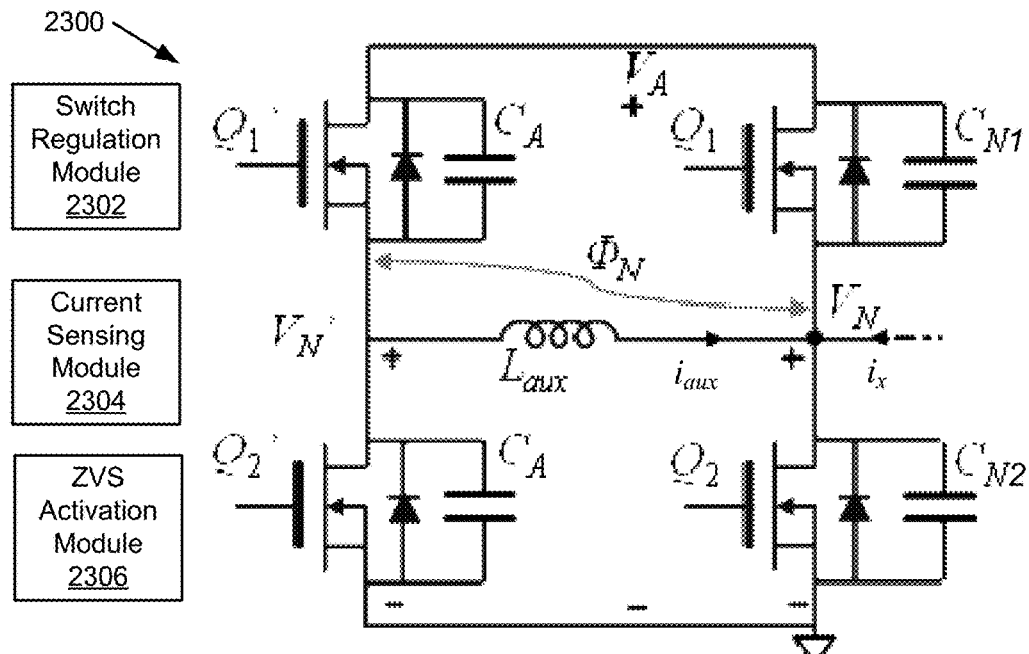
FIG. 23 is a schematic block diagram of one embodiment of a PSM half-bridge consisting of switches $Q_1'$ and $Q_2'$ connected to an existing converter half-bridge ($Q_1$ and $Q_2$) through auxiliary inductor $L_{aux}$ for active ZVS assistance of $Q_1$ and $Q_2$.

FIG. 23 is a schematic block diagram of one embodiment of a PSM half-bridge consisting of switches $Q_1'$ and $Q_2'$ connected to an existing converter half-bridge ($Q_1$ and $Q_2$) through auxiliary inductor $L_{aux}$ for active ZVS assistance of $Q_1$ and $Q_2$. $Q_1'$ may be referred to as a first auxiliary switch and $Q_2'$ may be referred to as a second auxiliary switch.

In one embodiment, the converter 10 may include an assisted ZVS apparatus 2300 with a first auxiliary switch $Q_1'$ connected to a positive connection of a switching leg of the converter 10. In FIG. 23, the positive connection point voltage is $V_A$. The switching leg includes a first main switch $Q_1$ and a second main switch $Q_2$ and the first and second main switches $Q_1$, $Q_2$ are connected at a main switch midpoint $V_N$.

The assisted ZVS apparatus 2300 includes a second auxiliary switch $Q_2'$ connected between a negative connection of the switching leg and the first auxiliary switch $Q_1'$, $Q_2'$, where a connection point between the first and second auxiliary switches $Q_2'$ is an auxiliary midpoint $V_N'$. The assisted ZVS apparatus 2300 includes an auxiliary inductor $L_{aux}$ connected between the auxiliary midpoint $V_N'$ and the main switch midpoint $V_N$. The main switch midpoint $V_N$ is also connected to elements of the converter 10 in addition to the first and second main switches $Q_1$ and $Q_2$ and the auxiliary inductor $L_{aux}$.

The first and second main power switches $Q_1$ and $Q_2$ turn on and off as part of operation of the converter 10 and the first main switch $Q_1$ includes a first capacitance $C_{N1}$ and the second main switch $Q_2$ includes a second capacitance $C_{N2}$. In one embodiment, the first capacitance $C_{N1}$ and second capacitance $C_{N2}$ may be referred to as $C_N$ and may be a same value. The assisted ZVS apparatus 2300 includes a switch regulation module 2302 that regulates switching of the first and second auxiliary switches $Q_1'$, $Q_2'$ to control current $i_{aux}$ in the auxiliary inductor $L_{aux}$. The auxiliary inductor $L_{aux}$ provides or removes charge from the first capacitance $C_{N1}$ and the second capacitance $C_{N2}$ to adjust voltage across the first main switch $Q_1$ and the second main switch $Q_2$ to induce zero voltage switching for the first and second main switches $Q_1$, $Q_2$.

In one embodiment, the first capacitance $C_{N1}$ is capacitance of the first main switch $Q_1$ and/or a capacitor connected in parallel with the first main switch $Q_1$. In addition, the second capacitance $C_{N1}$ is capacitance of the second main switch $Q_2$ and/or a capacitor connected in parallel with the second main switch $Q_2$. In another embodiment, the assisted ZVS apparatus 2300 includes a current sensing module 2304 that senses current $i_{aux}$ in the auxiliary inductor $L_{aux}$ and senses current $i_x$ in the connection between the elements of the converter 10 and the main switch midpoint $V_N$. where the switch regulation module 2302 uses current sensed by the current sensing module 2304 and switching states of the first and second main switches to regulate switching in the first and second auxiliary switches to adjust current in the auxiliary inductor to adjust voltage across the first and second main switches $Q_1$, $Q_2$ to achieve zero voltage switching.

Figure 24:
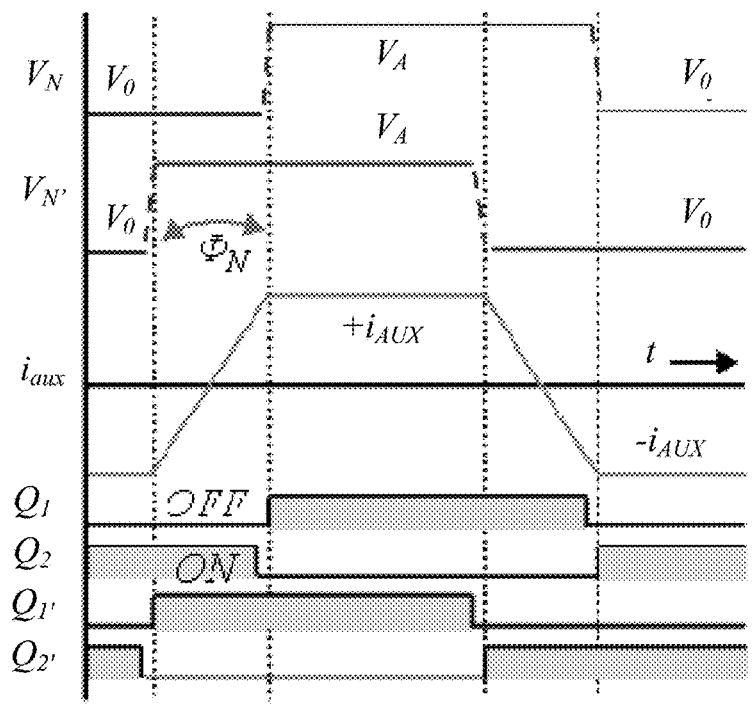

FIG. 24 depicts PSM-HB waveforms, showing ZVS assistance current flowing in the correct direction for ZVS at both $Q_1$ and $Q_2$ turn on. In one embodiment, the switching regulation module 2302 controls $i_{aux}$ in the auxiliary inductor $L_{aux}$ by controlling a phase angle $\Phi_N$ between a voltage transition at the auxiliary midpoint $V_N'$ and the main switch midpoint $V_N$. $\Phi_N$ is used to control the amount of ZVS assistance current, $i_{AUX}$. Assuming that main converter switches $Q_1$ and $Q_2$ in FIG. 23 are driven with a 50% duty cycle and small dead time $t_d$ as seen in FIG. 22, applying a phase shift ON between the main half bridge and the auxiliary half bridge composed of $Q_1'$ and $Q_2'$ results in a trapezoidal auxiliary inductor current $i_{aux}(t)$ through inductor $L_{aux}$ as shown in FIG. 24. The peak value of this waveform $i_{AUX}$ is added with alternating sign to $i_x(t)$ during each switch transition. Properly controlled, this additional current is the mechanism by which PSM-HB circuitry assists ZVS transitions in devices $Q_1$ and $Q_2$.

For a converter with switching period $T_s$ and dead time $t_d \ll T_s$, the approximate peak value of the auxiliary inductor current $i_{aux}(t)$ can be written as a function of the phase shift between the main half-bridge and the auxiliary half-bridge $\Phi_N$, $$i_{AUX} \approx \frac{\Phi_N}{4\pi f_s} \frac{V_A}{L_{aux}}. \tag{95}$$

Phase shift $\Phi_N$ is limited to angles between $-\pi$ and $+\pi$, with maximum assistance current delivered at either limit. Positive and negative phase shifts are symmetric in terms of ZVS assistance under assumption (95), so that $\Phi_N$ can be constrained to the region between 0 and $+\pi$ in order to simplify analysis without losing generality.

To ensure that ZVS is achieved across the full operating range of interest for $Q_1$ and $Q_2$, $L_{aux}$ must be designed such that at maximum peak auxiliary current, with $\Phi_N = +\pi$ the worst case, switch node currents can be compensated for by $i_{aux}(t)$. The converter of interest determines how the worst case switch node current is found, but for a general switch node current of $i_x(t)$ with positive current needed to achieve ZVS, $L_{aux}$ can be approximated with the inequality $$L_{aux} \leq \frac{1}{4 f_s} \frac{V_A}{\left( \frac{2 C_N V_A}{t_d} - \min_{W_x} \left[ \frac{-1}{t_d} \int_{t_d} i_x \right] \right)}, \tag{96}$$

where $W_x$ is the operating region of interest over which the assisted converter ($Q_1$ and $Q_2$) will operate, and $V_A$ is the bridge voltage as seen in FIG. 23. If (96) results in a negative inductance, ZVS assistance was never needed in the first place as the converter naturally achieves soft switching transitions. In one embodiment, the switching regulation module 2302 controls the phase angle $\Phi_N$ according to (96).

For $L_{aux}$ satisfying (96), ZVS is possible at all operating points based on the phase angle $\Phi_N$. Phase angles smaller than necessary lead to hard switching of $Q_1$ and $Q_2$, while phase angles larger than needed lead to excessively high conduction losses in $L_{aux}$, $Q_1'$, and $Q_2'$. In order to minimize the overall losses of the system, $\Phi_N$ must be regulated as close to its minimum value as possible while still producing the needed auxiliary assistance current peak. Beginning with the above analysis, this minimum value may be calculated directly.

To ensure complete soft transitions in the switch node voltage $V_N$ from FIG. 23 during the $Q_1/Q_2$ dead time $t_d$, the sum of currents $i_{aux}(t)$ and $i_x(t)$ must deliver sufficient charge to fully commutate the switch node voltage before the next switching event. For a bus voltage of $V_A$ and a total output capacitance $C_N$ on each switching device, this results in the inequality $$\lambda \int_{t_d} (i_x(t) + i_x(t)) dt \geq 2 C_N V_A, \tag{97}$$

$$\lambda = \begin{cases} +1 & Q_1 \\ -1 & Q_2 \end{cases}. \tag{98}$$

Assuming that $i_{aux}(t) \approx i_{AUX}$ throughout the dead time simplifies the analysis, and after substituting (95) into (97) allows the control angle necessary for ZVS to be written as a function of known constants and unknown converter parameters, $$\Phi_N \geq \frac{4\pi f_s L_{aux}}{t_d}\left(2C_N - \frac{\lambda}{V_A}\int_{t_d} i_x(t)dt\right). \tag{99}$$

Note that $\Phi_N$ ideally maintains the same value for both $Q_1$ and $Q_2$ regardless of $\lambda$, as $i_x(t)$ is assumed approximately half-period anti-symmetric such that $\lambda i_x(t)$ maintains the same sign for both $Q_1$ and $Q_2$.

All quantities in (99) are well known except for the integral of the converter current into the node over the dead time $t_d$. Although this value may be approximated well with various methods, it is hard to achieve the accuracy needed due to unmolded ringing and other effects. In order to avoid this issue, the left had side of (97) may be directly calculated with the use of an analog windowed integration circuit. The result of this analog integration is compared with a voltage dependent reference value equal to the right hand side of (97) to determine if more or less ZVS assistance is needed in order to soft-switch $Q_1$ and $Q_2$. This method does not require knowledge of $i_x(t)$, and uses a reference which is easily computed or found experimentally. For a constant $V_A$, the voltage dependent reference is constant and is used as the feedback reference variable when designing a feedback controller for ZVS assistance. The use of this constant feedback reference greatly simplifies controller implementations.

Figure 25:
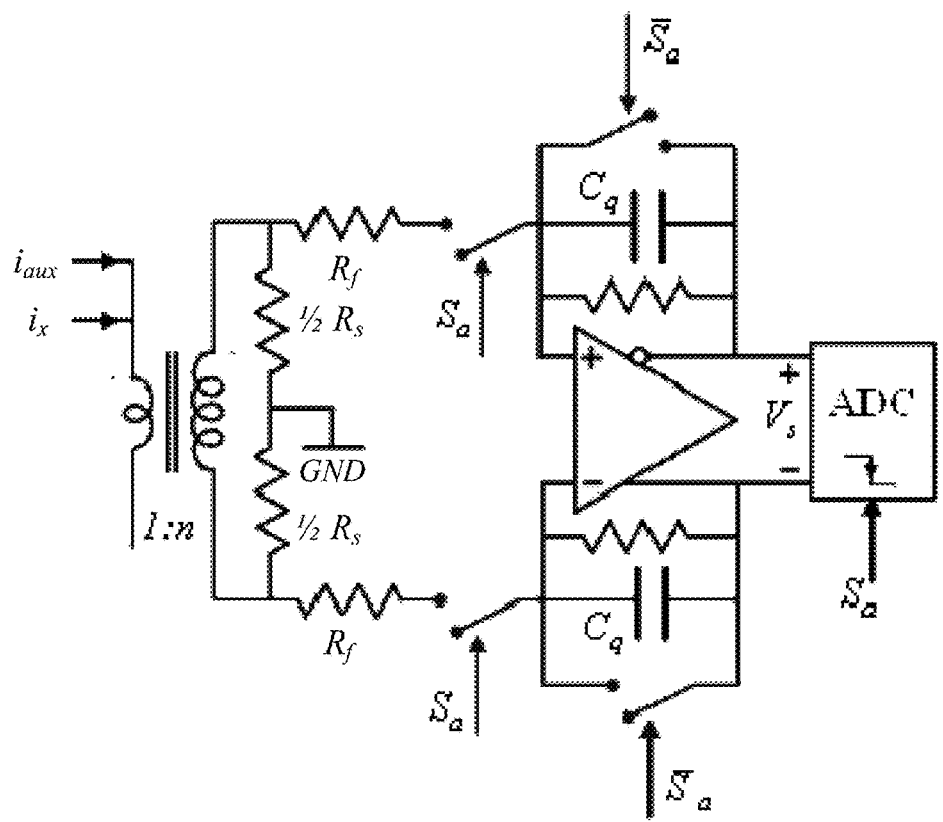
FIG. 25 is a schematic block diagram of a PSM-HB integration circuit for direct measurement of charge delivered during the dead time between switching events.

FIG. 25 is a schematic block diagram of a PSM-HB integration circuit for direct measurement of charge delivered during the dead time between switching events. A sample and hold ADC is used for digital controller implementations, while a peak detection circuit is used for completely analog loop design. FIG. 25 presents an example integration circuit for direct measurement of the left hand side of (97). A current sense transformer with turns ratio 1:n is attached to the switch node of the main converter half-bridge such that the sum of $i_{aux}(t)$ and $i_x(t)$ are sensed. The sense transformer is then loaded with a resistor bridge of value $R_s$. The voltage across this resistor bridge is integrated with a differential op-amp using capacitors $C_q$. To achieve the desired window and reset, a set of four discrete switches are placed around the integration op-amp. One pair of switches is used to enable/disable integration, while a complimentary pair is used to reset the integration capacitor $C_q$. These four switches are driven by a single control signal $S_a$ and its inverse $\bar{S}_a$. To achieve integration during the dead time and reset afterwards, $S_a$ is derived from the gate drive signals of $Q_1$ and $Q_2$, $$S_a = !(GD[Q_1] | GD[Q_2]). \tag{100}$$

The resulting output voltage of the windowed integration circuit 17, is a scaled representation of the integrated switch node current on the left side of (97)

$$V_s = \frac{\lambda R_s}{nR_f C_q}\int_{t_d}(i_{aux}(t) + i_x(t))dt. \tag{101}$$

Using (101) as the feedback variable, the right hand side of (97) is scaled accordingly to provide the feedback reference, $$Q_{REF} \geq 2\frac{R_s C_N}{nR_f C_q}V_A. \tag{102}$$

Figure 26:
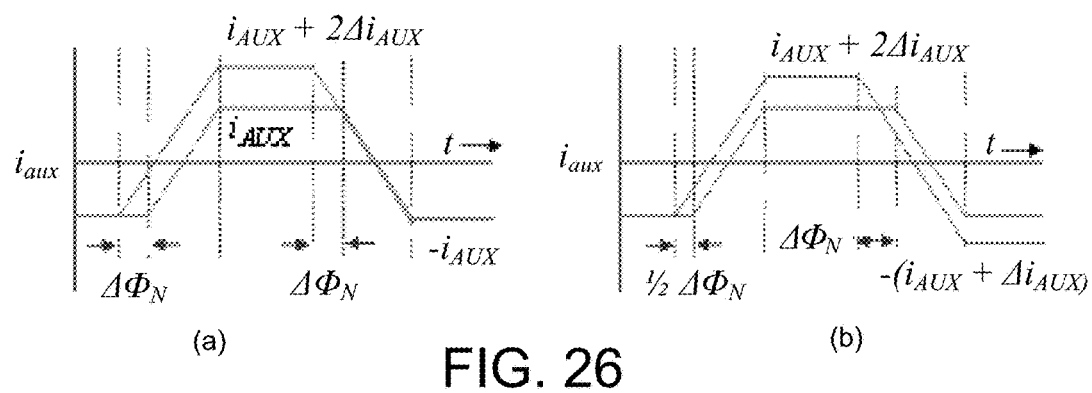
FIG. 26 depicts a simple PSM-HB modulation (a) that applies phase angle changes in a single step, introducing non-zero average auxiliary current.

FIG. 26 depicts a simple PSM-HB modulation (a) that applies phase angle changes in a single step, introducing non-zero average auxiliary current. Half-step-first modulation (b) avoids this, and achieves the desired $i_{AUX}$ in at most a single cycle. The transfer function of interest for feedback control of the PSM-HB relates the phase angle input $\Phi_N$ to the ZVS assistance peak current $i_{AUX}$. Using (95) a small change in phase shift, $\Delta\Phi_N$, is applied directly to the PSM-HB in order to create a small change in peak auxiliary current $\Delta i_{AUX}$. This simple modulation scheme, seen in FIG. 26(a), results in an immediate average current offset. This offset can either be dealt with actively by modifying the PSM-HB gate drive signals according to an additional average inductor current control loop, or passively by relying on the dynamics of the PSM-HB to eventually cause near zero average current to return.

To avoid perturbations in the average auxiliary current, a modulation technique can be used that directly modifies the peak-to-peak current without perturbing the average inductor current. One method that achieves this is 'half-step-first' modulation. Seen in FIG. 26(b), this modulation strategy achieves the desired $\Delta i_{AUX}$ in at most one switching period and greatly simplifies control analysis of the PSM-HB. This technique has the added benefit of achieving the desired auxiliary current during converter cold startup in the first half period, thus avoiding hard switched turn on of the main switching elements.

Using half-step-first phase angle updates, PSM-HB phase modulation is analyzed as a completely digital system composed of a scaled delay of at most one switching period. The linearized small signal gain relating $\Phi_N$ and $i_{AUX}$ is derived by differentiating (95) with respect to $\Phi_N$. To simplify analysis, a constant single cycle delay for modulation is assumed. This will at worst cause control margins to be larger than expected, and is a reasonable assumption for many implementations of the phase modulator. The PSM-HB transfer function can be defined with sample frequency $f_s$ as $$H_{PSM}[z] = \frac{V_A}{4\pi f_s L_{aux}}z^{-1}. \tag{103}$$

The current integration scheme described above can be analyzed as a sensor gain relating the switch node currents during the $Q_1/Q_2$ dead time and the total change delivered to the switch node as a scaled voltage. Assuming a capacitor $C_q$ is used to integrate the node current, the current integration gain can be approximated as $$A_q[z] = \frac{t_d R_s}{nR_f C_q}z^{-1}, \tag{104}$$

using the circuit parameters defined in FIG. 25. Note that in (104) a sample rate of $2f_s$ is assumed as a new sample is available after each of the two node transitions which occur during any given switching period. The output of this block is a voltage representing the total charge delivered to the switch during its dead time, scaled by the integration circuit parameters.

The samples returned by the current integration circuitry alternate between the $Q_1$ and $Q_2$ device currents with a sample frequency of $2f_s$. In poorly matched systems, this may cause oscillations between two values at the output of the current integrator even in steady state. The addition of a running two sample minimum block after the integrator safely solves this issue if needed, and can be acceptably modeled for most analysis by an additional single sample (one half switching period) delay added to (103). This has the additional effect of simplifying control loop analysis, as both (102) and a modified (103) have common sample rates off, after making this assumption.

Figure 27:
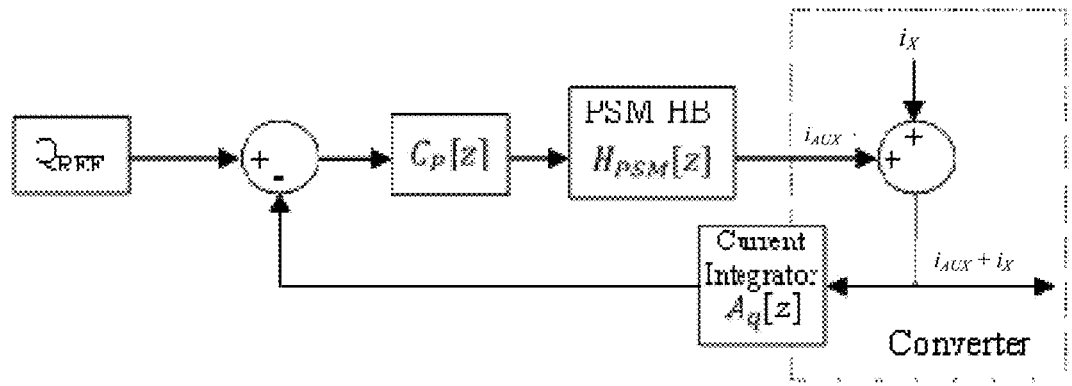
FIG. 27 is a schematic block diagram of one embodiment of a control loop block diagram for the PSM-HB.

FIG. 27 is a schematic block diagram of one embodiment of a control loop block diagram for the PSM-HB. $i_x(t)$ is assumed to have a constant sign, and the auxiliary current during the dead time is assumed to be equal to the peak auxiliary current $i_{AUX}$ Treating the natural switch node current $i_x(t)$ as a disturbance, the PSM-HB is analyzed using the block diagram in FIG. 27. Loop gains for both charge reference as well as natural switch node current disturbance are the same, $$T_{PSM} = C_p[z]H_{PSM}[z]A_q[z], \quad (105)$$

although the closed loop transfer functions differ. For charge reference, the closed loop transfer function is derived as $$C_{CL\_Q} = \frac{C_p[z]H_{PSM}[z]}{1 + T_{PSM}}, \quad (106)$$

while the closed loop disturbance transfer function becomes $$C_{CL\_X} = \frac{1}{1 + T_{PSM}}. \quad (107)$$

The two transfer function found in (106) and (107) are the desired result, allowing feedback control of PSM-HB ZVS assistance.

When ZVS assistance is not needed in the main converter, it is desirable to minimize the conduction losses in the auxiliary inductance added by the PSM-HB assistance circuitry. By setting $\Phi_N$ to zero, PSM-HB conduction losses may be eliminated, although such an approach causes PSM-HB auxiliary devices to hard switch causing large switching losses especially at higher switching frequencies. A better approach is to maintain a minimum current in the PSM-HB at all times, such that conduction losses are minimized while soft-switching is maintained. To ensure this, a minimum control angle, $\Phi_{Min}$, should be set such that $$\Phi_N \geq \Phi_{Min} \geq \frac{8\pi f_s C_A L_{aux}}{t_{dA}}. \quad (108)$$

In (108), the PSM half-bridge switches are assumed to have an output capacitance of $C_A$, and a dead time of $t_{dA}$. By using devices with small output capacitance, and letting $t_{dA}$ be relatively large, $\Phi_{Min}$ can be kept small resulting in a small $i_{AUX}$ and reduced overhead losses when the main converter does not need ZVS assistance. This result is one argument for selecting PSM-HB devices with small output capacitances. Unfortunately, small output capacitance MOSFET devices are likely to have larger on-state resistances making it unclear which parameter should be focused on in device selection.

To help clarify the situation, the RMS value of the minimum $i_{aux}(t)$ needed based on (108) for PSM-HB ZVS operation can be calculated as a function of circuit parameters, $$RMS[i_{aux}^{MIN}] = \frac{2C_A V_A}{t_{dA}}\sqrt{1 - \frac{16}{3}\left(\frac{f_s C_A L_{aux}}{t_{dA}}\right)}. \quad (109)$$

As conduction losses are proportional to the square of (109), we can see that conduction losses are approximately proportional to the square of the output device capacitance. When compared with the linear relation between losses and on-state resistance, it becomes clear that PSM-HB auxiliary devices with minimum output capacitance should be chosen over devices with smaller on-state resistance. Selecting devices in this way will reduce losses introduced by the use of PSM-HB ZVS assistance.

When designed such that the maximum $i_{AUX}$ needed is achieved at $\Phi_N = \pi$, the RMS and peak currents handled by the PSM-HB switching devices are in many cases much smaller than those handled by the main converter. For the best case design, the maximum RMS current handled by the PSM-HB switching devices is $$RMS[i_{aux}^{MAX}] = \frac{i_{AUX}}{\sqrt{3}}. \quad (110)$$

For many converters, this means that much smaller devices may be used for the PSM-HB than for the main converter components as $i_{AUX}$ is only equal to the peak worst-case current experienced by the main switches devices, not the total current handled by the main switching devices. Voltage stresses for both auxiliary devices and main switching elements will remain the same, while the power loss in the auxiliary switches will be significantly lower than the main switches due to the reduced currents they must handle. The lower power loss experienced by these devices allows less effort and space to be spent cooling the devices, reducing the additional volume the PSM-HB auxiliary circuits require.

Based on the power stage designed in Section III.2 the charge integration circuit designed uses a 1:22 current sense transformer, loaded with $R_s=40\Omega$. The op-amp integrator uses $R_f=1$ k$\Omega$ and $C_q=1$ nF, resulting in a gain of approximately 0.7 V/A equivalent. No additional switch node capacitance was added to the main switching devices, such that the $C_A$ and $C_N$ are equal to the output capacitance of the MOSFET devices used. The charge references in (102) are experimentally derived and stored in a lookup table of values. Experimental derivation of the charge reference look up table was done due to the highly non-linear nature of the output capacitance of a MOSFET device operated at variable voltage levels.

$L_{aux}=80$ 01 was selected using available analytical models for the turn off currents of the DAB converter designed and (96), and then reduced slightly to give a small safety margin. Auxiliary switching devices use a dead time 10% larger than main switching devices, and were selected for lower output capacitance. Main switches used IRFP21N60L devices with an output capacitance of approximately 90 pF at 130V, while auxiliary devices (STW20N95K) had an output capacitance of approximately 40 pF at 130V.

In one embodiment, the first and second main switches $Q_1$, $Q_2$ form a first switching leg of a full bridge switching network of the converter 10 and the converter 10 includes a third main switch $Q_3$ connected to the positive connection of a second switching leg and a fourth main switch $Q_4$ connected to negative connection of the second switching leg. The first and second switching legs form a full bridge switching network. The embodiment also includes a third auxiliary switch $Q_3'$ connected to the positive connection of the second switching leg, a fourth auxiliary switch $Q_4'$ connected to a negative connection of the second switching leg, and a second auxiliary inductor $L_{aux2}$ connected to a second auxiliary midpoint $V_{N2}'$ between the third and fourth auxiliary switches $Q_3'$, $Q_4'$ and a second main switch midpoint $V_{N2}$ between the third and fourth main switches $Q_3$, $Q_4$, where the third main switch $Q_3$ includes a third capacitance $C_{N3}$ and the fourth main switch $Q_4$ includes a fourth capacitance $C_{N4}$. In the embodiment, the switch regulation module 2302 regulates switching of the third and fourth auxiliary switches $Q_3'$, $Q_4'$ to control current in the second auxiliary inductor $L_{aux2}$, where the second auxiliary inductor $L_{aux2}$ provides or removes charge from the third capacitance $C_{N3}$ and the fourth capacitance $C_{N4}$ to adjust voltage across the third main switch $Q_3$ and the fourth main switch $Q_4$ to induce zero voltage switching for the third and fourth main switches $Q_3$, $Q_4$.

In another embodiment, the converter 10 is a DABSRC converter 100, 101, the full bridge switching network is a first full bridge switching network on a primary side 141 of the converter 10 and the converter 10 includes a second full bridge switching network on a secondary side 143 of the converter 10 and each switching leg of the second full bridge switching network includes two auxiliary switches (i.e. $Q_1'$, $Q_2'$) and an auxiliary inductor (i.e. $L_{aux}$) controlled by a switch regulation module (i.e. 2302) to achieve zero voltage switching of switches (i.e. $Q_1$, $Q_2$) in the second full bridge switching network. In one embodiment, the assisted ZVS apparatus 2300 includes a ZVS activation module 2306 that activates switching of the first and second auxiliary switches $Q_1'$, $Q_2'$ and the switch regulation module 2302 when the converter 10 is in a hard switching condition.

V.2 PSM Leg ZVS Assistance Control

Figure 28:
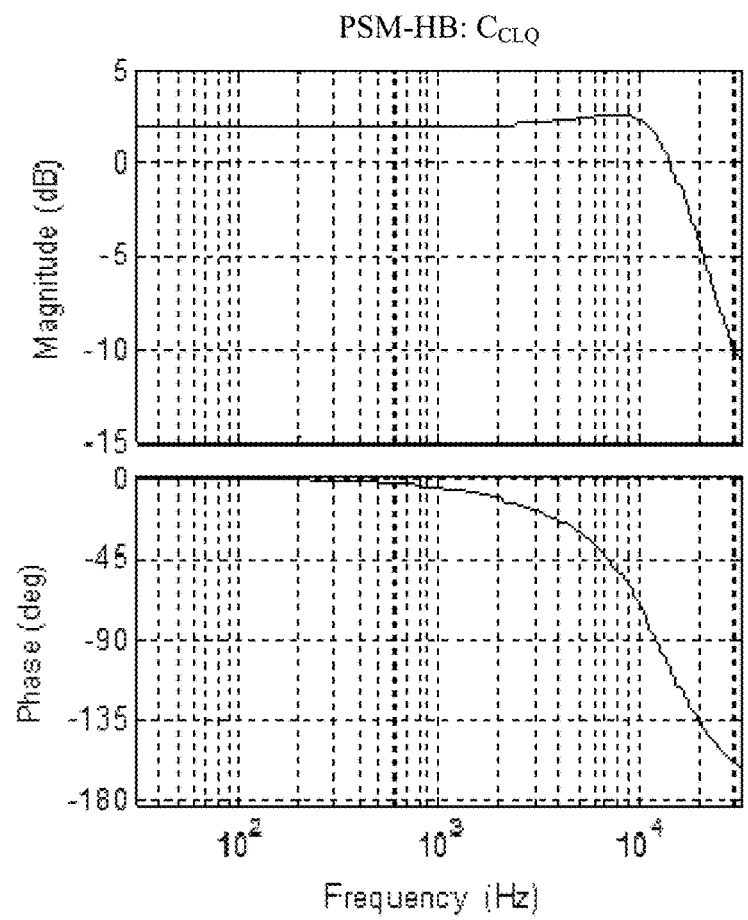
FIG. 28 depicts PSM-HB control to output closed loop transfer function.

PSM auxiliary leg control relies on equations (105)-(107) for design of a feedback controller. Unlike the main power flow control loop, the PSM control loop is independent of converter operating point, with only the voltage dependence of the charge reference (102) varying in response to the applied bridge voltage. Design of the charge reference to auxiliary current controller is done using digital integral controller. The controller gain $K_{iZVS}$ selected in order to maintain a phase margin of $P_M \geq 70°$ and a gain margin $G_M \geq 10$ dB. The resulting controller uses a gain of $K_{iZVS}$=100e-3, with the closed loop control to output transfer function plotted in FIG. 28. FIG. 28 depicts PSM-HB control to output closed loop transfer function. The output of this controller is limited to a maximum phase angle of $\pi$ to ensure stability.

The closed loop disturbance to auxiliary current is checked to ensure that the bandwidth is sufficiently large. As this transfer function determines the speed with which a PSM auxiliary leg operated at a fixed bridge voltage can respond to changes in tank current magnitudes, a bandwidth much larger than the converters main power flow bandwidth is needed. Referencing the gain schedule controller designed in Section IV.2 the maximum converter bandwidth is 2.76 kHz at M=1.2 and $U_{CMD}$=−0.5. The closed loop bandwidth of the loop relating PSM leg disturbance to auxiliary current is found to be approximately 6 kHz, which satisfies the requirement of being sufficiently larger than that of the main power flow.

Using the controller derived above, a charge reference table still needs to be derived. Dependent on both the bridge voltage $V_A$ and the switch node capacitance $C_N$ charge reference $Q_{REF}$, $$Q_{REF} \geq 2 \frac{R_s C_N}{n R_f C_q} V_A, \tag{111}$$

may be computed analytically or experimentally. When a large switch node capacitance is added external to switching device output capacitances, analytically computing (111) becomes the desired option, as only the direct dependence on node voltage $V_A$ need be considered as all other parameters can be considered constant. For converter legs designed with no additional capacitance, such that $C_N$ is equal to the nonlinear voltage-dependent output capacitance of a single switching device, experimental derivation of (111) is preferred. As the converter designed in III.2 does not use external capacitance on any of the switch legs experimental derivation of $Q_{REF}$ is preferred.

Deriving the voltage dependent charge reference table for feedback control of PSM-HB ZVS assistance involves experimentally switching a single pair of main switches in a half-bridge configuration at an arbitrary power level where hard switching is experience and sweeping the bridge voltage from the minimum expected value to the maximum expected value. At each voltage level, additional current is driven into the switch node under test by increasing the auxiliary PSM-HB phase control angle until ZVS is achieved. At this point the charge integration output is recorded. By correlating the bridge voltage with the output value of the charge integration circuit as seen in FIG. 25 a table can be derived relating the needed charge integration value with the voltage across the bridge. Once the table has been completed, it is used as a reference for the PSM-HB feedback loop in order to ensure ZVS with at all operating points.

Maintaining minimum current for PSM auxiliary circuitry soft-switching requires maintaining a minimum phase shift in the auxiliary legs, $$\Phi_N \geq \Phi_{Min} \geq \frac{8\pi f_s C_A L_{aux}}{t_{dA}}. \tag{112}$$

Due to the nonlinear voltage dependent nature of the PSM-HB switching device output capacitance $C_A$ an experimentally determined table is used for $\Phi_{Min}$. This table is derived in a similar manner to the table for $Q_{REF}$ as it is again dependent on bridge voltage alone.

Figure 29:
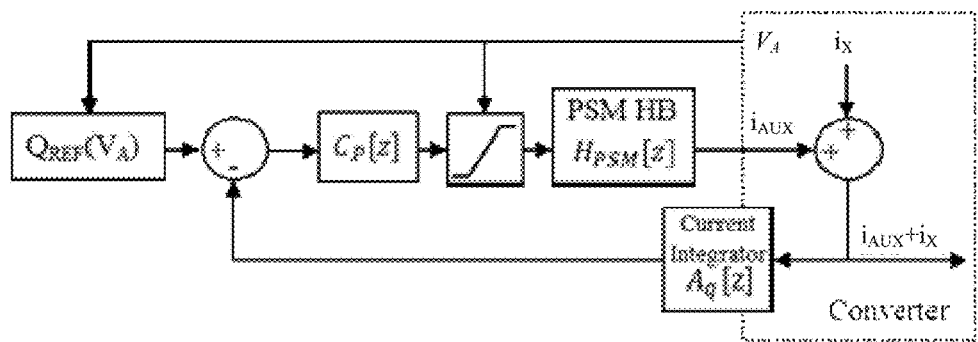
FIG. 29 is a schematic block diagram of one embodiment of a PSM-HB feedback circuit, incorporating bridge voltage $V_A$ dependent tables for charge reference $Q_{REF}$ and minimum phase shift $\Phi_{Min}$.

FIG. 29 is a schematic block diagram of one embodiment of a PSM-HB feedback circuit, incorporating bridge voltage $V_A$ dependent tables for charge reference QREF and minimum phase shift $\Phi_{Min}$. Using both the charge reference table and the minimum angle table, a full block diagram of the PSM-HB feedback circuitry is seen in FIG. 29.

V.3 ZVS Assistance with Modified MCTs in Inductively Linked Converters

When multiple converters operate together with parallel input or output active bridges, it becomes possible to inductively link the parallel half bridges of one converter with another in order to remove the need to additional PSM-HB circuitry for either the primary of the secondary. This approach allows half of the main switches in each converter to soft switch by applying a phase shift between the two converters without the need to additional hardware. As this approach can only be used to force ZVS of half the main switching elements, it must be used in conjunction with a separate method in order to force ZVS of the other half of the main switching elements. One such method is to use modified MCT. When implemented together, soft switching of all devices can be achieved without the need to additional switching elements by pairing converters together. This section describes one way in which this approach can be implemented.

Figure 83:
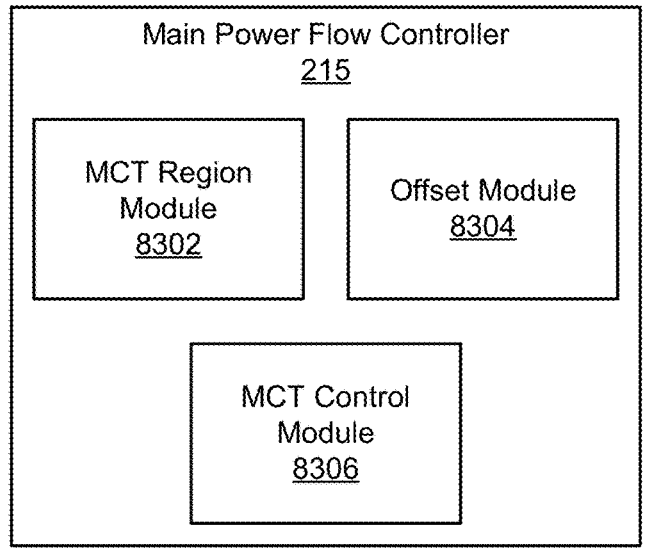
FIG. 83 is a schematic block diagram of one embodiment of a modified MCT apparatus 8300 in accordance with one embodiment of the present invention.

FIG. 83 is a schematic block diagram of one embodiment of a modified MCT apparatus 8300 in accordance with one embodiment of the present invention. In one embodiment, the converter 10 includes the modified MCT apparatus 8300, which may be embodied in the main power flow controller 215, as depicted in FIG. 83. The apparatus 8300, in one embodiment, includes an MCT region module 8302 that defines a MCT for operation between a maximum positive power output to a maximum negative power output of a bidirectional DC to DC converter 10. The converter 10 is a DABSRC and the MCT defines a boundary between a ZVS region and a hard switching region. The apparatus 8300 includes an offset module 8304 that defines an offset to the MCT, the offset in the ZVS region, and an MCT control module 8306 that adjust switching of switches of the converter 10 to maintain operation of the converter in the ZVS region between the maximum positive power output to a maximum negative power output along a trajectory defined by the MCT and the offset. For example, the MCT control module 8306 may control the converter 10 to operate along the path described below in relation to FIG. 33.

In one embodiment, the MCT control module 8306 includes one or more phase shift modulators 230 that control switching of the switches of the converter 10 by controlling a plurality of angles between switching legs of the converter 10, where each switching leg includes two switches connected in series between positive and negative connections to the switching leg. For example, the switches may be similar to the switches 105 of FIGS. 2A-2C. In another embodiment, the MCT control module 8306 adjusts an angle $\phi_{AB}$, and angle $\phi_{DC}$, and an angle $\phi_{AD}$, as described above in relation to section IV.1, operation along the MCT, and below in relation to FIG. 31. For example, angle $\phi_{AB}$ includes a phase angle between a voltage at a midpoint A between switches of a first switching leg of the converter, $v_A$, and a voltage at a midpoint B between the switches of a second switching leg of the converter, $v_B$, the first and second switching legs comprising a full bridge switching network on a primary side of the converter 10. Angle $\phi_{DC}$ includes a phase angle between a voltage at a midpoint D between switches of a third switching leg of the converter, $v_D$, and a voltage at a midpoint C between switches of a fourth switching leg of the converter, $v_C$, where the third and fourth switching legs form a full bridge switching network on a secondary side of the converter 10. Angle $v_{AD}$ includes a phase angle between the voltage $v_A$ and the voltage $v_D$.

Figure 30:
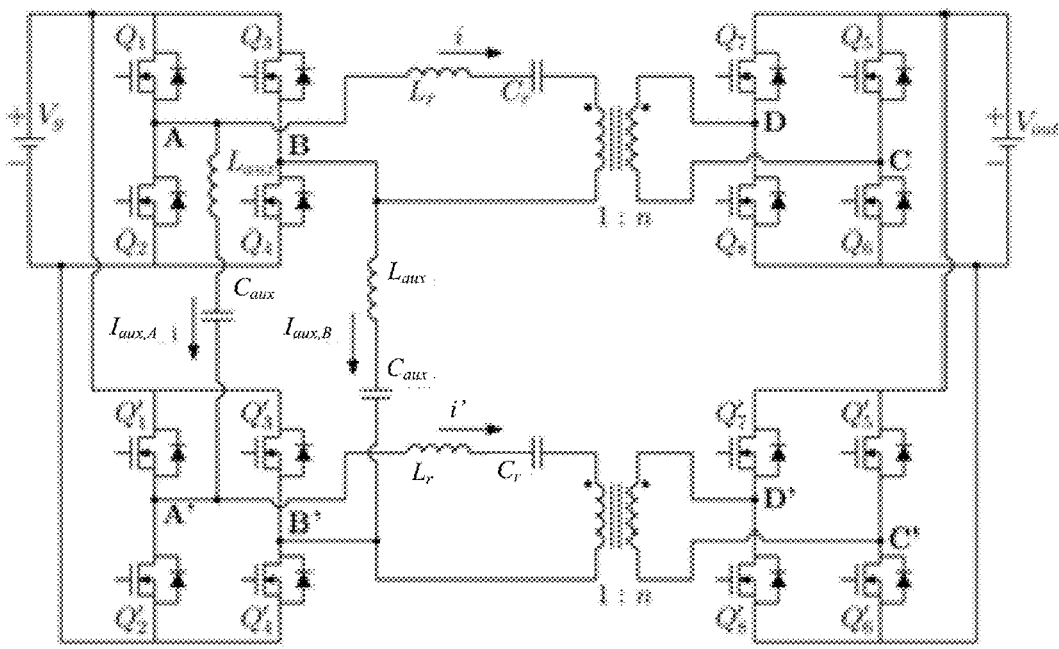
FIG. 30 is a schematic block diagram of one embodiment of a DC to DC converter with two parallel DABSRC stages.
Figure 31:
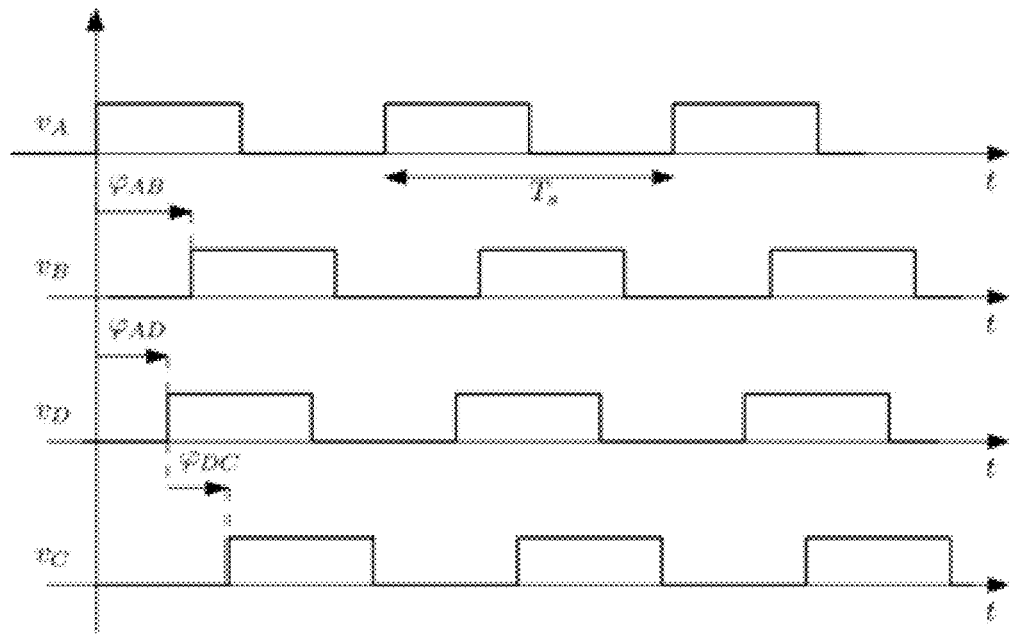
FIG. 31 depicts Phase shift modulation and definition of control angles for each DABSRC stage.

FIG. 30 is a schematic block diagram of one embodiment of a DC to DC converter with two parallel DABSRC stages. FIG. 30 is a switching diagram showing phase shift modulation and definition of control angles for each DABSRC stage. Each DABSRC stage in FIG. 30 is modulated using a three-angle phase-shift modulation in which legs A, B, C and D are phase shifted one with respect to the other, as detailed in FIG. 31. FIG. 31 depicts Phase shift modulation and definition of control angles for each DABSRC stage. Three independent angles exist, namely ($\phi_{AB}$, $\phi_{AD}$ and $\phi_{DC}$, where $\phi_{XY}$ denotes the phase lag between nodes Y and X. Furthermore, the two stages are phase-shifted one with respect to the other by an angle Operation of the proposed technique, detailed in the next two subsections, can be summarized as follows: control angles $v_\phi = (\phi_{AB}, \phi_{AD}, \phi_{DC})$ and $v'_\phi = (\phi_{A'B'}, \phi_{A'D'}, \phi_{D'C'})$ are generated so as to achieve the desired power flow and to ensure ZVS operation of the output devices $Q_5 \ldots Q_8$ and $Q_5' \ldots Q_8'$. Power sharing is ensured by driving the two stages with the same control commands: $\phi_{AB} = \phi_{A'B'}$, $\phi_{AD} = \phi_{A'D'}$ and $\phi_{DC} = \phi_{D'C'}$, while selection of the operating vector $v_\phi = v'_\phi = (\phi_{AD}, \phi_{AB}, \phi_{DC})$ is related to the required amount of active and reactive power flow through the tank. Such relationship is derived below on the basis of a detailed power flow analysis of the DABSRC stage. On the other hand, phase-shifting between the two DABSRC stages is accomplished by the fourth independent control angle $\phi_{AA'}$, which serves the purpose of building an inductive current through the input auxiliary branches $L_{aux}$ and assist ZVS operation of input devices $Q_1 \ldots Q_4$ and $Q_1' \ldots Q_4'$, as detailed below.

Equation (71) can be restated as, $$\min_{v_\varphi}(I_{RMS}(v_\varphi)): \begin{cases} P_{OUT}(v_\varphi) = P_{OUT} \\ -P_{OUT}^{MAX} \leq P_{OUT} \leq +P_{OUT}^{MAX} \end{cases} \quad (113)$$

which when solved for solved for every $P_{OUT} \in [-P_{OUT}^{MAX}, P_{OUT}^{MAX}]$, yields a parameterized curve $v_{\phi,MCT}(P_{OUT})$ in the control space, referred to as the MCT. Within the fundamental approximation the MCT can be expressed in closed form and analyzed in detail; the properties of the MCT relevant to the discussion are here summarized:

Having defined the voltage conversion ratio M as $$M \equiv \frac{1}{n} \cdot \frac{V_{out}}{V_g}. \quad (114)$$

the MCT is a 2D curve lying on the $\phi_{DC} = 180°$ plane in the step-down case (M<1) or on the $\phi_{AB} = 180°$ plane in the step-up case (M>1).

When M<1, the MCT involves the modulation of both angles $\phi_{AD}$ and $\phi_{AB}$; similarly, when M>1 both angles $\phi_{AD}$ and $\phi_{DC}$ are modulated.

When M=1, the MCT reduces to a one-angle modulation in which angle $|\phi_{AD}| \leq 90°$ controls the active power flow, while $\phi_{AB} = \phi_{DC} = 180°$. Such situation corresponds to the conventional one-angle modulation considered.

The MCT yields, by definition, the combination of angles which results in the minimum flow of reactive power Q. This means that departing from the MCT by a controlled amount allows to control the sign and magnitude of the reactive power flowing through the tank, and hence the reactive component of the tank current.

Figure 32:
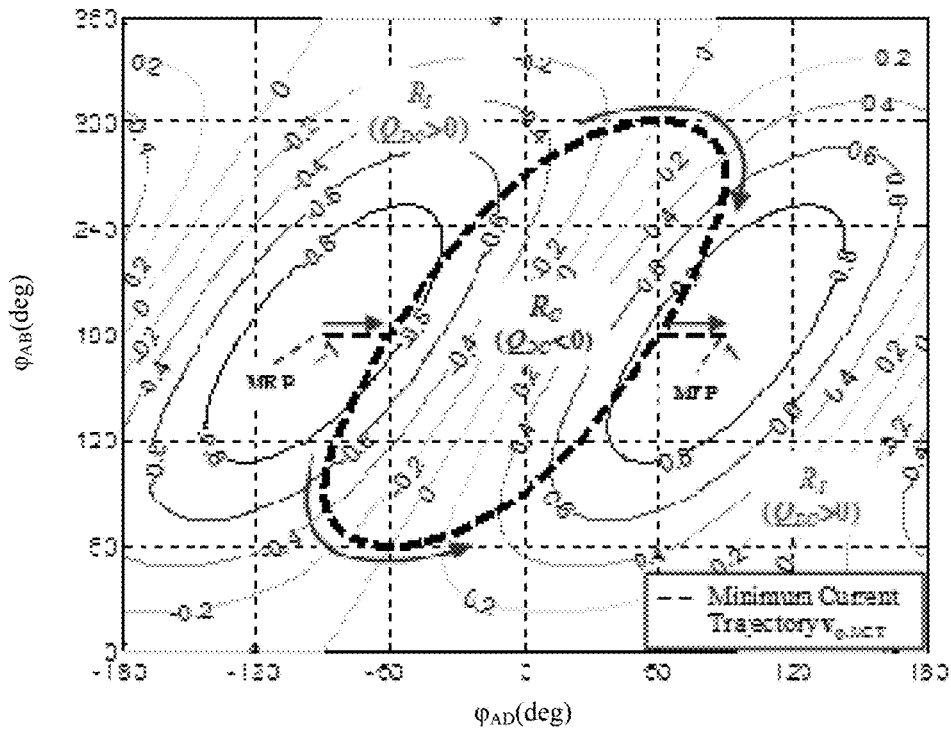
FIG. 32 depicts one example of normalized active power contours on the $\phi_{DC}=180°$ plane, minimum current trajectory for M=0.5 and corresponding separation between capacitive and inductive reactive power regions.

FIG. 32 depicts one example of normalized active power contours on the $\phi_{DC}=180°$ plane, minimum current trajectory for M=0.5 and corresponding separation between capacitive and inductive reactive power regions. FIG. 33 depicts one example of normalized active power contours on the $\phi_{DC}=180°$ plane; the minimum current trajectory and a particular ZVS trajectory are shown for M=0.5, together with two corresponding operating points $A_{MCT}$. In one embodiment, the offset module 8304 defines the offset between the MCT and the ZVS trajectory in FIG. 33.

As an example, consider FIG. 32, in which the normalized active power contours $U_{OUT}=P_{OUT}/P_{OUT}^{MAX}$ are illustrated on the $\phi_{DC}=180°$ plane. On the same plot, the MCT is illustrated for the case example M=0.5. The MCT encompasses the entire active power range [$-P_{OUT}^{MAX}$, + $P_{OUT}^{MAX}$], connecting the maximum forward power ("MFP") to the maximum reverse power ("MRP") points. The MCT further consists of two symmetrical branches dividing the $\phi_{DC}=180°$ plane in two sub-regions $R_C$ and $R_I$. The fundamental property of these two regions is the sign of the reactive power $Q_{DC}$ exchanged by the tank with the output bridge at port DC: inside the MCT, in region $R_C$, one has $Q_{DC}<0$ and the output bridge processes capacitive current, hence operating in deep hard-switching mode. Inside $R_I$, on the other hand, $Q_{DC}>0$ and switching of devices $Q_5 \ldots Q_8$ occurs at inductive currents where soft turn-on can be realized. The curved branches of the MCT correspond to $Q_{DC}=0$. In other words, they define the boundary between capacitive and inductive behavior of the tank with respect to the output bridge. On top of such branches the tank current is in phase with the fundamental component of the reflected voltage $v_{DC}/n$ generated by the output bridge on the tank.

The flat portions of the MCT extending inside region $R_I$ correspond to heavy load operating points for which the minimum current operation occurs at $Q_{DC}>0$. The power level at which they depart from the $\phi_{AB}=180°$ line represents the minimum power level at which deep hard switching of the output devices can be avoided using a one-angle modulation strategy.

It is worth observing, with this regard, that the conventional one-angle modulation trajectory, in which $\phi_{AB}=\phi_{DC}=180°$ and angle $-90°\leq\phi_{AD}\leq90°$ is employed to modulate the power flow, necessarily enters the capacitive region $R_C$ at light load for non-unity conversion ratios. In one embodiment, the offset includes a fixed offset from the MCT in the ZVS region. In another embodiment, the offset includes a variable offset from the MCT in the ZVS region. For example, the offset may decrease as output power $P_{OUT}$ increases. In another example, the offset follows a trajectory similar to the ZVS trajectory shown in FIG. 33.

Figure 34:
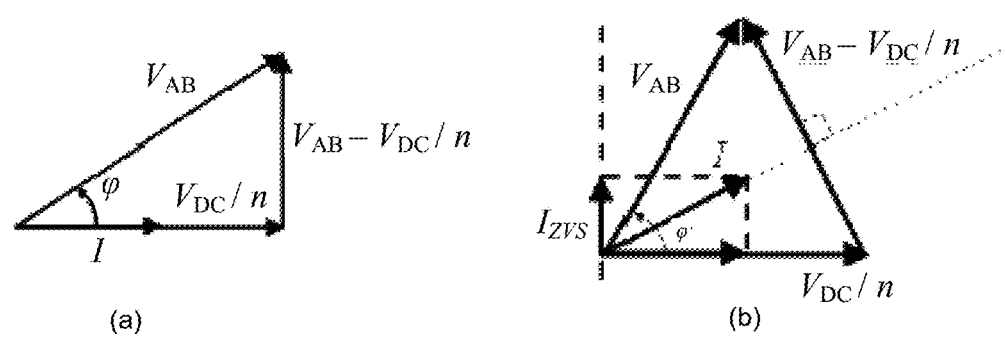
FIG. 34 are tank phasor diagrams for $Q_{DC}=0$ (a) and on a generic ZVS trajectory (b)

FIG. 34 are tank phasor diagrams for $Q_{DC}=0$ (a) and on a generic ZVS trajectory (b). The MCT represents a particular one among the sought trajectories, and precisely the one for which $Q_{DC}$ is minimized in absolute value. Given an arbitrary point $A_{MCT}$ on the MCT at a specific power level $P_{OUT}$, the amount of inductive current through the tank can be increased by staying on the $\phi_{DC}=180°$ plane while moving the control vector inside region $R_I$ along a constant $P_{OUT}$ contour. Such action, exemplified in FIG. 33, intentionally builds up an inductive component $I_{ZVS}$ in the tank current, orthogonal to voltage $v_{DC}/n$, which enables soft turn-on of the output devices. The new operating point $A_{ZVS}$ lies on a trajectory $v_{\phi,ZVS}(P_{OUT}, I_{ZVS})$ now different from the MCT, in which the active power delivered is $P_{OUT}$, while the reactive power has been purposely adjusted for zero-voltage switching. FIG. 34(a) and FIG. 34(b) further clarify the effect by illustrating the tank phasor diagrams on $A_{MCT}$ and on $A_{ZVS}$ respectively.

Referring, for simplicity, to the M<1 case only, and with the following definitions:

$$I_{ZVS,FP} \equiv \frac{4}{n\pi} \cdot \frac{V_{IN}}{Z_0} \cdot H_0 \cdot M \quad (115)$$

$$\alpha \equiv \frac{I_{ZVS}}{I_{ZVS,FP}}$$

$$M' \equiv M - \alpha \cdot M,$$

and $A_{ZVS}$ having the same active power but different amounts of reactive power can be achieved.

Closed-form expressions for $v_{\phi,ZVS}(P_{OUT}, I_{ZVS})$ can be derived under the fundamental approximation already invoked previously, resulting in $$v_{\phi,ZVS}: \begin{cases} \varphi_{AB} = \pi \pm \pi \mp 2\arcsin\left(\sqrt{M'^2 + U_{OUT}^2}\right) \\ \varphi_{DC} = \pi \\ \varphi_{AD} = \frac{\varphi_{AB}}{2} + \arctan\left(\frac{U_{OUT}}{M'}\right) - \text{sgn}(M') \cdot \frac{\pi}{2} \end{cases} \quad (116)$$

$$v_{\phi,ZVS}: \begin{cases} \varphi_{AB} = \varphi_{DC} = \pi \\ \varphi_{AD} = \begin{cases} \arcsin(U_{OUT}), & \text{when } \alpha < 1 \\ \pi - \arcsin(U_{OUT}), & \text{when } 1 < \alpha < 1 + \frac{1}{M} \end{cases} \end{cases} \quad (117)$$

when $|U_{OUT}|\leq(1-M'^2)^{1/2}$, and
when $|U_{OUT}|>(1-M'^2)^{1/2}$. Similar expressions can be derived for the step-up case.

Expressions (116) correspond to the curved branches of the trajectory, with the ± sign referring to the upper or lower branch respectively. These branches are characterized by the fact that the ZVS currents $i_{D\downarrow}$ and $i_{C\downarrow}$ of the output devices, defined as the instantaneous current outsourced by node D (or C) at the turn-off instant of the high-side device $Q_7$ (or $Q_5$), are equal to $I_{ZVS}$. On the other hand (117) correspond to the flat portions of the trajectory. Over these operating points one has $i_{D\downarrow}=i_{C\downarrow}>I_{ZVS}$ because a nonzero minimum inductive current is already present in the tank, as previously discussed in the context of the MCT. Quantity $I_{ZVS,FP}$ defined in (115), represents the ZVS current at full power, and also the maximum ZVS current that can be achieved or exceeded over the entire active power range. Levels above $I_{ZVS,FP}$ and up to $(1+1/M)\cdot I_{ZVS,FP}$ are possible, but over limited power intervals and at the expense of much larger tank RMS currents.

Trajectories (116) and (117), parameterized in terms of the normalized active power $U_{OUT}=P_{OUT}/P_{OUT}^{MAX}$ and of the normalized ZVS current on the output side $\alpha=i_{ZVS}/I_{ZVS,FP}$, induce the $(P_{OUT}, Q)$-to-$v_\phi$ mapping anticipated at the beginning of this section. It can be proven that (116) and (117) reduces to the expression of the MCT for $I_{ZVS}=0$, i.e. $v_{\phi,ZVS}(P_{OUT}, i_{ZVS}=0)=v_{\phi,MCT}(P_{OUT})$ for every $P_{OUT}$. As $I_{ZVS}$ increases from 0 to the full-power value, trajectories of the type $v_{\phi,ZVS}$ expand deeper and deeper into the inductive power region $R_I$, connecting the MRP to the MFP points by "circumventing" the capacitive power region $R_C$.

Figure 35:
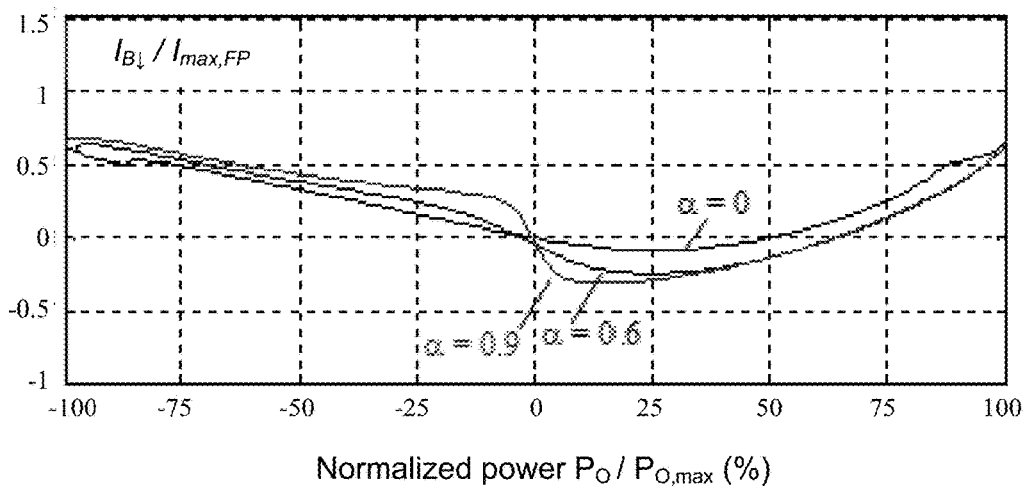
FIG. 35 depicts normalized input turn-off currents for leg B vs. normalized active power level along three different ZVS trajectories, M=0.5.

While the trajectory control approach described in the previous section allows to exploit the degrees of freedom provided by the multi-angle modulation to achieve full ZVS of the output devices, it exposes input devices $Q_1 \ldots Q_4$ and $Q_1'$ ... $Q_4'$ to hard switching over certain power levels. FIG. 35 depicts normalized input turn-off currents for leg B vs. normalized active power level along three different ZVS trajectories, M=0.5. The effect is exemplified for M=0.5 in FIG. 35, in which the theoretical turn-off current of leg B ($Q_3/Q_4$), indicated with and normalized to the full-power amplitude of the tank current, is reported versus the normalized active power level when a standalone DABSRC stage is operated along three different ZVS trajectories, each corresponding to a different level of output ZVS current α. Existence of a $i_{B\downarrow}<0$ interval implies hard-switching of devices $Q_3$ and $Q_4$ for the corresponding power levels. Behavior of leg A, not reported here, is symmetrical with respect to the zero power point and exhibits a hard-switching interval in the reverse power range.

Figure 84:
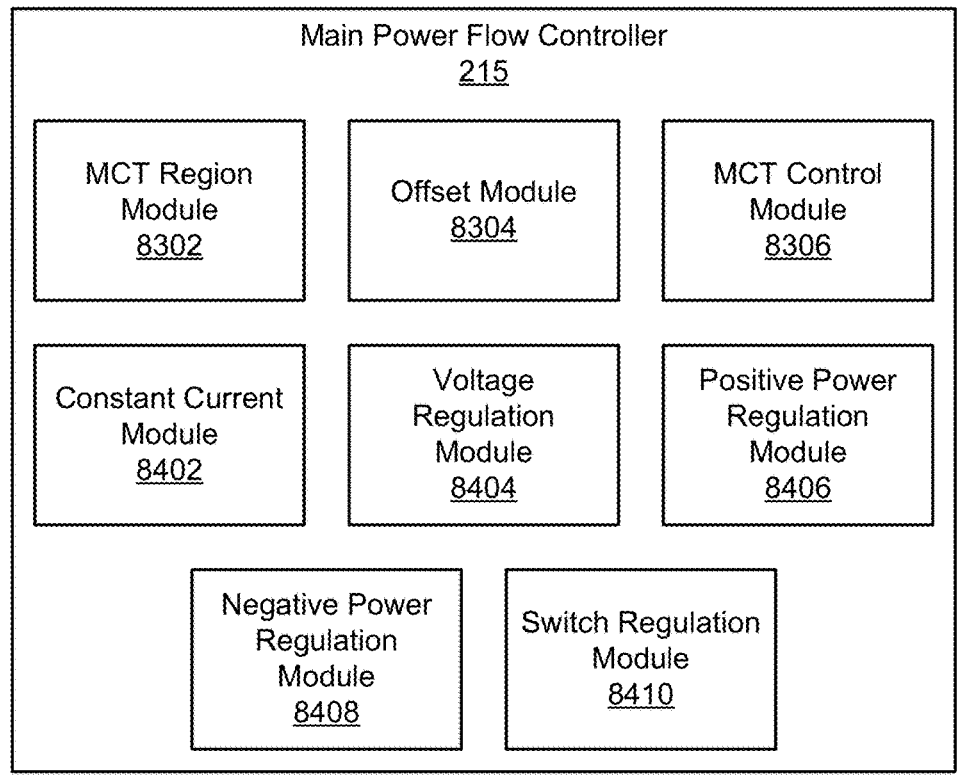
FIG. 84 is a schematic block diagram of another modified ZVS apparatus 8400 according to one embodiment of the present invention.

FIG. 84 is a schematic block diagram of another modified ZVS apparatus 8400 according to one embodiment of the present invention. The apparatus 8400 includes a includes an MCT region module 8302, an offset module 8304, and an MCT control module 8306, which may be substantially similar to those described above in relation to the apparatus 8300 of FIG. 83. The apparatus 8400 may also include, in various embodiments, a constant current module 8402, a voltage regulation module 8404, a positive power regulation module 8406, a negative power regulation module 8408, and switch regulation module 8410.

In one embodiment, the MCT control module 8306 includes a feed forward control loop. For example, the feed forward control loop may be as depicted in FIG. 15 and described above. The feed forward control loop may be part of the main power flow controller 215 and may control the phase shift modulators 230 driving the switches 105 of the resonant power converter 100. In another embodiment, the apparatus 8400 includes a constant current module 8402 that limits output current $I_{OUT}$ to a positive output current setpoint $I_{SET}$ in a range between a minimum output voltage $V_{OUT}$ and output power $P_{OUT}$ of the converter 10 reaching a positive power setpoint $P_{SET}$, where the constant current module 8402 includes a current feedback control loop that limits output current to below the positive output current setpoint $I_{SET}$. In another embodiment, the apparatus 8400 includes a voltage regulation module 8404, a positive power regulation module 8406, and a negative power regulation module 8408 which may be similar to those described above in section IV.3 regarding the multi-mode control apparatus 7900 of FIG. 79. In another embodiment, the constant current feedback loop includes compensation implemented using a gain scheduled feedback controller as described above in section IV.2 Gain Scheduling Feedback Control. The gain scheduled feedback controller may include one or more output control signals that vary over a plurality of control regions and the gain scheduled feedback controller may implement a different compensation equation for each control region.

In one embodiment the converter includes a second DABSRC stage as depicted in FIG. 30. In the embodiment, the converter 10 includes two DABSRC stages connected in parallel, where the midpoint A, A', B, B' on the first and second switching legs of the two DABSRC stages are each connected with a link. The link includes a linking inductor $L_{aux}$ connected in series with a linking capacitor $C_{aux}$. The MCT control module 8306 further controls a phase angle $\phi_{AA'}$ which a phase shift between the voltage at the midpoint A between switches of a first switching leg of a first DABSRC stage, $v_A$, and the voltage at the midpoint A' between switches of a first switching leg of a second DABSRC stage, $v_{A'}$. The MCT control module 8306 controls current in the links between the two DABSRC stages to be an inductive current, where the inductive current causes one or more of the switching legs of the full bridge switching networks on the primary sides of the two DABSRC stages to be in a ZVS region. Operation and control of the linked DABSRC stages is described below.

Figure 36:
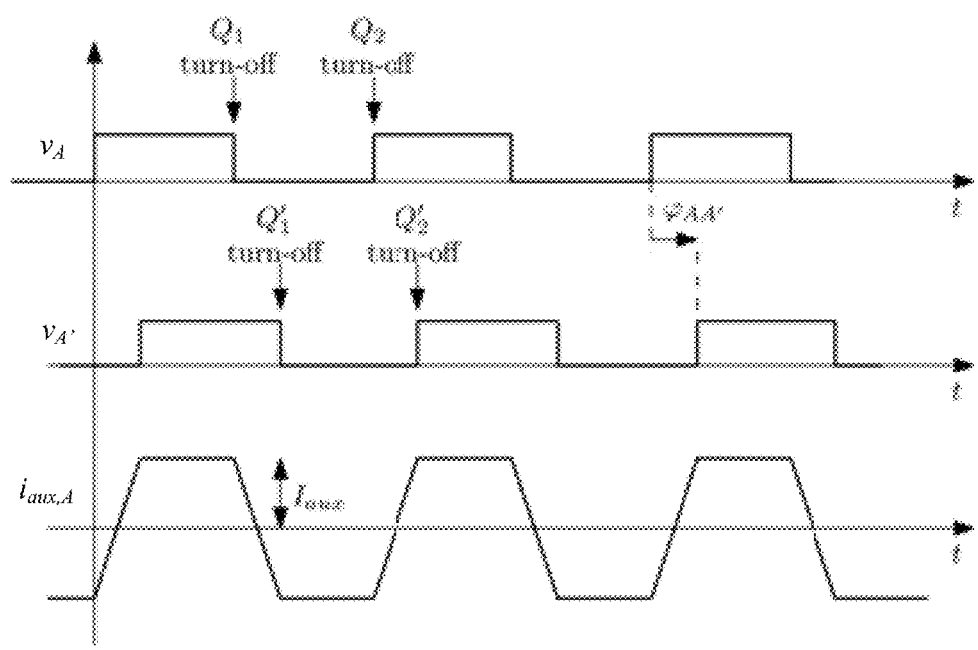
FIG. 36 depicts input ZVS operation via phase-shift between the two DABSRC stages: main waveforms.

FIG. 36 depicts input ZVS operation via phase-shift between the two DABSRC stages: main waveforms. Soft-switching on the input side can nonetheless be addressed by allowing two DABSRC stages to mutually assist each other via an inductive coupling between the input bridges as illustrated in FIG. 30 combined with a controlled phase-shift $\phi_{AA'}$ between the two DABSRC stages. The effect of $\alpha_{AA'}$ is that of building up a circulating inductive current through the auxiliary branches $L_{aux}$, proportional to the phase-shift itself, as sketched in FIG. 36 for the coupling between nodes A and A'. The extra inductive current $I_{aux}$ available at each input device turn-off instant is $$I_{aux} = \frac{V_g \cdot \varphi_{AA'}}{2 \cdot \omega_s \cdot L_{aux}}, 0 \leq \varphi_{AA'} \leq \pi. \tag{118}$$

Note that auxiliary capacitors $C_{aux}$ have the only function of preventing any DC current from flowing through the auxiliary branches.

Observe that phase shifting the two DABSRC stages does not impact the trajectory control approach for output ZVS operation described above, as it relies on an additional degree of freedom, i.e. $\phi_{AA'}$, which is independent of the control vector $v_\phi = v'_\phi$. Furthermore, at heavy load, where no auxiliary current is normally needed, the proposed technique would null $I_{aux}$ by saturating at $\phi_{AA'}=0$, therefore preserving the heavy load efficiency of the DABSRC stages.

Figure 37:
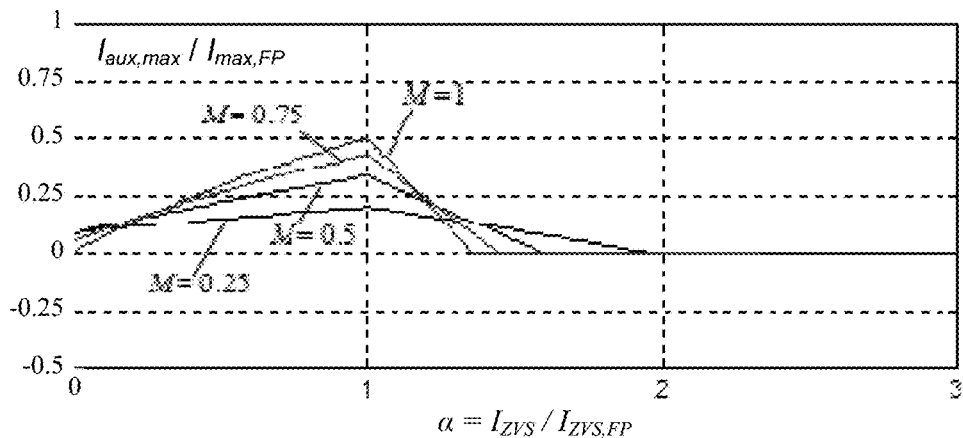
FIG. 37 illustrates the worst-case auxiliary current $I_{aux,max}$—normalized to the full-power tank current amplitude that needs to be injected at input nodes A/B in order to guarantee $\min(i_{A\downarrow}, i_{B\downarrow}) \geq 0$.

In view of the behavior illustrated in FIG. 35, it is of interest to evaluate how much negative turn-off current needs to be counteracted at nodes A and B as a function of the ZVS level requested on the output side. FIG. 37 illustrates the worst-case auxiliary current $I_{aux,max}$—normalized to the full-power tank current amplitude—that needs to be injected at input nodes A/B in order to guarantee min($i_{A\downarrow}$, $i_{B\downarrow}$)≥0. The plot is given as function of the normalized output ZVS command α and for M=0.25, 0.5, 0.75 and 1. Observe that, although $I_{aux,max}$ is zero for sufficiently high output ZVS levels, it must be remembered that such levels correspond to large tank RMS currents, and that therefore such operating points may nonetheless exhibit low efficiencies due to large conduction losses. For smaller output ZVS levels, FIG. 37 provides a starting point for the design of the required inductance $L_{aux}$.

Since based on passive coupling, the described approach has the advantage of not requiring additional switching devices for ZVS assistance. It also allows the DC/DC unit of FIG. 30 to remain a completely self-contained power module, prone to be paralleled/stacked with other similar modules for more complex and scalable DC power distribution systems. In another embodiment, the apparatus 8400 includes auxiliary switches and an auxiliary inductor for assisted ZVS along with a switch regulation module 8410 for assisted ZVS as described in relation to the assisted ZVS apparatus 2300 of FIG. 23 and as described in section V.1. The assisted ZVS apparatus 2300 may be used for switching legs not in ZVS using one of the techniques described above, such as described in relation to FIG. 33 or controlling angle $\phi_{AA'}$.

The foregoing ZVS technique provides two degrees of freedom, namely $I_{ZVS}$ and $\phi_{AA}$, which respectively allow a controller to independently adjust the turn-off current at the output and input side of the DABSRC stages. Although the work in this section focuses on the theory and open-loop validation of the discussed ZVS technique, it is important to point out that both $I_{ZVS}$ and $\phi_{AA}$ can be adjusted by two independent feedback loops so as to maintain the input and output turn-off currents at the desired set points. To this end, note that sensing the tank current would give such ZVS assistance control loops all the required information: as for the output turn-off current, it is the reflected version of the tank current sampled at the turn-off instant of any of the output devices; as for the input turn-off current, it is the sum of the tank current and of the auxiliary current, which can be considered known from $\phi_{AA}$ and $L_{aux}$ via (118). Implementation of the trajectory control equations (116) and (117) in a computationally affordable form represents another design challenge currently under investigation.

VI FPGA Controller Implementation

An FPGA based controller for the DABSRC has been designed based on the control analysis from previous sections. Implemented on a Virtex-5 FPGA device and coded in Verilog Hardware Design Language, the controller implements a number of simplifications in order to allow the design to be implemented in a reasonable amount of space. The FPGA used has a 100 MHz system clock which is increased to 200 MHz using a clock doubling PLL and includes block RAM for the implementation of the needed lookup tables. The converter switching frequency is set by stepping down the 100 MHz system clock to 97.7 kHz, and allows for 10 bit resolution in all phase shift angles. The 10 ns timing resolution possible when using a 100 MHz system clock with 10 bit phase angle resolution means that a maximum error of 0.1% is introduced into phase control angles by the phase shift modulator. All sensing in done with 12 bits of precision and internal computations on sensed variables are performed with 12 bit resolution. The lower two bits of 12 bit internal signals are only removed by the phase shift modulator during the last step of gate drive signal generation. The 200 MHz clock is used to access block RAM and to clock multipliers and dividers and all other logic blocks except for those involved in the final phase shift modulator for gate drive signal generation.

VI.1 MCT Modulator

In order to operate the DABSRC along the MCTs derived in Section IV.1 the converter output command must be translated into the correct three angle control vector. Two approaches are possible, the first using lookup tables and the second involving online computation of control angels by directly implementing the equations in (74) and (75) for the standard MCT or in (116) and (117) for the modified MCT. Only the standard MCT calculation will be dealt with here, although only small extensions are needed in order to implement the modified MCT calculations.

Using lookup tables to determine MCT control angles requires a two dimensional table using both converter output command as well as converter conversion ratio as indexes. Assuming that the converter conversion ratio is quantized as a 12 bit number $K_M$ and that the converter output command is a 12 bit number $K_{UCMD}$ which describes the full range of power outputs, a table for each control angle may be assembled with indexes of $N_M \leq K_M$ and $N_{UCMD} \leq K_{UCMD}$ for conversion ratio and output command respectively. Assuming $N_\phi$ bits are used to represent control angles, the total table size $Q_{MCT}$ can be calculated as $$Q_{MCT} = 3(2^{(N_M + N_{UCMD} + N_\phi)}). \tag{119}$$

In order to keep the total storage size below 1-Mb for reasonable storage on an FPGA without external memory, a combined bit width $N = N_M + N_{UCMD} N_\phi$ of less than 18 bits is required. If only a few conversion ratios are needed, then this approach becomes acceptable, although in general the errors introduced with this method are unacceptable if storage size is kept within reasonable limits. For these reasons, a direct computation of the MCTs based on (74) and (75) is preferable.

Because of the complexity of (74) and (75) simplification is useful before implementation on the FPGA. To increase the symmetry of the MCTs, a new variable G, $$G = \begin{cases} M: & V_{OUT} \leq V_{IN} \\ \dfrac{1}{M}: & V_{OUT} > V_{IN} \end{cases}, \in [0, 1], \tag{120}$$

is introduced. This simplification reduced the three MCT trajectories of interest to $$\gamma_{1+}: \begin{cases} \varphi_{AB} = 2\pi - 2\arcsin\left(\sqrt{G^2 + (U_{OUT})^2}\right) \\ \varphi_{DC} = \pi \\ \varphi_{AD} = \dfrac{\varphi_{AB}}{2} + \arctan\left(\dfrac{U_{OUT}}{G}\right) - \dfrac{\pi}{2} \end{cases}, \tag{121}$$

when $|U_{OUT}| \leq \sqrt{1 - G^2}$ and $M \leq 1$, $$\gamma_2: \begin{cases} \varphi_{AB} = \varphi_{DC} = \pi \\ \varphi_{AD} = \arcsin(U_{OUT}) \end{cases}, \tag{122}$$

when $|U_{OUT}| \geq \sqrt{1 - G^2}$, $$\lambda_{1+}: \begin{cases} \varphi_{DC} = 2\pi - 2\arcsin\left(\sqrt{G^2 + (U_{OUT})^2}\right) \\ \varphi_{AB} = \pi \\ \varphi_{AD} = \dfrac{-\varphi_{DC}}{2} + \arctan\left(\dfrac{U_{OUT}}{G}\right) + \dfrac{\pi}{2} \end{cases}, \tag{123}$$

when $|U_{OUT}| \leq \sqrt{1 - G^2}$ and $M > 1$.

Comparing $\phi_{AB}$ in (121) with $\phi_{DC}$ in (123) and $\phi_{DC}$ in (121) with $\phi_{AB}$ in (123) shows that a further simplification can be made by defining off-angle $\phi_{PS}$ $$\phi_{PS} = 2\pi - 2\arcsin(\sqrt{G^2 + (U_{OUT})^2}) \tag{124}$$

partial main angle $\phi_X$, $$\varphi_X = \arctan\left(\dfrac{U_{OUT}}{G}\right) \tag{125}$$

temporary angle $\phi_y$, $$\phi_y = \arcsin(U_{OUT}) \tag{126}$$

and trajectory selection flag Q $$Q = \begin{cases} 1 & |U_{OUT}| \leq \sqrt{1 - G^2} \\ 0 & |U_{OUT}| > \sqrt{1 - G^2} \end{cases}. \tag{127}$$

Combining (124) and (127) with (121)-(123) results in simplified equations for each of the three control angles, $$\varphi_{AB} = \begin{cases} \varphi_{PS} & (Q = 1) \text{ and } (M \leq 1) \\ \pi & \text{else} \end{cases}, \tag{128}$$

$$\varphi_{DC} = \begin{cases} \varphi_{PS} & (Q = 1) \text{ and } (M > 1) \\ \pi & \text{else} \end{cases}, \tag{129}$$

$$\varphi_{AD} = \begin{cases} \varphi_y & Q = 0 \\ \varphi_x + \frac{1}{2}(\varphi_{PS} - \pi) & (Q = 1) \text{ and } (M \leq 1) \\ \varphi_x - \frac{1}{2}(\varphi_{PS} - \pi) & (Q = 1) \text{ and } (M > 1) \end{cases}. \tag{130}$$

Divisions and multiplications by 2 in (128)-(130) can be accomplished using bit shifts, while $G^2$ and $U_{CMD}^2$ can be computed using either a multiplier or a look up table. The same lookup table may be used for both quantities by taking the magnitude and bit shifting $U_{CMD}$ before referencing the table. Using multipliers requires less space in general, and can again be accomplished with a single element for both $G^2$ and $U_{CMD}^2$. To avoid computation of both an arctangent and an arcsine, the arctangents in (128)-(130) are computed using the identity $$\arctan(x) = \arcsin\left(\frac{x}{\sqrt{1 + x^2}}\right) \tag{131}$$

which requires a squaring function, a square root function, and an arcsine function. With this substitution, only a square root and an arcsine remain to be computed. Fortunately the CORDIC algorithm allows computation of these two functions digitally on an FPGA. All functions generated by a CORDIC are possible to generate using look up tables, multipliers, or power series implementations, although in general a CORDIC implementation will allow for higher accuracy in less space.

Figure 38:
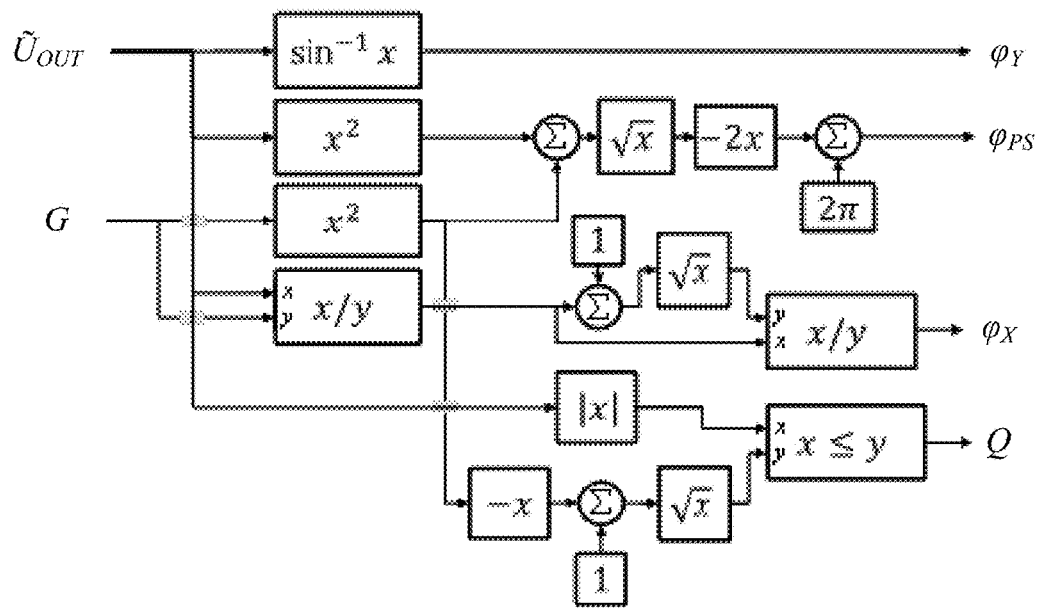
FIG. 38 is a computation flowchart for FPGA based MCT calculation.
Figures 39, 40:
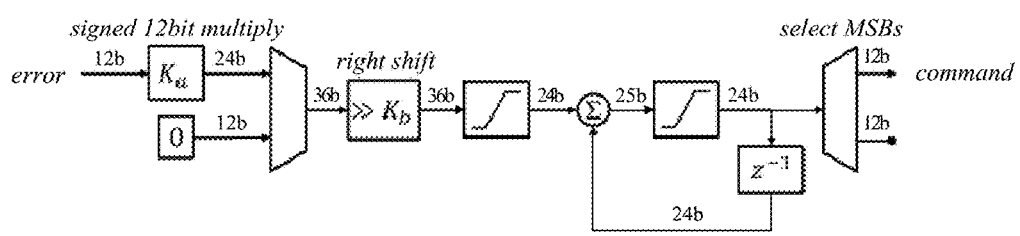
FIG. 39 depicts logic statements needed to combine partial phase angles into final control angles.
FIG. 40 is a direct form I implementation of the output current feedback controller.

FIG. 38 is a computation flowchart for FPGA based MCT calculation. Equations (124)-(127) are calculated as seen in FIG. 38. To reduce the fabric space needed for implementation time multiplexing may be used such that only a single block of each function type is needed. For the fastest computation time multiplexing is not used and FIG. 38 is implemented directly. In either case a set of if statements are used to generate the final control angles as seen in FIG. 39. FIG. 39 depicts logic statements needed to combine partial phase angles into final control angles.

In the prototype hardware built, computation of MCT angles is done without time multiplexing such that minimum time is taken to compute a new set of phase angles from output command and conversion ratio. This implementation requires a total of five multipliers, three dividers, and six CORDIC blocks. All computations use 12 bits, with operations resulting in 24 bits such as multiplication truncated back to twelve before further computations are performed.

VI.2 Gain Scheduled Feedback Controller

In order to generate the output command on which the MCT calculation acts, a digital integral controller is used. This controller includes a variable gain block in order to implement the gain scheduling scheme derived in Section IV.2.

The desire continuous time controller from Section IV.2 is transformed into discrete time using the forward rectangular rule, $$\frac{dx(kT_s)}{dt} \cong \frac{x(kT_s + T_s) - x(kT_s)}{T_s}. \tag{132}$$

By sampling the average output current at the switching frequency $f_s=1/T_s=100$ kHz errors introduced by this method of conversion are kept to a minimum. The resulting feedback equation for error signal e(k) and control output U(k) becomes $$U[k+1]=T_s K_i e[k]+U[k]. \tag{133}$$

For a given discrete gain $K_i^{Disc}=T_s K_i$, two constant integers $K_A$ and $K_B$ are selected such that $$K_i^{Disc} = \frac{K_A}{2^{K_B}}. \tag{134}$$

In this way, only integer multiplication and right-shifts are needed to generate fractional gains. A MATAB script is used to select the appropriate parameters $K_A$ and $K_B$, which are stored in two dimensional look-up tables on the Virtex-5. Bit-widths for $K_A$ and $K_B$ are selected using a script to minimize the error between $K_i^{Disc}$ and the ideal gain for each operating point. This is done is such a way that the resulting discrete gain is never larger than its equivalent ideal gain to ensure that stability margins are maintained. Each cycle, the current operating point is recalculated based on a running average of the last eight samples for both current and voltage. Based on this average operating point, a new gain is selected for the controller every switching cycle using conversion ratio and output command to index into the pre-computed $K_A$ and $K_B$ lookup tables.

FIG. 40 is a direct form I implementation of the output current feedback controller. The digital integral controller used for current regulation of the DABSRC is implemented as a direct form I controller as seen in FIG. 40. A signed multiplier with two twelve bit inputs is used to multiply the controller error signal by gain $K_a$. The resulting 24 bit number is extended with 12 bits of zero and then shifted by $K_b$ bits in order to complete the full gain multiplication. This result is then downsized with saturation to 24 bits before being summed with the previous state. This summation is done by extending each input by a single bit, and then saturating the result back down to 24 bits. This result is stored as the previous state every switching clock cycle, and is threshold limited to 2016. The upper 12 bits of this result are used as the new command variable which is sent into the MCT calculation code in order to generate new phase shift angles for the DABSRC hardware.

VI.3 PSM Leg ZVS Assistance Controller

Figure 41:
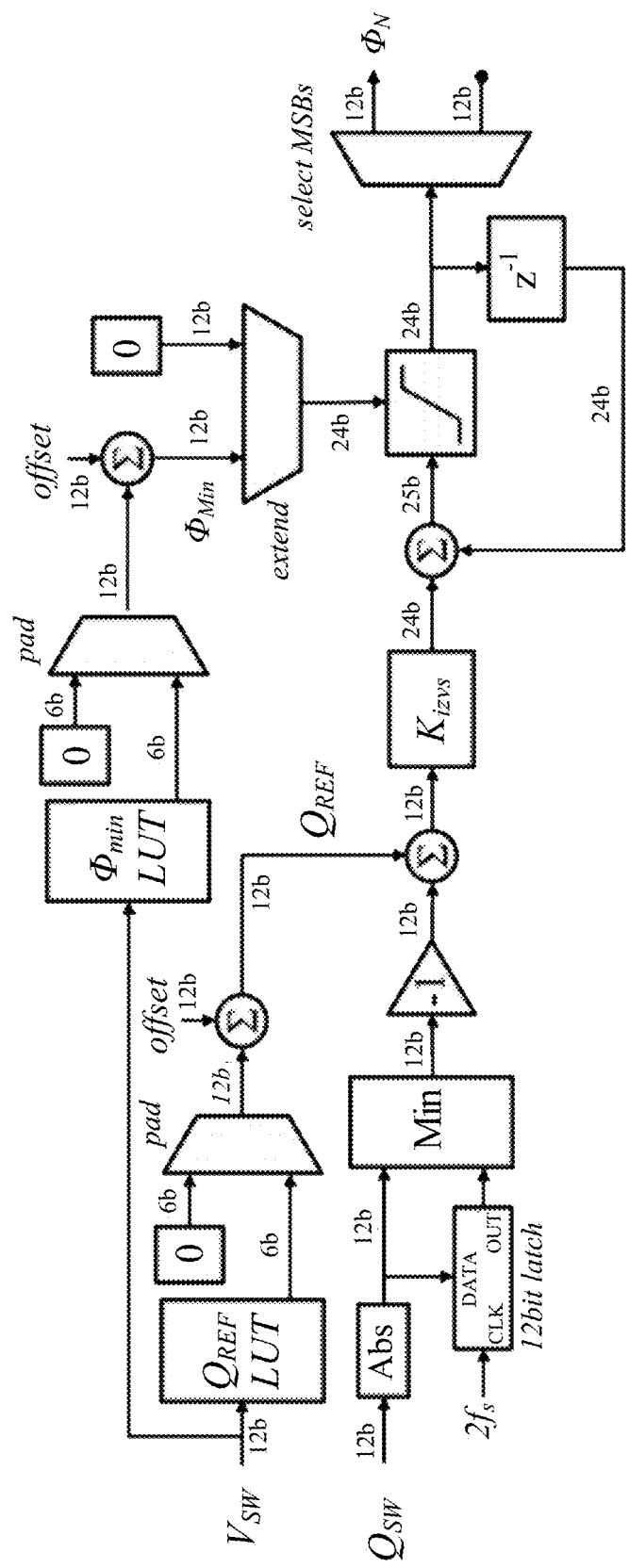
FIG. 41 is a schematic block diagram of a ZVS controller implemented with two lookup tables for $\Phi_{Min}$ and $Q_{REF}$.

The PSM leg ZVS controllers are implemented based on the results of Section V.2. This design requires an integral controller and the use of two look up tables for storing both the minimum phase shift angle for ensuring auxiliary leg soft switching as well as the voltage dependent charge reference for ensuring main leg ZVS transitions as seen in FIG. 41. FIG. 41 is a schematic block diagram of a ZVS controller implemented with two lookup tables for $\Phi_{Min}$ and $Q_{REF}$.

Each PSM-HB leg operates independently from the rest, requiring four individual integral controllers. For each main leg, measurements of the charge delivered into the main switch node are taken twice a switching cycle at both the main switch leg rising transition and falling transition. Ideally the two returned values are equal in magnitude but of opposite sign. Due to non-idealities, small variations exist and so the minimum of the absolute value of the two measurements it taken. This 12 bit value is then subtracted from the needed charge reference provided by a bus voltage dependent lookup table and multiplied by the integral gain derived in Section V.2 using a 12 bit multiplier. The same integral controller setup seen in VI.2 is then used.

Each switching cycle a new minimum phase shift angle is determined using a lookup table based on the measured bus voltage. This minimum phase shift is applied to both the output of the integral controller block as well as to the stored previous state. In addition to this variable minimum output, a maximum output corresponding to a π degree phase shift is applied.

The two lookup tables used for ZVS operation are stored in the same manner using two port block RAM on the FPGA device. To minimize table size, the stored values are first level shifted such that the minimum value stored is zero. This reduces the number of bits needed for each charge reference or minimum angle but requires the level shift offset to be reapplied before the values are used as seen in FIG. 41.

Figure 42:
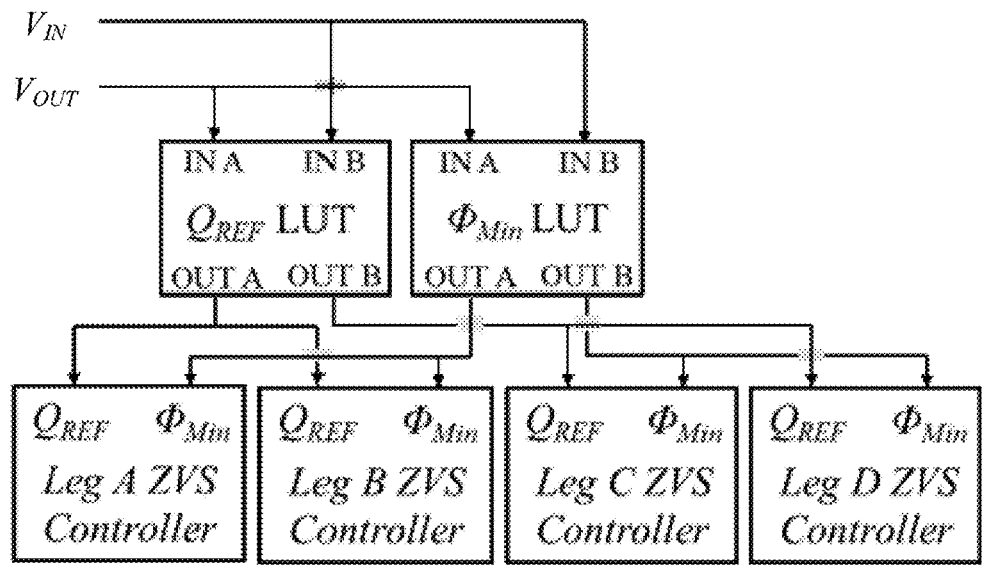
FIG. 42 is a ZVS lookup table connections for $\Phi_{Min}$ and $Q_{REF}$.

Using two port block RAM allows both the primary and secondary pairs of PSM half bridges to index using the possibly different primary and secondary bus voltages without regard for timing considerations as seen in FIG. 42. FIG. 42 includes ZVS lookup table connections for $\Phi_{Min}$ and $Q_{REF}$. Two port LUTs allow only two tables to be used for all ZVs legs. Due to the unknowable phase shift between any two ZVS legs, this greatly reduces the complexity of implementing the ZVS assistance lookup tables. As the voltage for the primary ZVS legs is the same, and similar for the secondary pair, only a single minimum phase shift table and a single charge reference table are needed. As the relation between bridge voltage and both minimum phase shift angle and charge reference is a smooth function, an extremely small table may be used to store each with linear interpolation used between points.

VI.4 Multi-Mode Control

Multi-mode control of the DABSRC is implemented using power, voltage, and current references. Each of these references is represented as a signed 12 bit number scaled to be between −1 and 1. Using these set points, as well as the measured and averaged converter output voltage and current, the multi-mode controller generates a current reference used as an input for the gain-scheduled feedback controller.

The integral controller designed in Section IV.3 and seen in (94) is implemented on the FPGA controller as a direct form I cascaded controller by cascading two single pole controllers. Each single stage is implemented in the same way as described here and as seen in FIG. 43. FIG. 43 is a schematic block diagram of a single pole controller implementation for a cascaded two pole MMC controller.

The input signal to each stage is initially multiplied by a 12 bit gain $b_0$ resulting in a 24 bit signal. The saved previous state is stored as a 22 bit number, which when multiplied by a 12 bit gain $a_0$ results in a 34 bit signal. After zero extending the 24 bit scaled error, these two quantities are summed and then downsized with saturation into a 22 bit result. This result is next saturated to the magnitude of the converter current reference and sent out of the stage as well as stored as the saved previous state. This method for saturating the voltage and power outer loop controllers results in smooth mode transitions. This removes the requirement for complicated mode transition logic and greatly simplifies the overall digital design. The output from these pairs of cascaded controllers is a current reference needed for regulation of either power or voltage.

Error signals for power and voltage control are generated separately using error generation modules. A current reference error signal is not necessary, as saturation is used to enforce the current limit as seen in Section IV.3. Droop is added to the current reference using a 12 bit multiplier before being used to saturate the voltage and power controllers.

Two separate voltage errors are derived in the multi-mode controller as seen in FIG. 44. FIG. 44 is a schematic block diagram of one embodiment of a MMC voltage controller error generation including droop resistance. The first error signal $V_{sign}$ is taken as the simple difference between the measured output voltage and the voltage reference without droop added. The upper bit of this result is then used to determine the sign of the result. This sign determines whether the converter is operating in forward power or reverse power mode. The second voltage error signal $V_{error}$ is generated by first adding droop to the voltage reference. This droop is calculated by multiplying the converter output current by the voltage droop resistance, and then subtracting the result from the voltage reference. This value is then subtracted from the measured converter output voltage, resulting in a voltage error which is used for feedback control.

Figure 45:
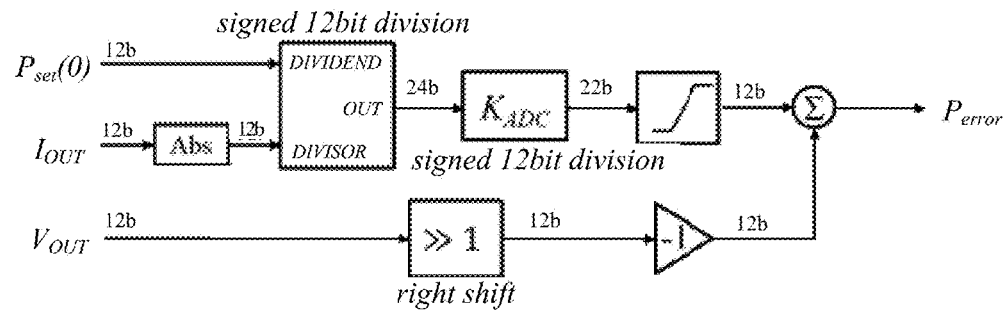
FIG. 45 is a schematic block diagram of one embodiment of a MMC power controller error generation.

FIG. 45 is a schematic block diagram of one embodiment of a MMC power controller error generation. The power error signal (FIG. 45) is generated by first dividing the power set point by the absolute value of the measure converter output current, resulting in a 24 bit signal. This signal is then scaled through multiplication by a 12 bit gain dependent voltage and current measurement ADC gains in order to keep units correctly represented. This multiplication results in a 22 bit output, which is then downsized with saturation to a 12 bit result. Finally, the output voltage of the converter divided by 2 is subtracted from this value to generate the final power error for feedback control.

FIG. 46 is a schematic block diagram of one embodiment of current reference selection logic for MMC. In order to determine the active control loop, the minimum of the absolute value of both the current reference for voltage control, $I_{REF}^V$, and the current reference for power control, $I_{REF}^P$, are taken (FIG. 46). If the voltage control reference is the minimum quantity, then this reference is selected directly. If the power reference is the minimum quantity, then the sign bit found in Section VI.4 is used to determine power flow direction. After correctly assigning the sign of the current reference for power control, this quantity is selected. The selected current reference $I_{REF}$ is sent out of the multi-mode control module, and used as a current reference for the gain scheduled current controller of the DABSRC.

VII Simulation Models

In order to verify the analytical results from the previous sections, a number of simulation models of varying accuracy have been developed. Beginning with a full switching model including tank losses and component non-idealities implemented in LTSpice, the models increase in simulation speed and decrease in complexity up to a system level model useful for analyzing a MMC DABSRC as part of a larger power system.

VII.1 Switching Level Models

Switching level models of the DABSRC are designed using a spice simulator. These models provide the highest level of accuracy with respect to hardware. Using simulation models provided by device manufacturers, the effect of different switching devices can be evaluated. Other non-idealities include transformer coupling and stray capacitance/inductance, resonant capacitor ESR and tank component mismatch, switching component on resistance, as well as switch node capacitance.

A full model of the DABSRC including four ZVS assistance legs has been developed. This model uses static control angles to investigate the operation of the DABSRC at the desired operating point. Although extremely accurate, a switching level model of this accuracy takes a large amount of time to run.

VII.2 Approximated Switching Level Models

To reduce the simulation time of a full switching level model, approximated switching models are designed in Simulink using the PLECS block set for power electronics. These models remove many of the non-idealities present in a full switching simulation and allow the model to directly interface with the MATLAB environment.

The approximated switching level model developed uses a simplified tank design with a single capacitor and a single inductor. An ideal tank transformer is used to further reduce simulation complexity. Tank losses are approximated with a lumped resistor element, in order to maintain the needed Q factor of the resonant tank. By using ideal switching elements, simulation time is further reduced. Switch nodes include no capacitance, either external or internal to switching elements. This reduces the order of the simulation and provides the greatest increases in speed.

The approximated switching model includes a phase shift modulator in order to generate phase shift control signals for the DABSRC. This model assumes no quantization error on PWM outputs, and provides timing resolutions of the selected simulation time step for all reasonable values. Finally, an MCT calculation block may be included, allowing the DABSRC to be controlled along the MCT by using an output command, $U_{CMD}$ to set phase angles.

VII.3 Small Signal Models

The small signal models of Section III.3 are easily implemented in MATLAB and allow simplified controller design. Additionally they may be directly compared with the approximated switching level model of Section VII.2 in order to verify their accuracy.

All small signal models are stored in state space form in MATLAB due to the reduced accuracy that a transfer function representation results in for high order models such as those describing the DABSRC. All quantities are stated in terms of the input voltage and conversion ratio, such that output voltage is not directly known in the simulation environment. This allows all quantities to be scaled by the input voltage, providing models which are independent of voltage, and only depend on conversion ratio and power level.

VII.4 System Level Models

In order to test the DABSRC as a component of a larger power system, a system level model was developed. This model describes a variable number of DABSRC stages connected together to form a converter module. In addition, the multi-mode controller (MMC) used to provided power, voltage and current limits is modeled to match FPGA implementations as closely as possible without over complicating the simulations.

Two versions of this model have been designed and tested. The first contains a continuous controller model of the MMC, while the second is a mixed signal model using a digital controller implementation. Both models are interchangeable and configured the same way, although the mixed signal version generally simulates faster. Both implementations represent the DABSRC as a current source with a bandwidth determined by the gain scheduled controller. In general this allows the DABSRC to function as a first order low pass filter with a pole at the desired converter bandwidth. ZVS assistance circuitry is ignored for this model, as the control loops involved have no effect on the overall system.

As the prototype hardware built uses a small microcontroller in order to interface between a module of multiple DABSRC stages and a control computer, the system level model includes an approximation of this interface. This portion of the model allows the system to be interacted with in the same way and with the same commands as the physical hardware would be. Saturation and quantization caused by the microcontroller interface are included when needed.

In order to allow for arbitrary loads connected to the output of the DABSRC module, the output voltage is fed as an input into the converter model. This allows either a further simulation model or transfer function to determine the relation between converter output current and voltage. To test this functionality, a switched load was developed which models constant power, voltage, resistance, or capacitance.

Finally, the system level model uses experimentally collected efficiency data in order to estimate the system efficiency at any operating point. This is done using a table of efficiency measurements from a single DABSRC prototype, and interpolating between points in order to approximate system efficiency.

VIII Experimental Verification

Experimental verification was carried out using the converter designed in Section III.2. Two identical prototype converters were designed for verification so that converter interconnection could be studied. Analytical results in this chapter are compared with the models developed in Section VII, while experimental results are generated with prototype converters running the controllers designed in Section V.

VIII.1 Prototype Converter

Prototype converters were designed using four layer PCBs with equal layer spacing and 2 OZ copper traces. Shielded differential pair connections are used to connect each converter to its controller FPGA. Hand wound inductors are used for both auxiliary and tank components. The isolation transformer was designed and assembled off-sight. Each converter includes an oversized EMI filter on both the input and output terminals. 10 kV isolation is achieved between both primary and secondary sides of the converter. Additionally, 10 kV isolation between the controllers and the converters is included. A bank of fans is used to cool the converters, which are enclosed either in an acrylic or metal case for safety and transport. Thermocouple sensors are attached to both the primary and secondary main switching elements in order to monitor device temperatures. For safety and converter protection, over voltage shutoff circuitry is included on both the primary and secondary voltage busses.

VIII.2 Small Signal Models

The transfer functions from Section III.3 can be verified both in simulation and hardware. Mathematica was used for all transfer function calculations, while MATLAB was used to plot step and frequency responses. A tank Q factor of 25 was used for simulation.

Figure 47:
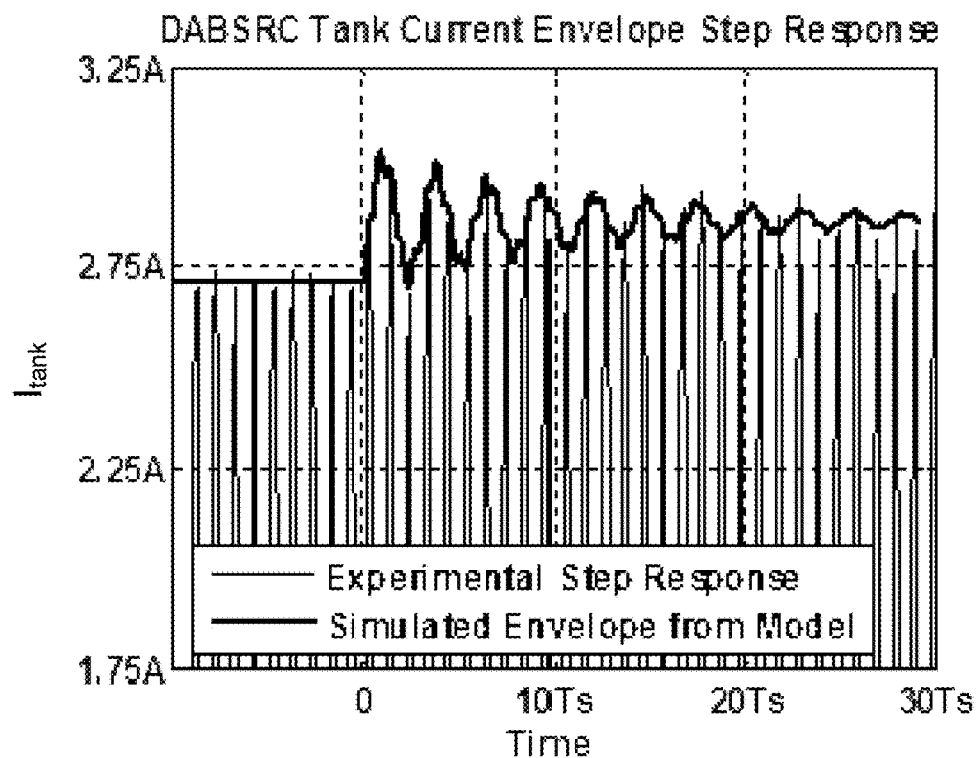
FIG. 47 FIG. 47 depicts an experimental step response of the DABSRC tank current compared to the model.

Initial verification of converter transfer functions was done by examining the step response of the tank current with respect to changes in control angle. FIG. 47 depicts an experimental step response of the DABSRC tank current compared to the model. Steady state control angles at $\{\phi_{AB}=180, \phi_{AD}=84, \phi_{DC}=180\}$ with a positive 4 degree step in $\phi_{AD}$. FIG. 47 includes an experimental step response of the DABSRC tank current compared to the model. Steady state control angles at $\{\phi_{AB}=180, \phi_{AD}=84, \phi_{DC}=180$ with a positive 4 degree step in (MD. FIG. 47 displays an experimentally obtained step response in the tank current with respect to $\phi_{AD}$. In addition an analytical step response from the derived model is shown. The two show good matching in terms of settling time, overshoot, and ripple frequency.

Additional verification was done by introducing a sinusoidal signal of known frequency and magnitude onto each control angle, and examining the Fast Fourier Transform ("FFT") of the tank current and the output current at a variety of frequencies. These points are then compared to plots of the expected frequency response. As the response of the DABSRC varies with DC operating point, these experiments were carried out at a variety of steady state locations.

Figure 48:
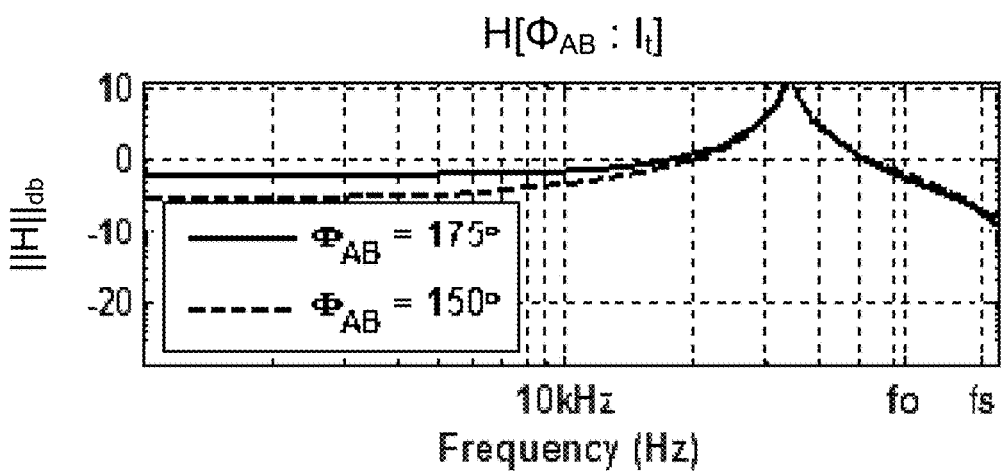
FIG. 48 depicts simulated function $$H^{ab}_{\|i_T\|}$$
Figure 49:
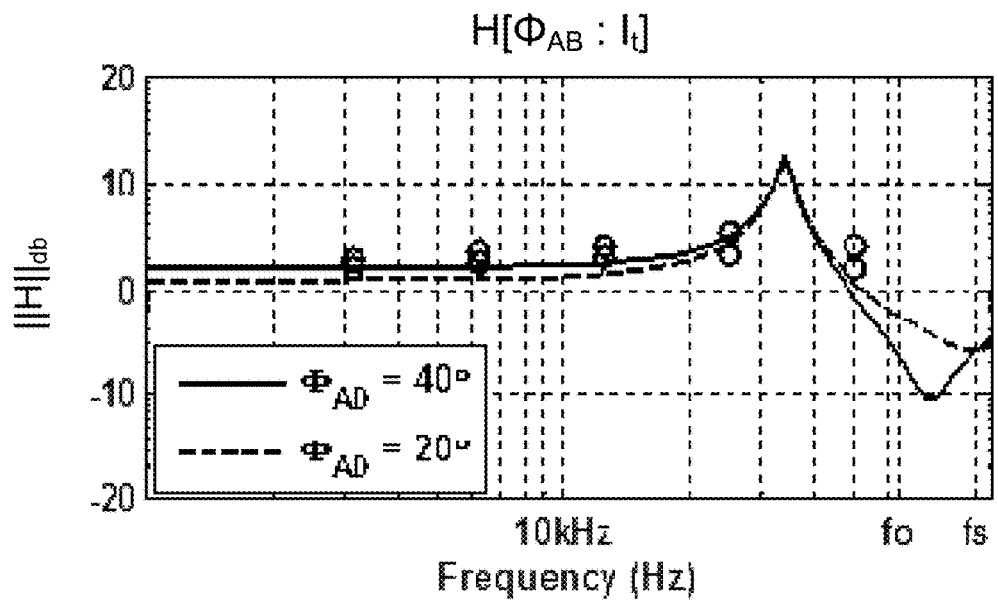
FIG. 49 depicts simulated function $$H^{ad}_{\|i_T\|}$$
Figure 50:
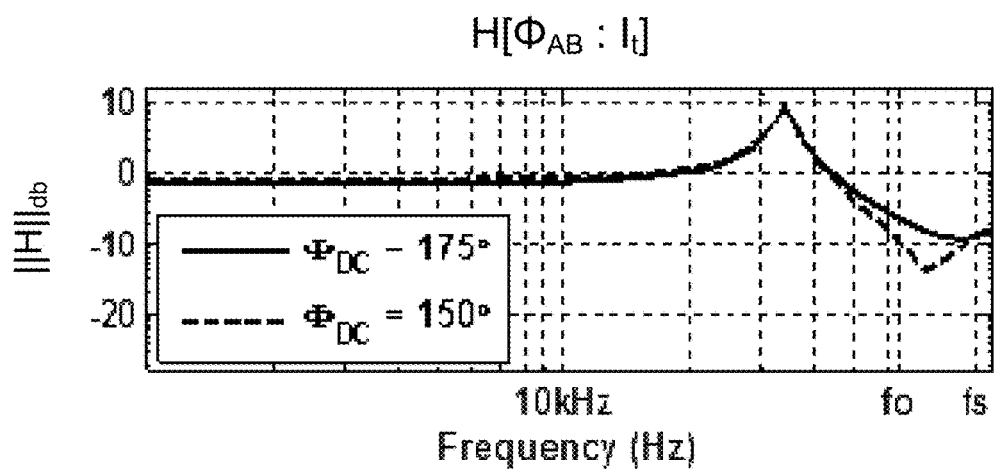
FIG. 50 depicts simulated function $$H^{dc}_{\|i_T\|}$$

FIGS. 48-50 show the expected magnitude response of the tank current with respect to each of the three control angles. Experimentally gathered data on the frequency response of the tank current with respect to perturbations in $\phi_{AD}$ has been overlaid on the appropriate plot. FIG. 48 depicts simulated function $$H_{\|i\overline{T}\|}^{ab}$$

with $\Phi_{DC}=180°$, and $\Phi_{AD}=90°$. FIG. 49 depicts simulated function $$H_{\|i\overline{T}\|}^{ad}$$

with $\Phi_{AB}=180°$, and $\Phi_{DC}=180°$. Experimental data in circles for ±4° perturbations are plotted on top of derived response at 3.125 kHz, 6.25 kHz, 12.5 kHz, 25 kHz, and 50 kHz. FIG. 50 depicts simulated function $$H_{\|i\overline{T}\|}^{dc}$$

with $\Phi_{AB}=180°$, and $\Phi_{AD}=90°$.

Figure 51:
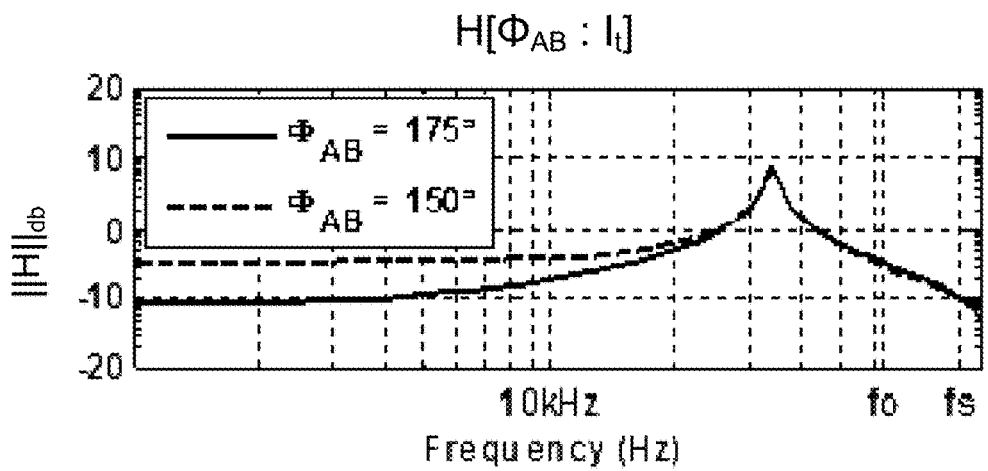
FIG. 51 depicts simulated function $H_{i_o}^{ab}$ with $\Phi_{DC}=180°$, and $\Phi_{AD}=90°$.
Figure 52:
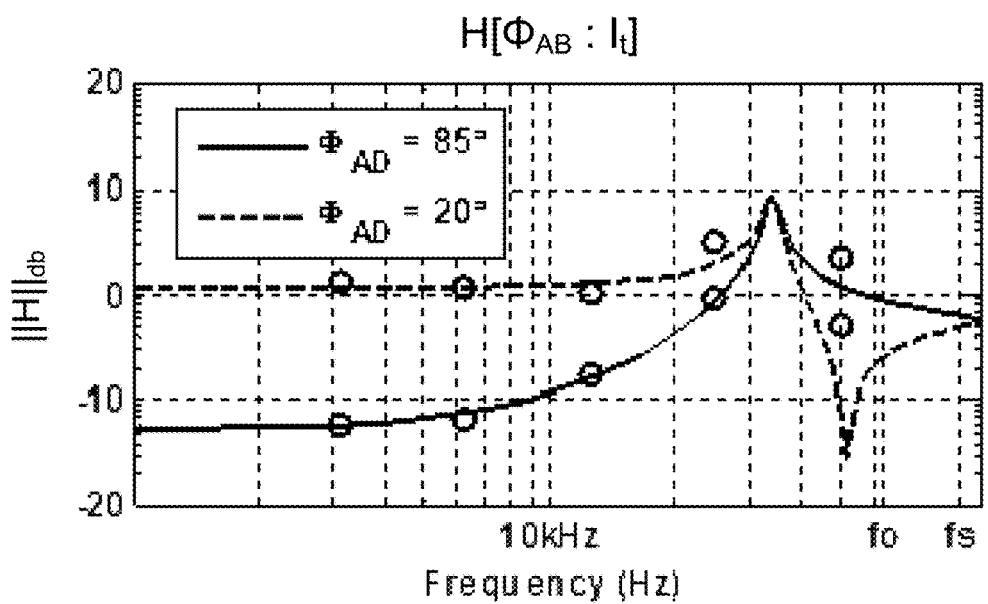
FIG. 52 depicts $H_{i_o}^{ab}$ with $\Phi_{AB}=180°$, and $\Phi_{DC}=180°$.
Figure 53:
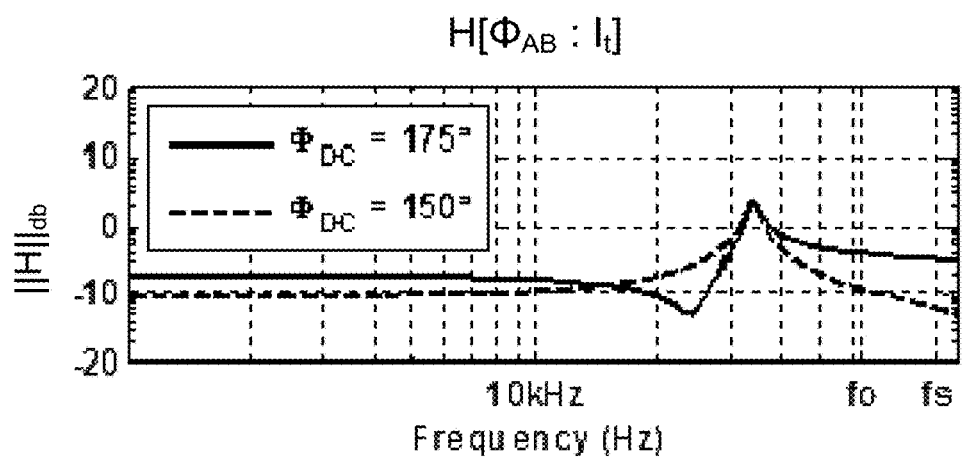
FIG. 53 depicts simulated function $H_{i_o}^{dc}$ with $\Phi_{AB}=180°$, and $\Phi_{AD}=90°$.

Output current magnitude responses are plotted in FIGS. 51-53, with a comparison of experimentally measured data superimposed on FIG. 52. FIG. 51 depicts simulated function $H_{i_o}^{ab}$ with $\Phi_{DC}=180°$, and $\Phi_{AD}=90°$. FIG. 52 depicts $H_{i_o}^{ab}$ with $\Phi_{AB}=180°$, and $\Phi_{DC}=180°$. Experimental data in circles for ±4° perturbations are plotted on top of derived response. FIG. 53 depicts simulated function $H_{i_o}^{dc}$ with $\Phi_{AB}=180°$, and $\Phi_{AD}=90°$. The clear matching in these results leads to the conclusion that the transfer functions derived in this paper are reliable models of the DABSRC converter. The behavior seen in these results shows a high degree of transfer function variability with respect to control angle values, and therefore converter operating point. This insight into the changing behavior of the DABSRC affects the design of feedback controllers based around this topology, and so proves quite useful.

VIII.3 Verification of the MCTs

The simulation model described in Section VII.2 set up in order to simulate the foregoing design and investigate how closely the analysis describes the behavior of the DABSRC stage. The two major effects accounted for by the simulations and not considered by the theoretical analysis are the non-sinusoidal nature of the voltage and current waveforms, and a non-zero dead time $t_d$. The model simulates the DABSRC in open-loop conditions with a programmable control vector $v_\phi$, allowing simulation of an arbitrary point in the control space $C_s$. Case M=0.5 is exemplified in this section, obtained by setting $V_{OUT}=200$ V. Note that the maximum available power is in this case halved with respect to the nominal rating, according to (32). A first set of simulations was performed along the theoretical minimum current trajectories in the $[-P_{OUT}^{MAX}, P_{OUT}^{MAX}]$ range, sweeping the operating point from the MRP to the MFP point; the positive branch $\gamma_{1+}$ of the MCT was chosen as the minimum current path over the $|P_{OUT}/P_{OUT}^{MAX}|\leq(1-M^2)^{1/2}$ power range.

Figure 54:
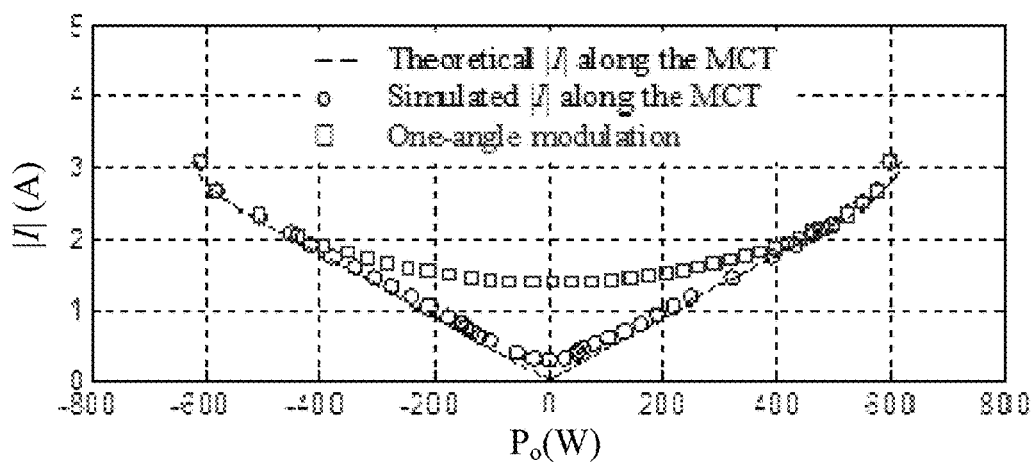
FIG. 54 depicts simulated RMS tank current, M=0.5 example.

FIG. 54 depicts simulated RMS tank current, M=0.5 example. In FIG. 54 the simulated and theoretical RMS currents are reported as a function of the output power. Also reported is the simulated RMS tank current when the DABSRC is operated according to the more conventional one-angle phase-shift modulation ($\phi_{AB}=\phi_{DC}=180°$, $\phi_{AD}=\arcsin(P_o/P_{o,max})$). The approximated switching level model of Section VII.2 was used for these results. As expected, a large circulating current is observed at light load compared with the minimum current operation. On the other hand the MCT brings the tank current close to the theoretical expected minimum in spite of the harmonic distortion and non-zero dead time accounted by the simulation. Simulation tests were then carried out as a follow-up to the discussion developed in Section IV.1 regarding the soft switching behavior of the DABSRC along the MCT.

Figure 55:
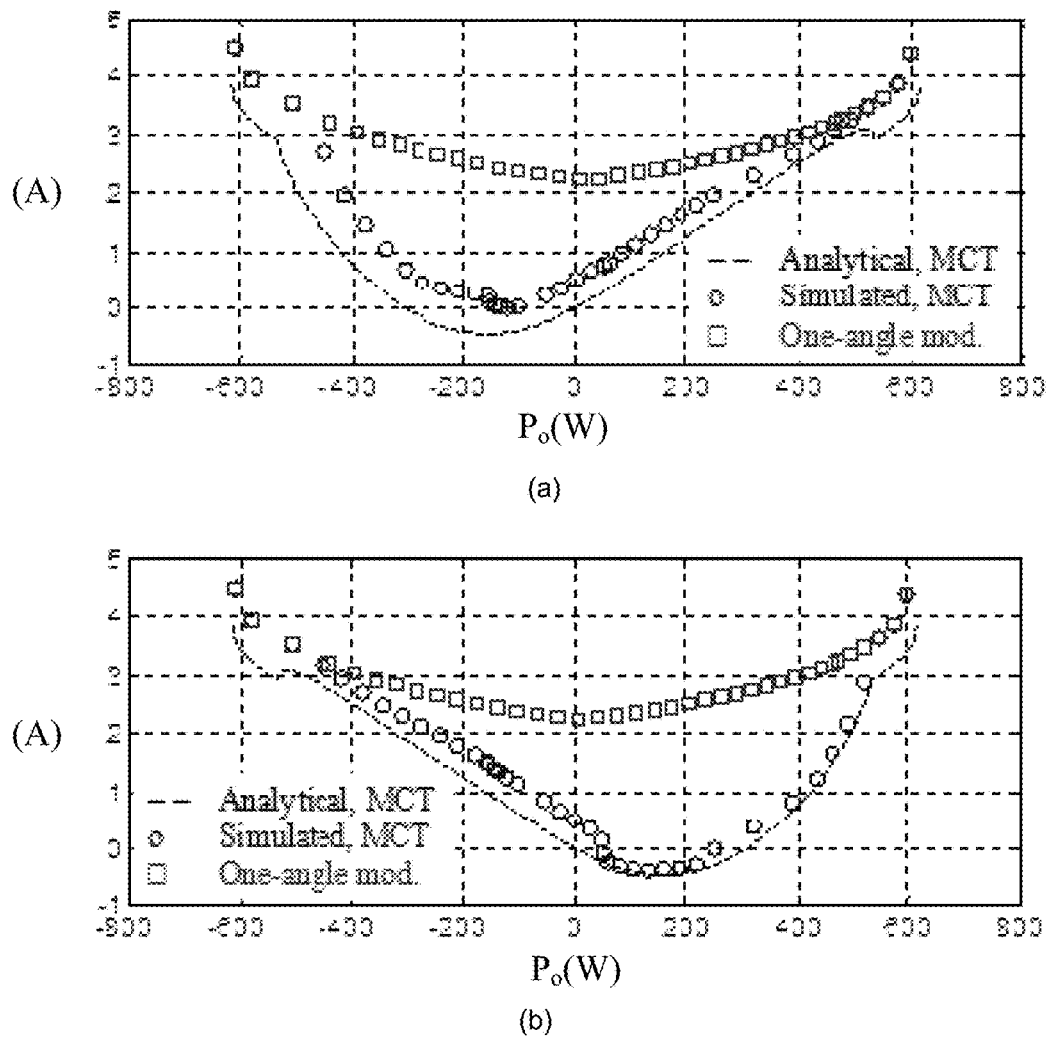
FIG. 55 depicts turn-off currents of input devices $Q_1/Q_2$ (a) and $Q_3/Q_4$ (b) versus the output power, M=0.5 example.
Figure 56:
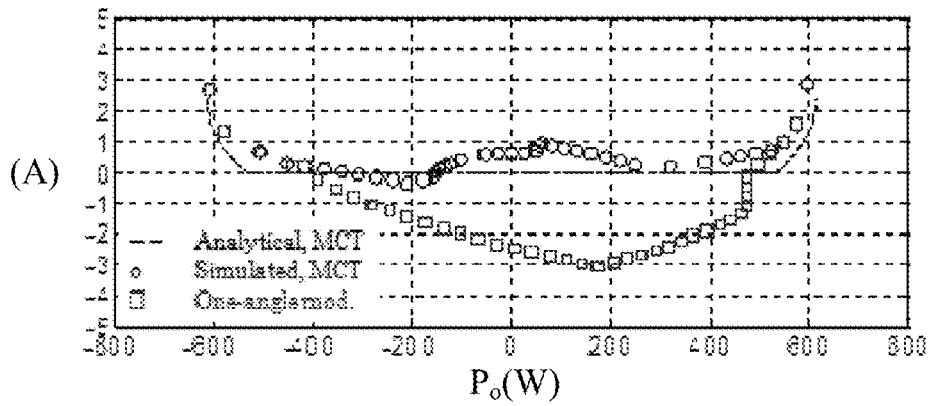
FIG. 56 reports the simulated turn-off currents of output devices $Q_5 \ldots Q_8$.

FIG. 55(a) and FIG. 55(b) respectively report, for the M=0.5 case, the currents through input devices $Q_1/Q_2$ and $Q_3/Q_4$ sampled at their turn-off instant, versus the output power $P_{OUT}$. Predictions of the phasor transformer analysis based on the sinusoidal approximation are also superimposed to the plots. The input bridge exhibits poor ZVS or hard turn-on switching around the origin as predicted, while the converter operates in the ZVS region outside this interval. FIG. 56 depicts simulated turn-off currents of output devices $Q_5 \ldots Q_8$ versus the output power, M=0.5 example. FIG. 56 reports the simulated turn-off currents of output devices $Q_5 \ldots Q_8$. As previously discussed, the turn-off current remains close to zero, i.e. the output bridge operates around the soft/hard turn-on boundary, except for $|P_{OUT}/P_{OUT}^{MAX}|>(1-M^2)^{1/2}$ where ZVS occurs. Note that the fundamental approximation has stronger impact on the model accuracy here.

As anticipated in Section IV.1, when the one-angle modulation is adopted, the output bridge experiences severe hard-switching losses below the critical power $|P_{OUT}/P_{OUT}^{MAX}|=(1-M^2)^{1/2}$. Overall, one can observe how ZVS operation of the output bridge along the conventional one-angle trajectory would require the injection of a strong inductive current into the switching nodes D and C, e.g. through some auxiliary ZVS circuitry provision. On the other hand, a much reduced auxiliary current would be required when operating the DABSRC along the MCT. Similarly, a small amount of inductive current would be required at the input side to achieve full ZVS operation.

Overall, the MCT strongly reduces the criticalities in designing ZVS assistance provisions. These observations confirm the theoretical importance of the minimum current operation and open the possibility to more advanced trajectory control approaches that, taking the MCT theory as a starting point, aim at improved ZVS and efficiency optimization.

A 1 kW DABSRC prototype was employed in experimental tests described below, where 600 V, 13 A power MOSFETs IRFP21N60L were been employed as electronic switches. The operating control vector $v_\phi$ is set from a PC via a custom-made Graphic User Interface communicating with the FPGA device via a serial link. For the sake of definiteness, in what follows the output power $P_{OUT}$ is always intended as the power delivered to the output source $V_{OUT}$ and measured at the corresponding port.

Figure 57:
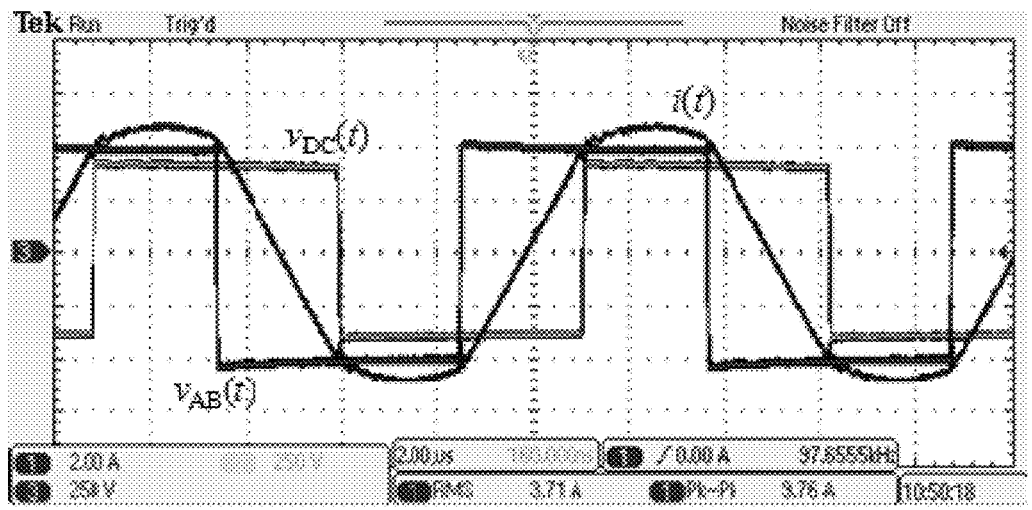
FIG. 57 displays experimental waveforms at 1.1 kW forward power, $V_g$=500V, $V_{out}$=400V, M=1; voltage scale: 250V/div; current scale: 2 A/div; time scale: 2 µs/div.
Figure 58:
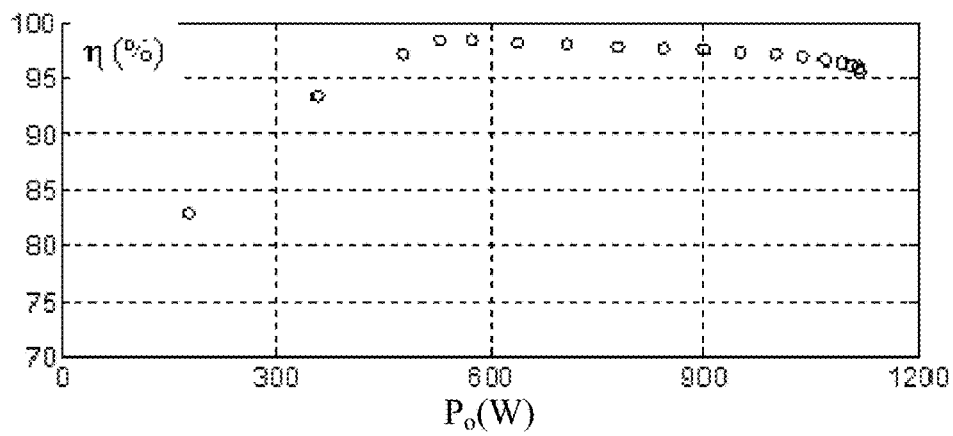
FIG. 58 depicts experimental efficiency at nominal voltage levels $V_g$=500 V, $V_{out}$=400 V, M=1.

The DABSRC prototype was first tested at nominal input and output voltages (M=1), using a 500 V DC power supply and an electronic load programmed in constant voltage mode and set to 400 V. The setup was employed for both forward and reverse power tests by exchanging the DC supply and the electronic load accordingly. The power command was swept by adjusting angle $\phi_{AD}$ while maintaining $\phi_{AB}=\phi_{DC}=180°$. Since M=1, such one-angle modulation also represents the minimum current trajectory. FIG. 57 displays experimental waveforms at 1.1 kW forward power, $V_g$=500V, $V_{out}$=400V, M=1; voltage scale: 250V/div; current scale: 2 A/div; time scale: 2 s/div. FIG. 57 reports the experimental tank current and voltages $v_{AB}(t)$ and $v_{DC}(t)$ for a 1.1 kW forward power operating point, at which the measured efficiency was 96%. More extensive efficiency measurements carried out at nominal voltage levels are reported in FIG. 58 and demonstrate efficiencies above 95% for most of the power range, with a peak of 98.3% at approximately $P_{OUT}$ 530 W. FIG. 58 depicts experimental efficiency at nominal voltage levels $V_g$=500 V, $V_{out}$=400 V, M=1.

Figure 59:
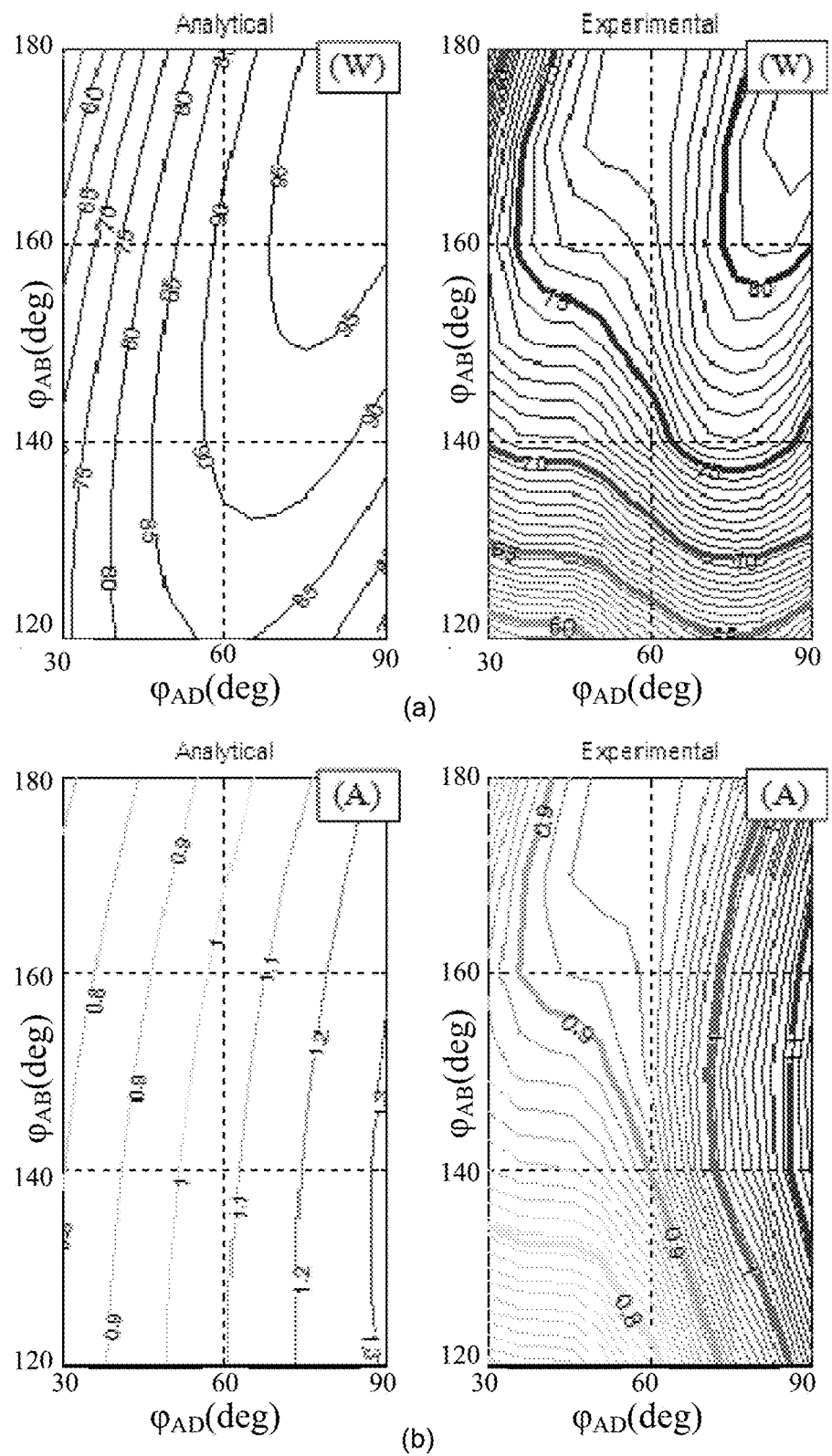
FIG. 59 depicts experimental vs. analytical power flow (a) and RMS tank current distribution (b), $V_g$=200V, $V_{out}$=80V, M=0.5.

Next, the DABSRC prototype was tested at different control angles spanning a region of the $\phi_{DC}$=180° plane with the purpose of experimentally constructing the power and current contours. In order to maintain a safe operation of the DABSRC stage where no large circulating currents could damage the hardware, such tests were performed at $V_{IN}$=200 V input and $V_{OUT}$=80 V output, corresponding to 100 W maximum power and M=0.5. FIG. 59 depicts experimental vs. analytical power flow (a) and RMS tank current distribution (b), $V_g$=200V, $V_{out}$=80V, M=0.5. Comparison between analytically constructed plots and experiments are illustrated in FIG. 59 for both the power flow and the RMS tank current distribution. Due to the large number of measurements required to construct these plots, the space exploration was limited to a portion of the entire plane. Although some numerical discrepancies between experiment and model can be observed, the comparison nonetheless reveals that the experimental trends of power flow and current distribution compare well with the model predictions. Since the minimum current trajectory does not depend on the numerical value of the power flow or RMS current, but uniquely on the shape of the power/current contours, the good match between experiment and model demonstrated in FIG. 59 confirms that the analytical MCT can be reliably employed to minimize the tank RMS current. As for the origin of the aforementioned numerical discrepancies between experimental and analytical power and current, these can be mainly ascribed to i) the harmonic distortion of the tank current, not predicted by the fundamental approximation, ii) effects of non-zero dead time, and iii) efficiency of the experimental prototype as opposed to the perfect tank considered in the analysis.

Figure 60:
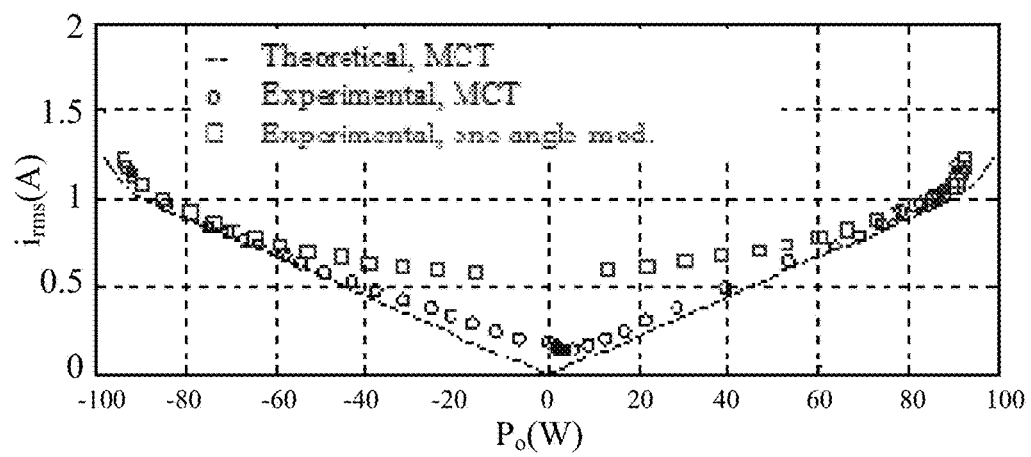
FIG. 60 illustrates such comparison in terms of RMS tank current versus output power.
Figure 61:
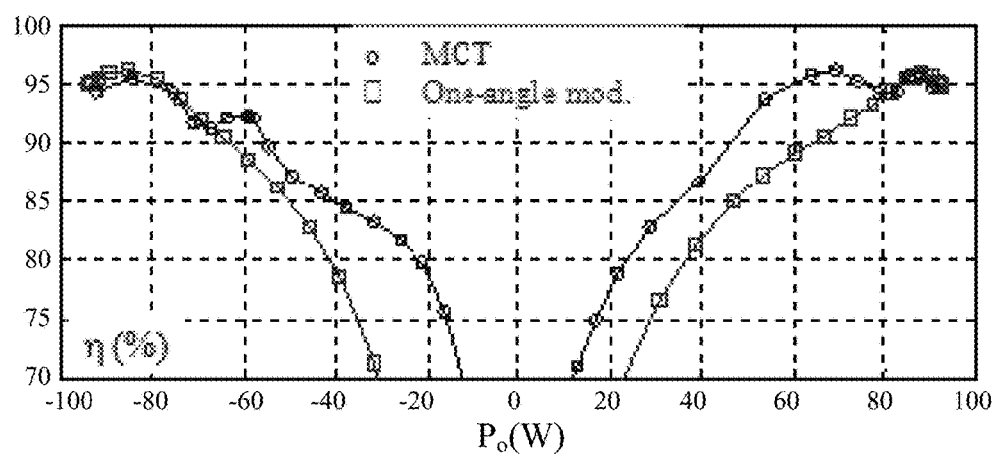
FIG. 61 depicts experimental efficiency: minimum current trajectory vs. one-angle modulation, M=0.5, $V_{IN}$=200 V, $V_{OUT}$=80 V.

Operation of the DABSRC stage along the MCT was then compared with the simpler one-angle modulation. To this end, the stage was again tested at 200 V input/80 V output (M=0.5) along the two different trajectories. FIG. 60 depicts experimental RMS tank current for minimum-current control and one-angle modulation, M=0.5, $V_g$=200V, $V_{out}$=80V. FIG. 60 illustrates such comparison in terms of RMS tank current versus output power. As expected, a significant circulating current occurs with the simpler one-angle modulation, especially at lower power levels, as opposed to the minimum current operation. As noted in the simulation results, operation of the DABSRC along the analytical MCT brings the current close to the theoretical minimum, confirming the accuracy of the analysis even in the presence of the non-idealities of a practical circuit. Measured efficiencies along the MCT and along the one-angle modulation trajectory are compared in FIG. 61. FIG. 61 depicts experimental efficiency: minimum current trajectory vs. one-angle modulation, M=0.5, $V_{IN}$=200 V, $V_{OUT}$=80 V. The higher efficiency observed along the MCT is due to the output bridge remaining at the boundary between hard and soft switching, resulting in reduced switching losses of the output devices.

Figure 62:
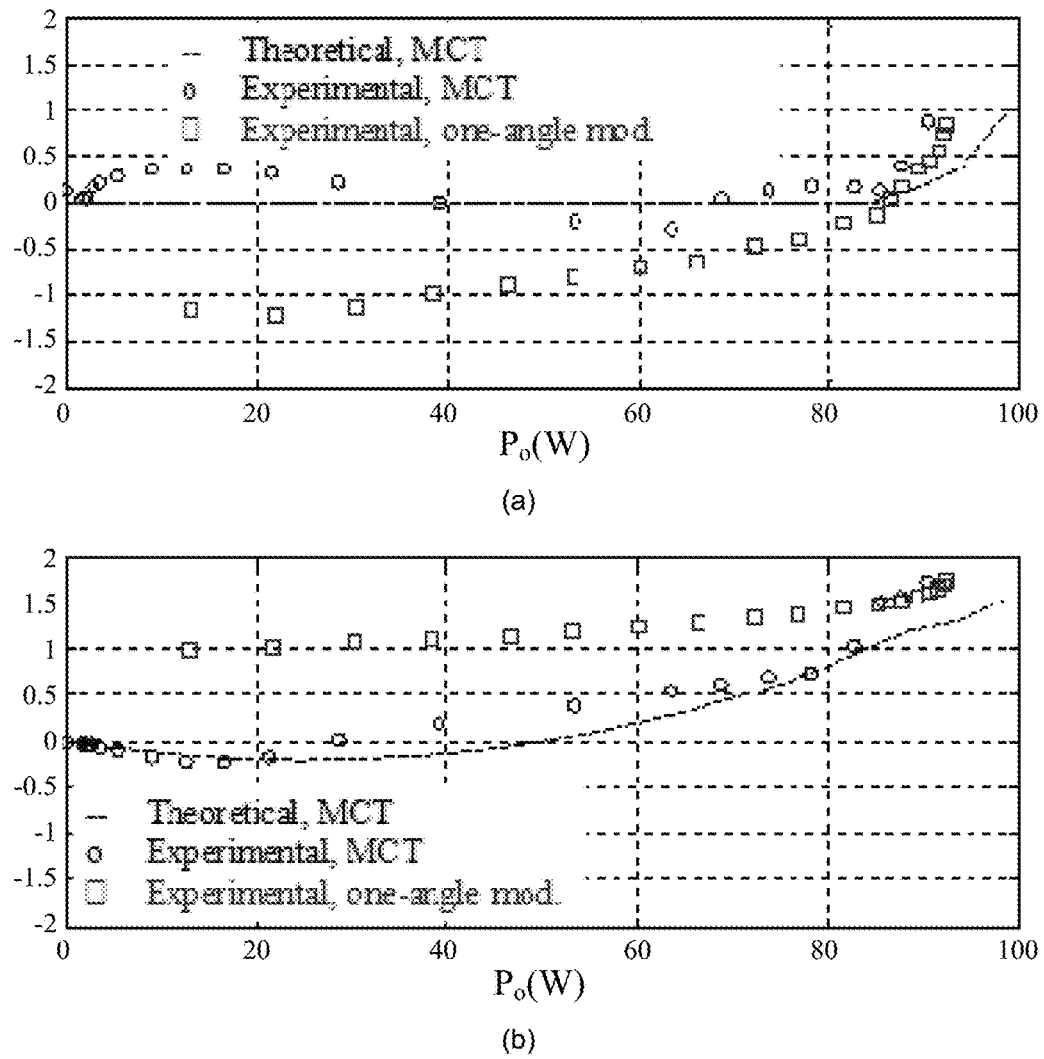
FIG. 62 depicts experimental turn-off currents on leg D (a) and leg B (b): minimum current trajectory vs. one-angle modulation, M=0.5, $V_{IN}$=200 V, $V_{OUT}$=80 V.

FIG. 62 depicts experimental turn-off currents on leg D (a) and leg B (b): minimum current trajectory vs. one-angle modulation, M=0.5, $V_{IN}$=200 V, $V_{OUT}$=80 V. FIG. 62(a) further documents the switching behavior of the output bridge by comparing the measured turn-off currents of leg D along the two trajectories in the forward power range. The large negative turn-off current occurring along the one-angle trajectory is largely displaced once the DABSRC operates along the MCT. Switching behavior of the input bridge is reported in FIG. 62(b) in terms of turn-off current of leg B. As anticipated by the analysis and the simulations, the leg operates at reduced turn-off current along the MCT as opposed to the one-angle modulation trajectory. In spite of the reduced turn-off current, the severity of switching losses in the hard-switching operating region is much reduced compared with hard-switching condition of the output bridge along the one-angle modulation path, which occurs at large negative turn-off currents as already anticipated in FIG. 56.

Figure 63:
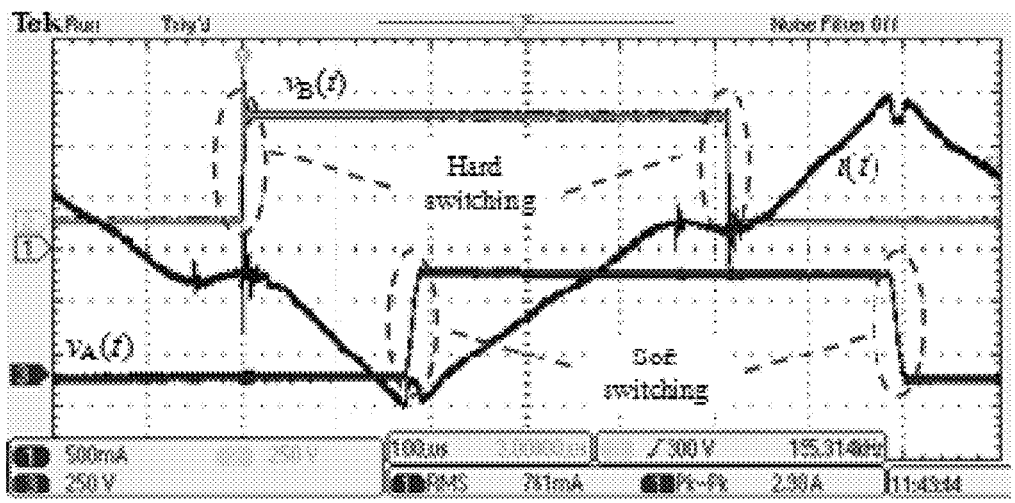
FIG. 63 depicts experimental waveforms relative to minimum current operation at $V_{IN}$=500 V, $V_{OUT}$=200 V, $P_{OUT}$=160 W.
Figure 63:
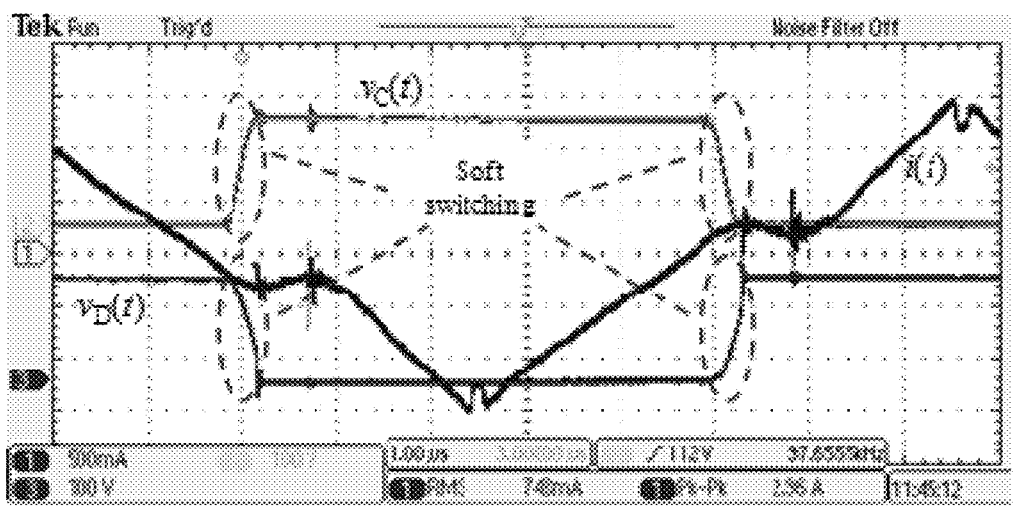

Advantages of operating the converter on the MCT become of critical importance at higher power levels. FIG. 63 depicts experimental waveforms relative to minimum current operation at $V_{IN}$=500 V, $V_{OUT}$=200 V, $P_{OUT}$=160 W. Input bridge (a) and output bridge (b). Voltage scale: 250 V/div (a), 100 V/div (b); current scale: 0.5 A/div; time scale: 1 µs/div. FIG. 63 reports screen captures relative to the minimum current operation of the prototype at $V_{IN}$=500 V, $V_{OUT}$=200 V and $P_{OUT}$≈160 W (M=0.5, $P_{OUT}^{MAX}$≈620 W); although hard switching occurs on leg B, the small negative turn-off current significantly mitigates its severity. All the other legs have sufficient positive turn-off current to initiate their resonant transitions. Efficiency at this operating point was 82.7%. Notably, operation of the converter at the same power level on the conventional one-angle trajectory was impossible to test due to overheating induced by hard switching of the output devices.

In light of the foregoing experimental tests and as anticipated in Section IV.1, operation along the MCT can serve as a starting point to minimize the effort required by auxiliary ZVS circuitry to optimize efficiency.

VIII.4 PSM Leg Functional Verification

Figure 64:
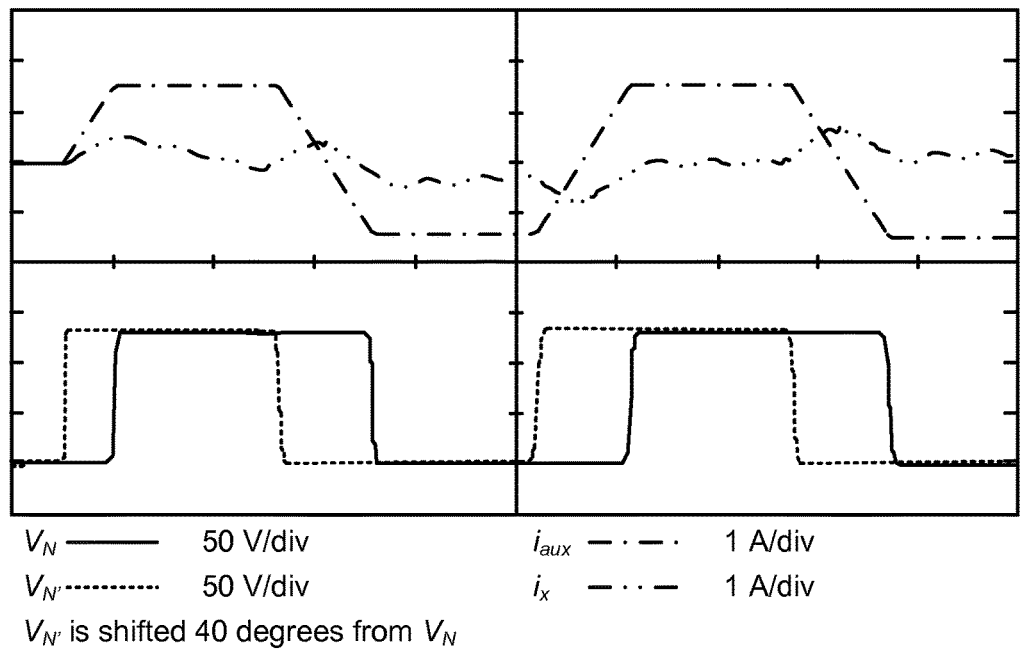
FIG. 64 depicts experimental data where $V_A$=130 V, soft start using PSM-HB ZVS assistance.

Soft start transients were taken with a bridge voltage of 130 V. FIG. 64 depicts experimental data where $V_A$=130 V, soft start using PSM-HB ZVS assistance. The first transition of $V_N'$ (blue waveform) hard-switches. All other transitions soft-switch. $V_N$ is seen in yellow, $i_a$, in purple, and $i_x$ in green. In FIG. 64, both the main switch node voltage $V_N$, as well as the auxiliary switch node voltage $V_N'$, are shown along with the auxiliary current $i_{aux}$ and the natural tank current $i_x$. Comparing this result to FIG. 24, we can see that the converter behaves as desired. Note that all voltage transitions are smooth except for the first switching event when the auxiliary leg high side device turns on. All waveforms are referenced as in FIG. 23.

Figure 65:
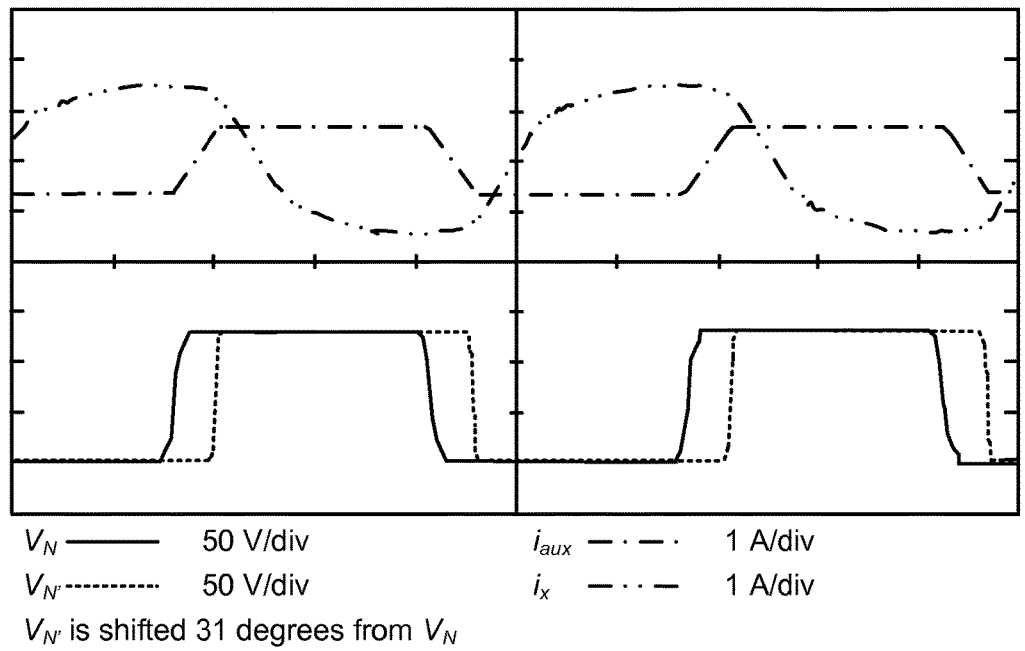
FIG. 65 depicts experimental data where $V_A$=130 V, ZVS operations using PSM-HB assistance.

FIG. 65 depicts experimental data where $V_A$=130 V, ZVS operations using PSM-HB assistance. $V_N'$ (blue waveform) is 31° shifted from $V_N$ (yellow). $i_{aux}$ (purple) is regulated as low as possible, while $i_x$ (green) naturally achieves ZVS for main switching devices. After startup, normal ZVS operation is seen in FIG. 65. For moderate power flow operation of the DABSRC (1 A forward power for the prototype used), no additional ZVS current is needed. In this case, $i_{aux}(t)$ is regulated to its minimum value, $i_{AUX}$=675 mA. A phase shift of $\Phi_N=\Phi_{MIN}$=31° is applied to the auxiliary PSM-HB to enable ZVS transitions of auxiliary devices.

Figure 66:
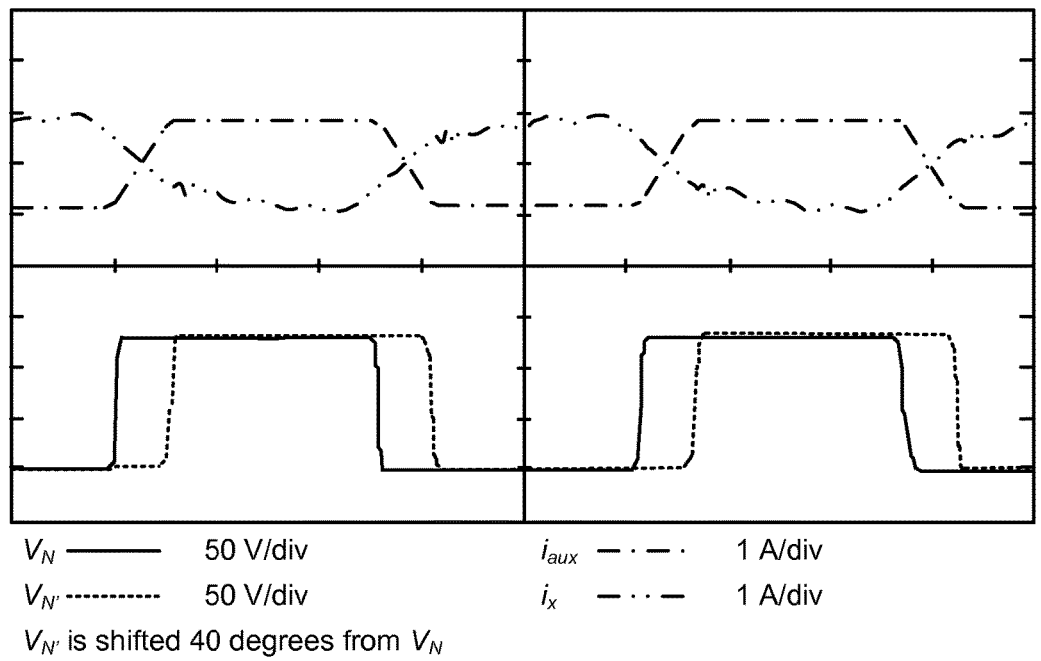
FIG. 66 depicts experimental results where $V_A$=130V, ZVS operations using PSM-HB assistance.

At a slightly lower power level (600 mA forward power), the PSM-HB feedback loop begins to regulate a larger phase angle in order to maintain ZVS of the main switching devices. FIG. 66 depicts experimental results where $V_A$=130V, ZVS operations using PSM-HB assistance. $V_N'$ (blue waveform) is 40° shifted from $V_N$ (yellow). $i_{aux}$ (purple) is regulated to provide additional current for $i_x$ (green) in order to obtain ZVS. In FIG. 66, a phase shift of $\Phi_N$=40° is seen, resulting in $i_{AUX}$=860 mA. Smooth switch transitions are seen at every edge. Without ZVS assistance, the dual active bridge converter begins to hard-switch at this point, resulting in increased noise and interference, as well as higher losses overall.

Figure 67:
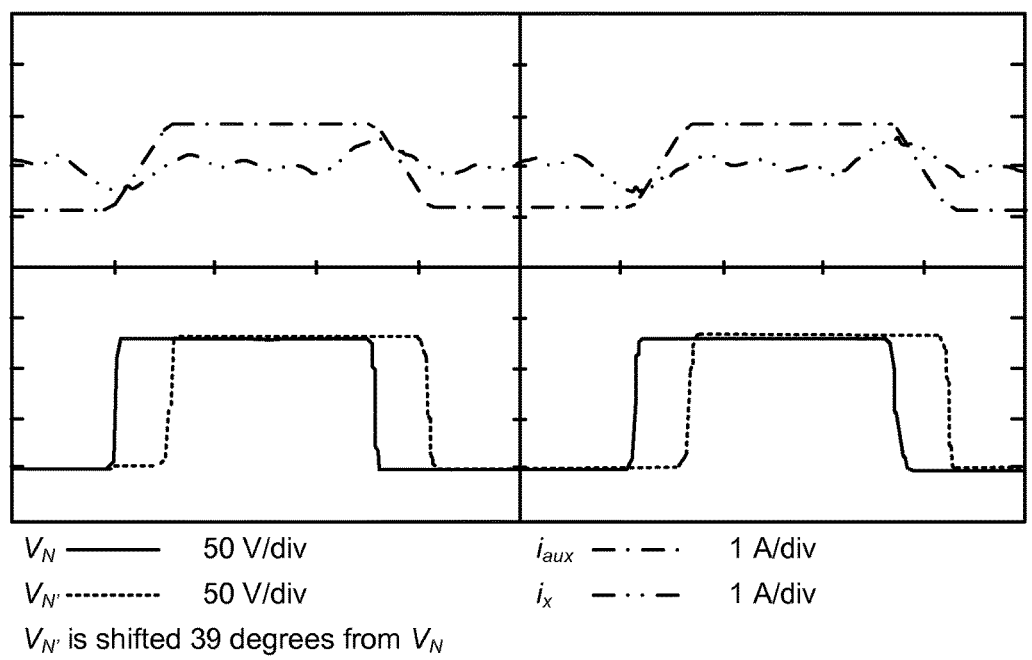
FIG. 67 depicts experimental results where $V_A$=130 V, ZVS operations using PSM-HB assistance.

Further reducing the converter power level causes the PSM-HB feedback loop to continuously modify $\Phi_N$ in order to maintain ZVS. FIG. 67 depicts experimental results where $V_A$=130 V, ZVS operations using PSM-HB assistance. $V_N'$ (blue waveform) is 39° shifted from $V_N$ (yellow). $i_{aux}$ (purple) is regulated to provide additional current for $i_x$ (green) in order to obtain ZVS. In FIG. 67 zero power flow operation is seen with $\Phi_N$=39° and $i_{aux}$=835 mA. The ZVS assistance circuit provides the needed current for soft switching over the full range without requiring detailed knowledge of the wave shape and magnitude of the converter current.

VII.5 Hybrid ZVS Assistance Verification

Experimental results for hybrid ZVS assistance were taken by connecting prototype converters as seen in FIG. 30. For these test, open loop control was used for applying phase shifts between converters. The overall DC/DC unit was then tested with the proposed approach at a non-nominal operating point $V_g$=250 V, $V_t$=100 V. The operating point, corresponding to M=0.5, was chosen as a good candidate to test the DC/DC unit far from its nominal design voltage levels; furthermore, the maximum available power at M=0.5 is about 300 W, hence sufficiently low to enable a comparison between the conventional and proposed trajectories without physically harming the prototype due to hard switching-induced overheating.

Figure 68:
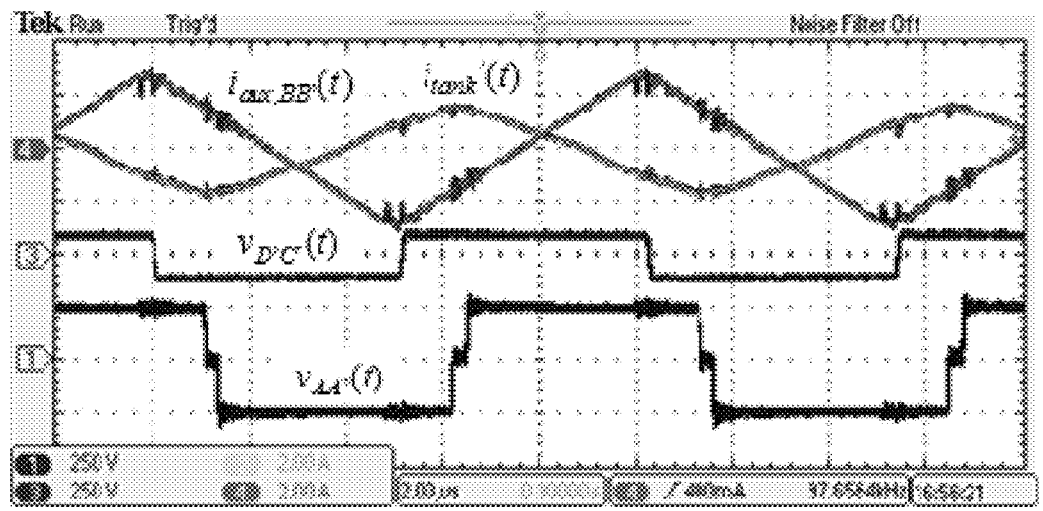
FIG. 68 depicts experimental waveforms for full ZVS operation with the proposed technique, $P_{test}$=110 W; voltage scale: 250V/div; current scale: 2 A/div; time scale: 2 µs/div.

FIG. 68 depicts experimental waveforms for full ZVS operation with the proposed technique, $P_{test}$=110 W; voltage scale: 250V/div; current scale: 2 A/div; time scale: 2 μs/div.

FIG. 68 reports relevant experimental waveforms at $P_{OUT}$=110 W, i.e. less than one twentieth of the nominal rating of the DC/DC unit and about one third of the maximum available power pertaining to the selected operating conditions. The control vector $v_\phi=(\phi_{AD}$=142°, $\phi_{AB}$=312°, $\phi_{DC}$=180°) was positioned for a 1 A output turn-off current, while $\phi_{AA'}$=170° was adjusted for approximately 2 A input turn-off current. All sixteen devices in the DC/DC unit were found to operate in ZVS.

Figure 69:
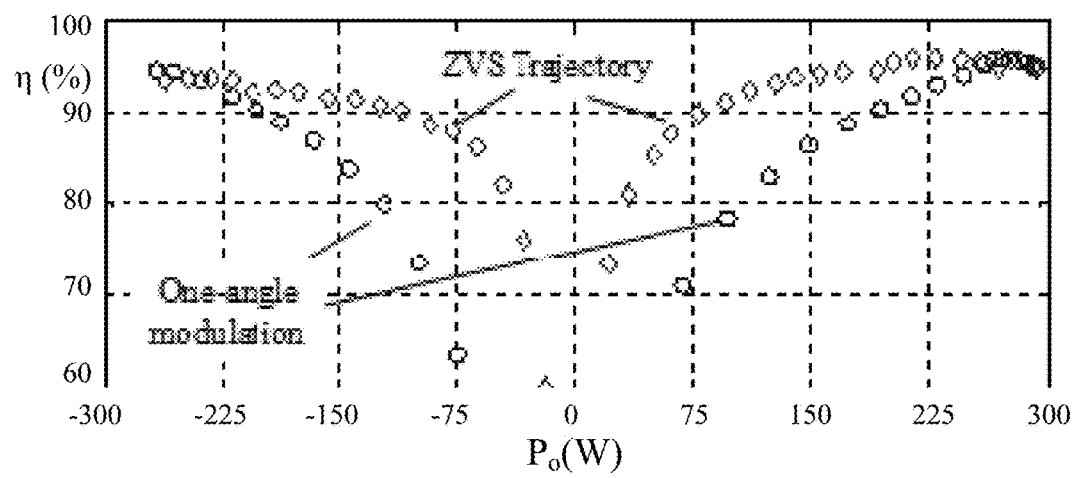
FIG. 69 depicts experimental efficiency of the DC/DC unit with the conventional one-angle modulation and with the proposed ZVS technique.

A more extensive bidirectional power sweep was performed along the conventional one-angle trajectory and along a ZVS trajectory. In the latter case, angle $\phi_{AA'}$ was manually adjusted so as to ensure a turn-off current of at least 1 A on the input side, while the control vectors $v_\phi=v'_\phi$ were swept along the analytical curves of (116) and (117), evaluated at α=0.6 and corresponding to $I_{ZVS}$ 0.73 A theoretical output turn-off current. FIG. 69 depicts experimental efficiency of the DC/DC unit with the conventional one-angle modulation and with the proposed ZVS technique. Efficiency plots of the tests, compared in FIG. 69 demonstrate a marked improvement over the conventional one-angle modulation due to the extended ZVS range. Peak efficiency at M=0.5 is about 96%, and remains above 90% for the majority of the power range along the ZVS trajectory. Along the one-angle trajectory, on the other hand, efficiency drops quickly as the converter departs from the heavy-load regions due to the trajectory entering hard-switching region $R_C$. Extra hardware for assisted ZVS operation would be required in such case.

Figure 70:
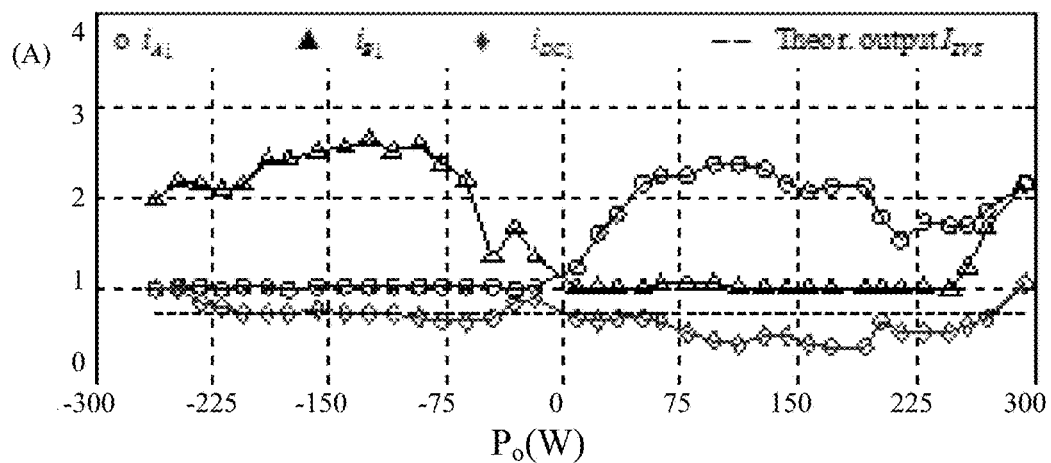
FIG. 70 depicts experimental input and output turn-off currents along the selected ZVS trajectory.

FIG. 70 depicts experimental input and output turn-off currents along the selected ZVS trajectory. The experimental input and output turn-off currents along the ZVS trajectory are reported in FIG. 70 for one of the two DABSRC stages. All the four legs of the stage operate with positive turn-off currents as expected. The accuracy of the analytical trajectory in determining the output ZVS current is comparable with what observed in simulation, and similar considerations hold. It is important to stress that a closed-loop control of the operating vector $v_\phi$ would handle such residual error.

VIII.6 Gain Scheduled Controller

Figure 71:
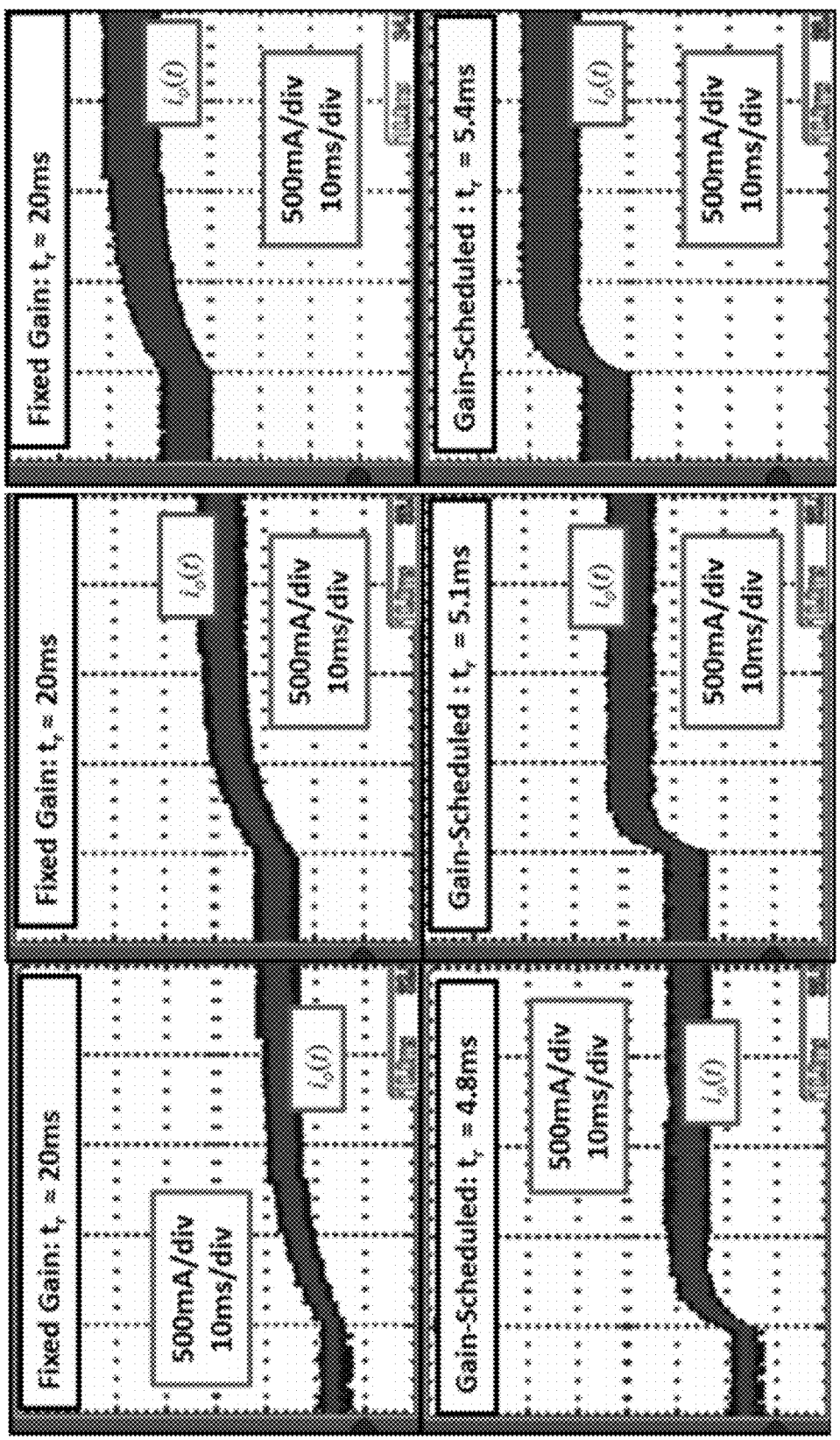
FIG. 71 depicts experimental data with M=0.5 and a constant gain controller is compared with a gain-scheduled controller.

FIG. 71 depicts experimental data with M=0.5 and a constant gain controller is compared with a gain-scheduled controller. Response time improvements for output current steps are clearly shown. In FIG. 70 three different operating points for a conversion ratio of M=0.5 are compared. At each operating point, both a constant gain controller as designed for the worst case and a gain-scheduled controller as derived in Section IV.2 are used to perform an output current step of +10% of the maximum available output current. At all three operating points, the gain-scheduling controller has a much faster response time while remaining stable, with very little or no overshoot. These results are consistent with previous analysis which shows $P_M$≥55° and a higher bandwidth at all points with a gain-scheduling controller. As the power level increases, the response times of the gain-scheduling controller approach those of the constant gain controller. At maximum output current for M=0.5, only a slight performance improvement is seen. Experimental results verify that at M=1.2 both controllers provide the same response characteristics near high power. All three of these operating points use multi-phase shift angle control of the DABSRC operating on the MCT.

Figure 72:
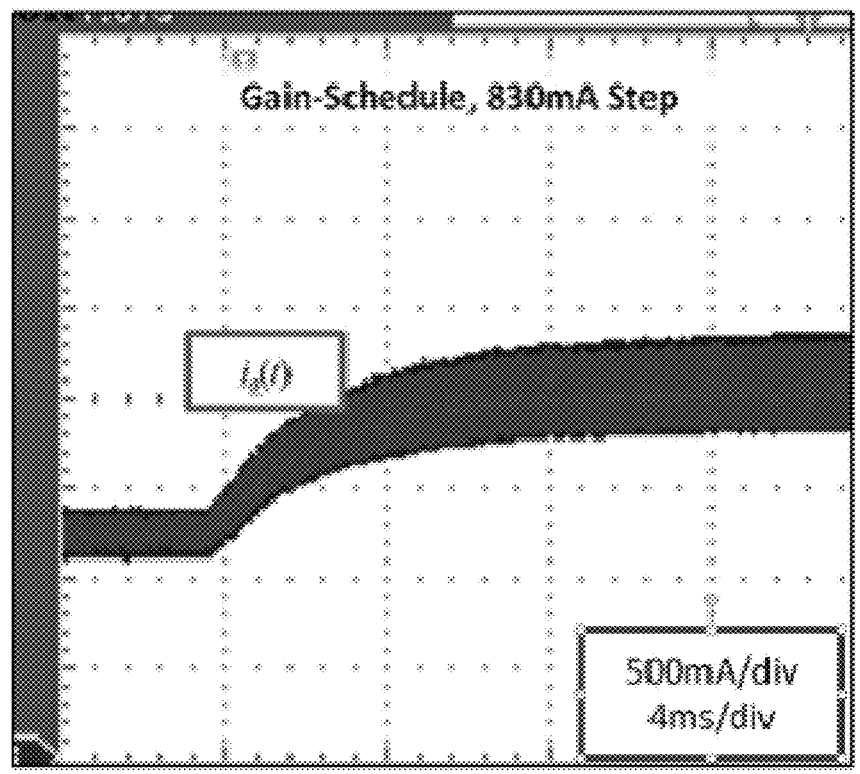
FIG. 72 depicts experimental data for an output current step response, M=1.0, $I_{SET}$=1.25 A stepped to $I_{SET}$=2.10 A, $V_{ENT}$=300 V.
Figure 73:
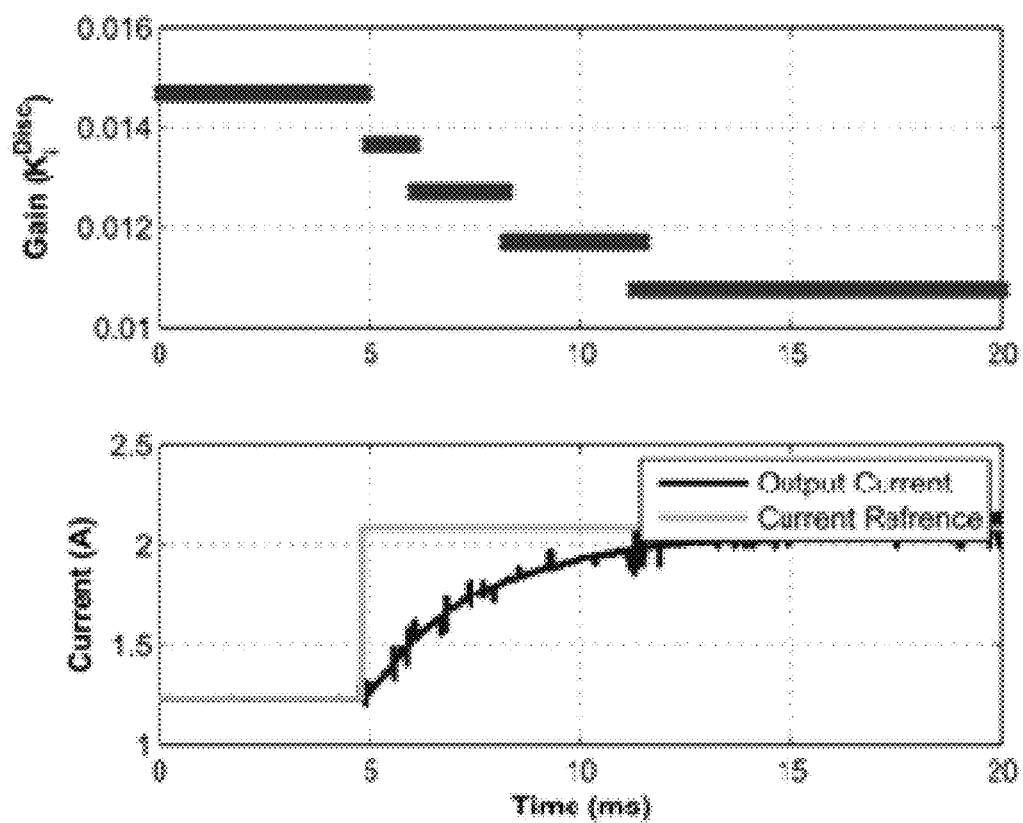
FIG. 73 includes experimental data for a gain-scheduled feedback controller gain profile, M=1.0, $I_{SET}$=1.25 A stepped to $I_{SET}$=2.10 A, $V_{IN}$=300 V.

FIG. 72 depicts experimental data for an output current step response, M=1.0, $I_{SET}$=1.25 A stepped to $I_{SET}$=2.10 A, $V_{IN}$=300 V. FIG. 72 shows a large output current reference step response at M=1.0, with an input voltage of $V_{IN}$=300 V. At this conversion ratio, the DABSRC is commanded from $I_{SET}$=0.2 $I_{Max}$ to $I_{SET}$=0.9 $I_{Max}$ with both a gain-scheduling controller as well as a constant gain controller. FIG. 73 includes experimental data for a gain-scheduled feedback controller gain profile, M=1.0, $I_{SET}$=1.25 A stepped to $I_{SET}$=2.10 A, $V_{IN}$=300 V. FIG. 73 shows the gain-scheduled controller varying the integral gain thorough the transient based on the averaged output power. During the transition, the integral gain is seen to oscillate between adjacent values. This behavior is due to slight changes in the sensed conversion ratio and power level seen by the controller during the transient, and is due to noise and ripple on these signals. Although adding hysteresis to the integral gain changes could be used to avoid this effect, the gain changes are small enough that these oscillations can be safely ignored.

VIII.7 Multi-Mode Controller

In order to test both power sharing as well as mode transitions, the multi-mode controller designed in Section IV.3 was simulated and tested experimentally using two converters with both series and parallel output connections. For simulation results the system level model from Section VII.4 is used. The simulation is setup with two separate converters, one with an output current regulation bandwidth of 2 kHz (converter A), and the other with an output current regulation bandwidth of 1 kHz (converter B) in order to show the effects of mismatched controllers on power sharing. Both converters operate with an output capacitance of 10 Voltage and power regulation outer loops are designed for bandwidths of 400 Hz for both converters.

Figure 74:
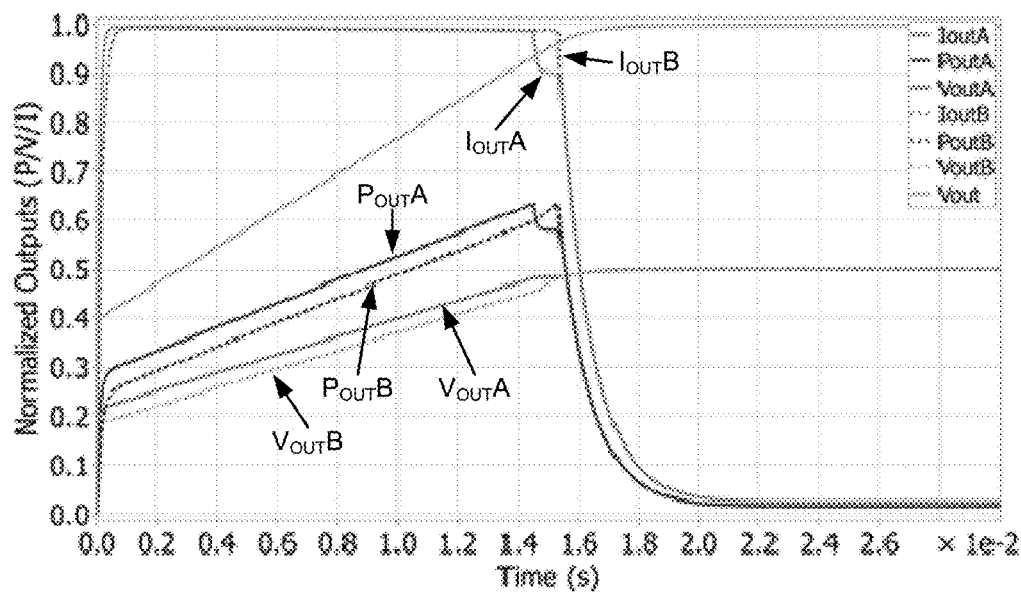
FIG. 74 depicts simulation results for normalized output variables for two series output connected converters.

Simulation models are setup with two converters operating with series output connection for current regulation test. The converters are loaded with a 10 kΩ resistor in parallel with a 100 μF load capacitance. The simulation begins with each converter output capacitor at 100 V and the load capacitor at 200 V. Both converters have a 2 A current limit and a 750 W power limit. A 250 V output voltage limit is set on both converters in order to achieve a total of 500 V output. FIG. 74 depicts simulation results for normalized output variables for two series output connected converters. A capacitor charging transient is shown with power balance maintained throughout. At the beginning of the transient in FIG. 74 both converters immediately current limit at 2 A. As converter A has a higher bandwidth current regulation loop, it responds slightly faster and thus achieves 2 A output voltage regulation slightly faster. Throughout this transition, both converters share power by maintaining voltage balance across their output capacitances. Once each converter reaches 250 V, both converters enter voltage regulation mode with balanced currents as expected with a series output connection. The power balance maintained during the transition from 200 V total output voltage to 500 V total output voltage validates the ability for the MMC technique to maintain power balance in voltage regulation mode with series connected converters.

Figure 75:
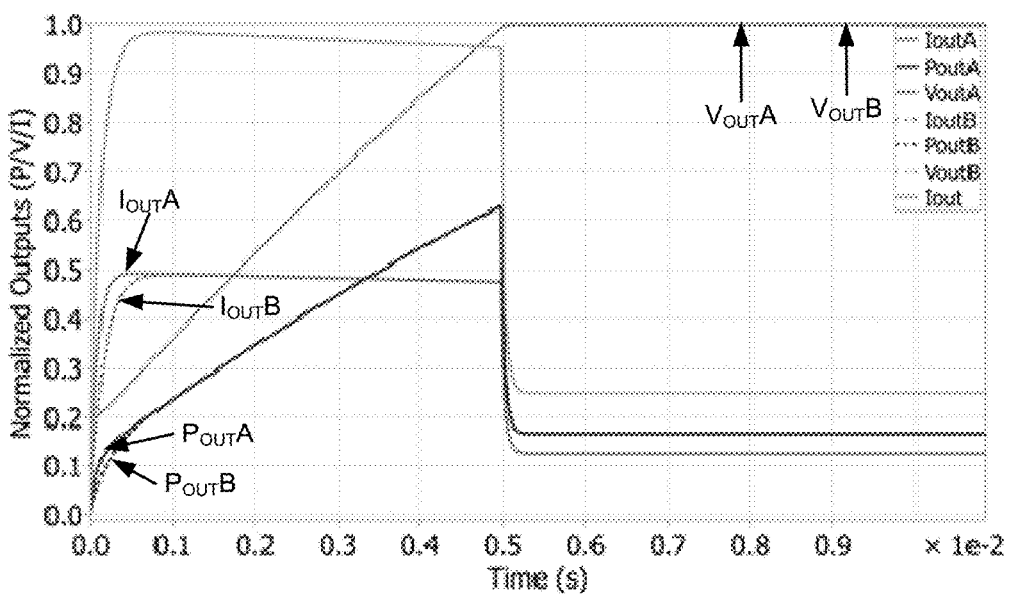
FIG. 75 depicts simulation results for normalized output variables for two parallel output connected converters.

Simulation models are setup with two converters operating in parallel output connection for voltage regulation tests. As before, each converter is loaded with 10 μF of output capacitance. The converters are loaded with a 1 kΩ resistor. The simulation begins with 100 V across the output capacitance of the converter modules. Both converters have a 500 V output voltage limit and a 750 W power limit. A 1 A output current limit is set for each converter in order to achieve 2 A total output current. FIG. 75 depicts simulation results for normalized output variables for two parallel output connected converters. A capacitor charging transient is shown with power balance maintained throughout. At the beginning of the simulation in FIG. 75 both converters limit at 1 A output current, with converter A limiting faster due to its higher bandwidth output current regulation controller. As the output voltage increased towards its final limit of 500 V, both converters regulate at 1 A output current while sharring power as expected. A total output current of 2 A is maintained throughout this period. When the output voltage reaches 500 V, both converters enter into voltage regulation mode to maintain 500 V output. The power balanced maintained while regulating a 500 V output voltage validates the ability for the MMC technique to maintain power balance in voltage regulation mode with parallel connected converters.

Each of the three possible controller transitions was tested in simulation using the same models that were used to test power sharing during voltage and current regulation. For all tests, both converters have 10 μF output capacitors.

Figure 76:
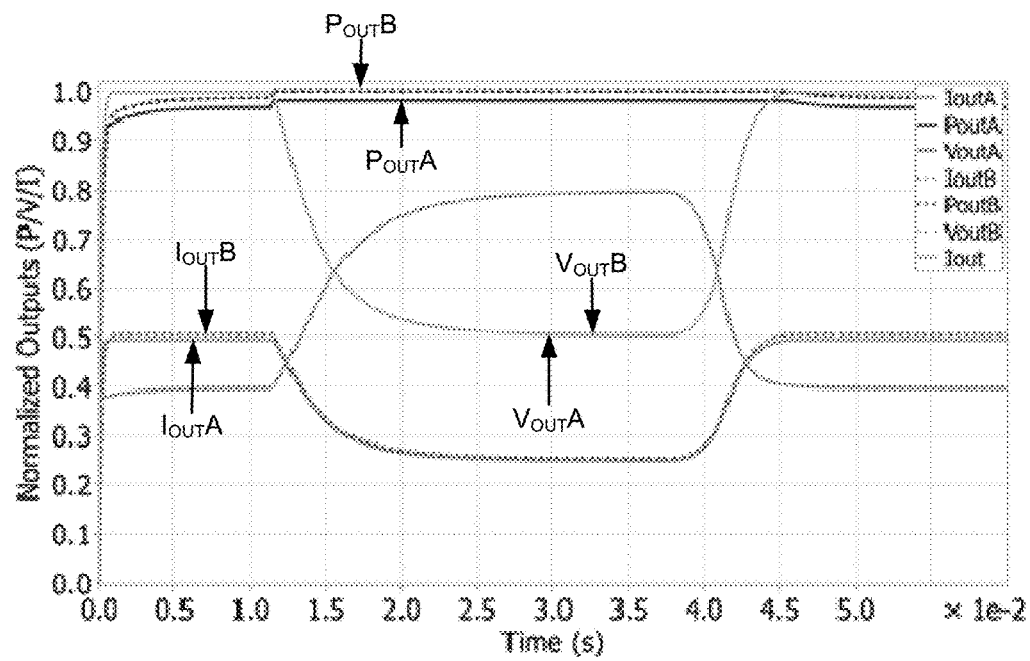
FIG. 76 depicts simulation results for normalized output variables for two parallel output connected converters.

Current to power regulation transitions were verified using two converters operating with parallel output connections. Each converter operates with a 1 A output current limit for a total of 2 A output current and a 500 V output voltage limit. Converter A is uses a power limit of 196 W while converter B uses a power limit of 200 W in order to allow both output powers to be seen on the same plot. In order to force a current to power regulation transition, a variable load resistor of 100Ω to 400Ω is used. FIG. 76 depicts simulation results for normalized output variables for two parallel output connected converters. A resistive load is used to force current to power regulation transitions. In FIG. 76, the two converters are seen to start in current regulation mode with a 100Ω load resistor. Each converter limits at 1 A output current with a total of 2 A output current. After 11.3 ms the load resistance is switched to 400Ω forcing both converters into power regulation mode. Converter B is seen to process slightly more power than converter A, which is consistent with the output power limits set. Once steady state is reached I power regulation mode after approximately 26 ms, the output load resistor is switched back to 100Ω. This load change forces both converters back into output current regulation mode at 1 A. The smooth transitions between output regulation modes and the power sharing achieved throughput both transitions verifies the ability of the MMC technique to handle output current to output power regulation transitions and output power to output current regulation transitions.

Figure 77:
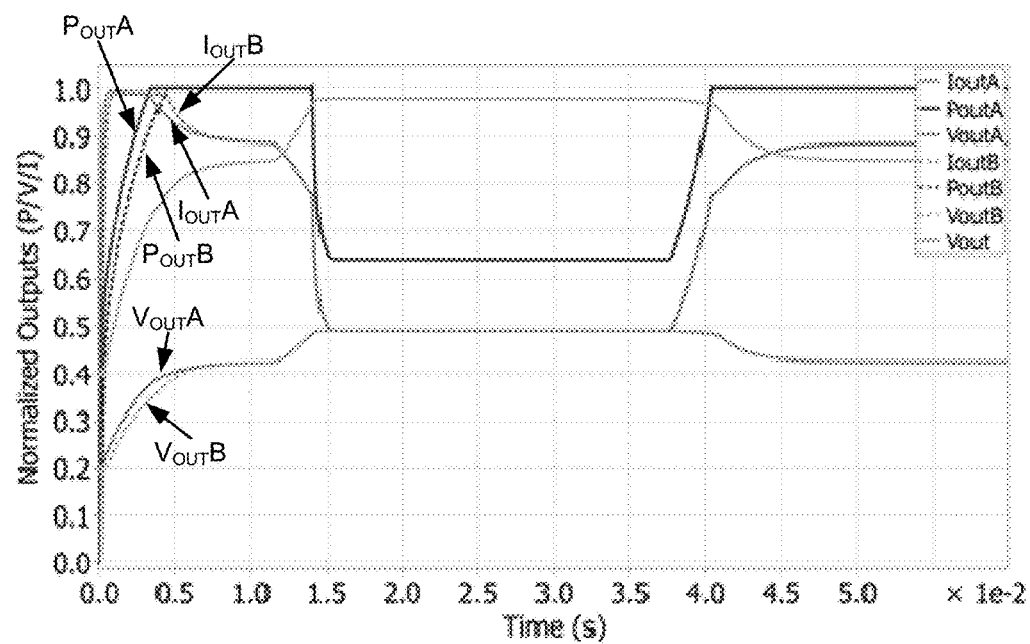
FIG. 77 depicts simulation results for normalized output variables for two series output connected converters.

Power to voltage regulation transitions were verified using two converters operating with series output connections. A load variable resistance loads the converter pair, is parallel with a 10 μF load capacitance. Both converters operate with a 2 A output current limit, a 375 W output power limit, and a 250 V output voltage limit for a total of 500 V output voltage. Initially, a 240Ω load resistor is used. After the startup transient, both converters are seen to operate in power regulation mode at 375 W in FIG. 77. FIG. 77 depicts simulation results for normalized output variables for two series output connected converters. A resistive load is used to force power to voltage regulation transitions. At 11.3 m s the load resistance is increased to 500Ω, forcing both converters to transition into output voltage regulation mode. Once steady state is reached in output voltage regulation mode, both converters are seen to regulate 250 V, for a total output voltage of 500 V. After approximately 26 ms in this state, the load resistance is switched back to 240Ω. This transition forces both converters back into output power regulation mode. The smooth transitions between output regulation modes and the power sharing achieved throughput both transitions verifies the ability of the MMC technique to handle output voltage to output power regulation transitions and output power to output voltage regulation transitions.

Figure 78:
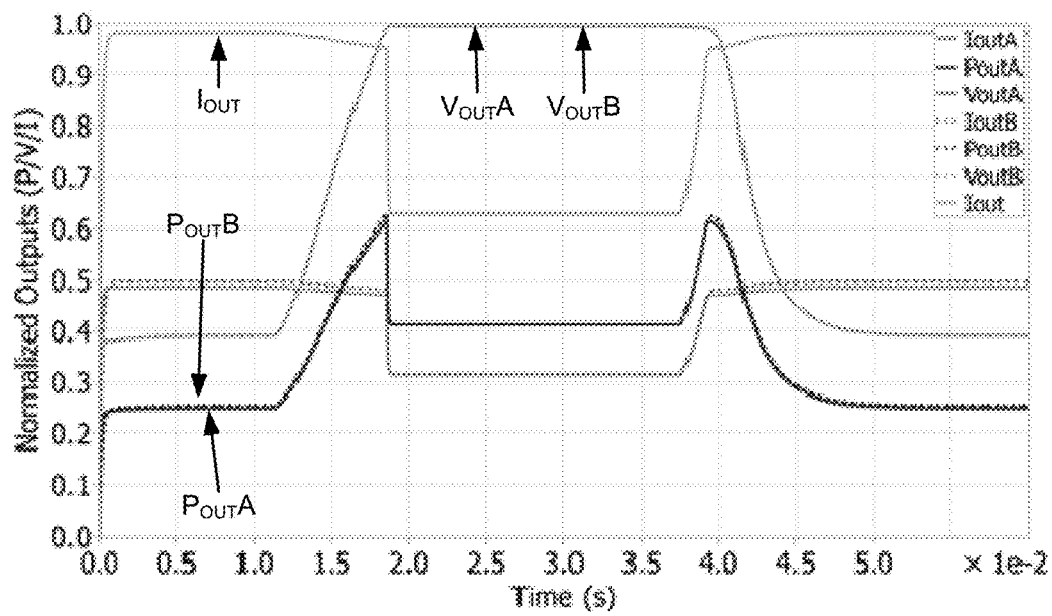
FIG. 78 depicts normalized output variables for two parallel output connected converters.

Current to voltage regulation transitions were verified using two converters operating with parallel output connections. Each converter operates with a 1 A output current limit for a total of 2 A output current, a 500 V output voltage limit, and a 750 W output power limit. In order to force a current to voltage regulation transition, a variable load resistor of 100Ω to 400Ω is used. FIG. 78 depicts normalized output variables for two parallel output connected converters. A resistive load is used to force current to voltage regulation transitions. In FIG. 78, the two converters are seen to start in current regulation mode with a 100Ω load resistor. Each converter limits at 1 A output current with a total of 2 A output current. After 11.3 ms the load resistance is switched to 400Ω forcing both converters into voltage regulation mode. Once steady state is reached in voltage regulation mode after approximately 26 ms, the output load resistor is switched back to 100Ω. This load change forces both converters back into output current regulation mode at 1 A. The smooth transitions between output regulation modes and the power sharing achieved throughput both transitions verifies the ability of the MMC technique to handle output current to output voltage regulation transitions and output voltage to output current regulation transitions.

Figure 80:
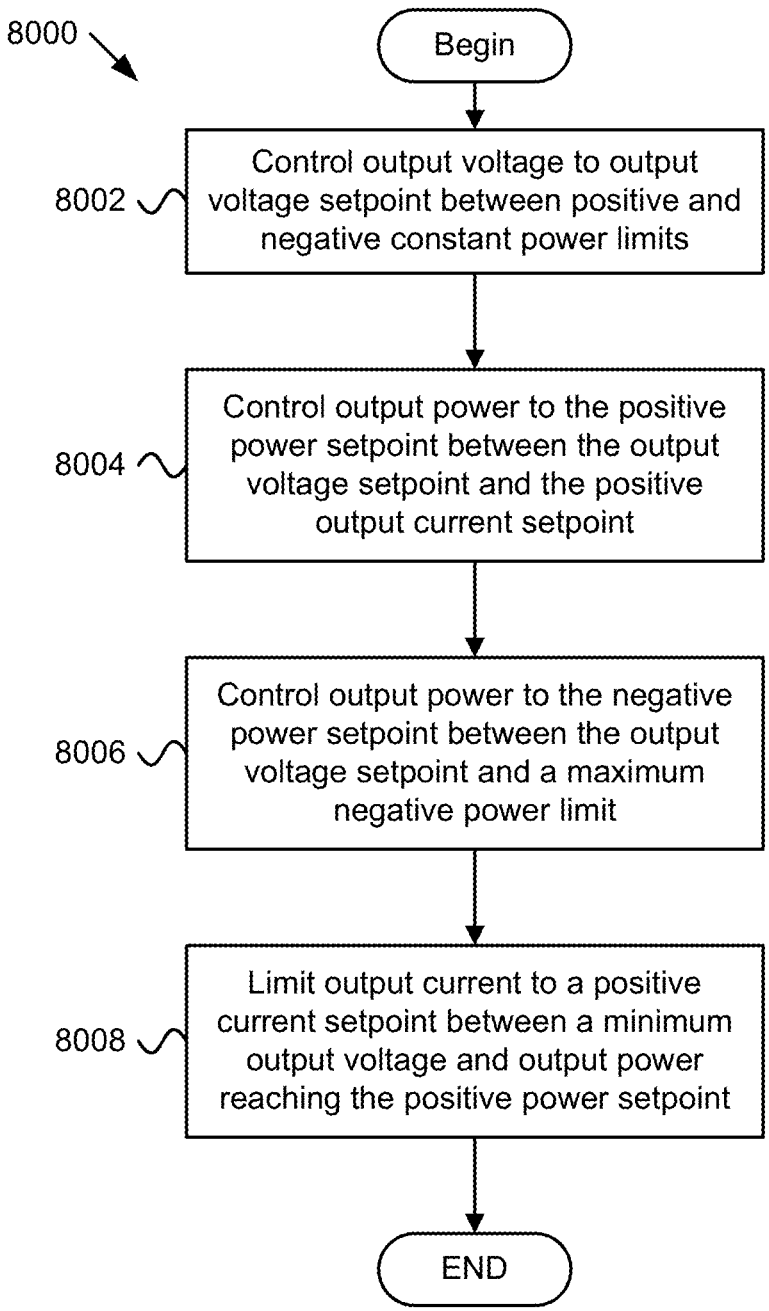
FIG. 80 is a schematic flowchart diagram illustrating one embodiment of a method 8000 for multi-mode control.

FIG. 80 is a schematic flowchart diagram illustrating one embodiment of a method 8000 for multi-mode control. The method 8000 begins and controls 8002 output voltage $V_{OUT}$ of a DC to DC converter 10 to an output voltage reference $V_{SET}$ over an output current $I_{OUT}$ range between an operating condition where output power $P_{OUT}$ of the converter reaches a positive power reference $P_{SET}$ and output power $P_{OUT}$ of the converter reaches a negative power reference $P_{SET}$. The converter 10 is a bidirectional converter. The method 8000 controls 8004 output power $P_{OUT}$ of the converter 10 to the positive power reference $P_{SET}$ over a positive constant power range between the output voltage $V_{OUT}$ of the converter 10 being at the output voltage reference $V_{OUT}$ and output current $I_{OUT}$ of the converter being at a positive output current reference $I_{SET}$.

The method 8000 controls 8006 output power $P_{OUT}$ of the converter 10 to the negative power reference $-P_{SET}$ over a constant power range between output voltage $V_{OUT}$ of the converter 10 being at the output voltage reference $V_{SET}$ and a maximum negative power limit of the converter 10. The method 8000 limits 8008 output current $I_{OUT}$ to a positive output current reference $I_{SET}$ in a range between a minimum output voltage and output power $P_{OUT}$ of the converter reaching the positive power reference $P_{SET}$, and the method 8000 ends.

Figure 81:
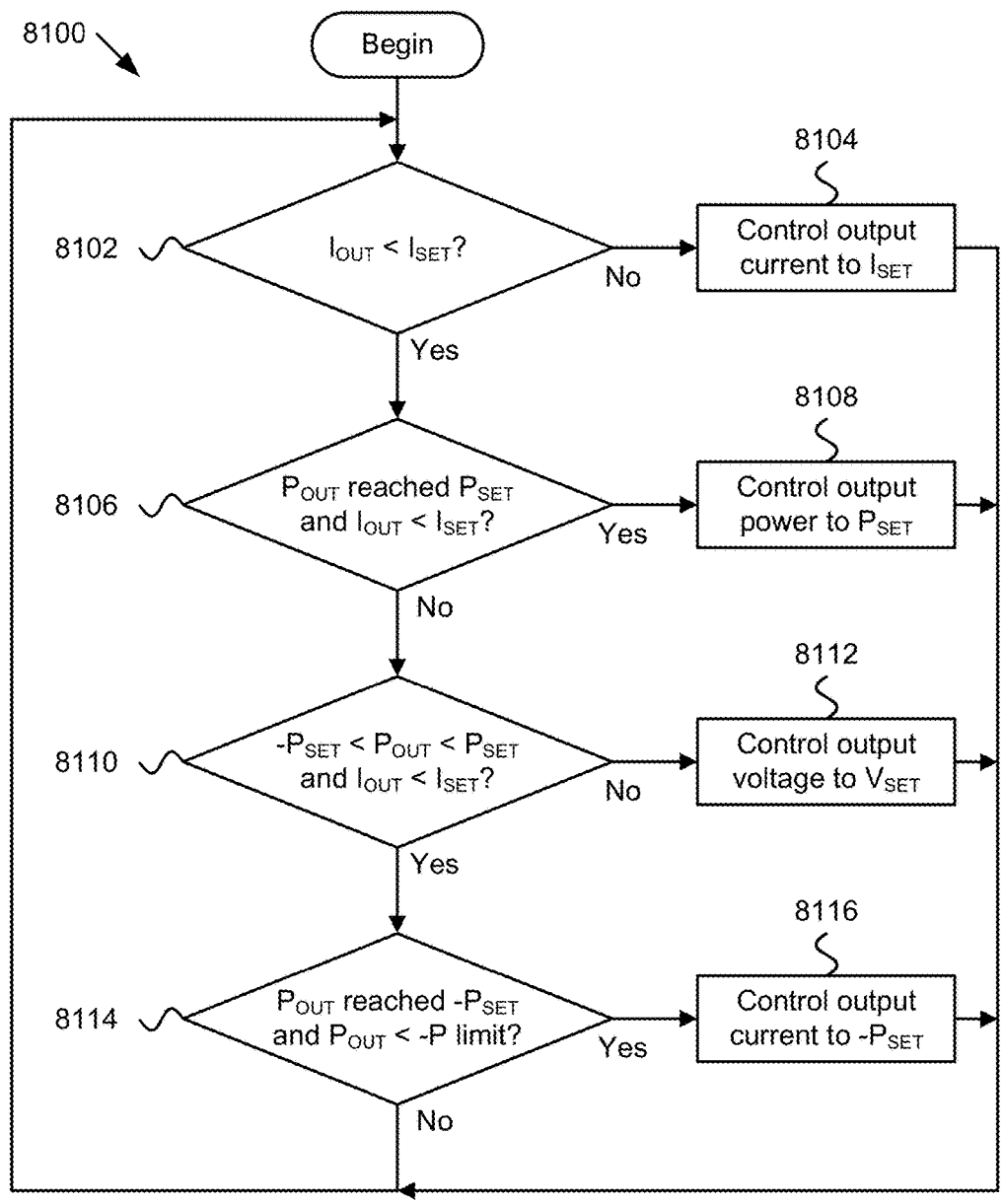
FIG. 81 is a schematic flowchart diagram illustrating another embodiment of a method 8100 for multi-mode control.

FIG. 81 is a schematic flowchart diagram illustrating another embodiment of a method 8100 for multi-mode control. The method 8100 begins and determines 8102 if the output current $I_{OUT}$ is below the positive output current reference $I_{SET}$. If the method 8100 determines 8102 that the output current $I_{OUT}$ is not less than the positive output current reference $I_{SET}$, the method 8100 controls 8104 the output current $I_{OUT}$ to the positive output current reference $I_{SET}$. If the method 8100 determines 8102 that the output current $I_{OUT}$ is less than the positive output current reference $I_{SET}$, the method 8100 determines 8106 if the output power $P_{OUT}$ has reached the positive power reference $P_{SET}$ and if the output current $I_{OUT}$ is below the positive output current reference $I_{SET}$. If the method 8100 determines 8106 that the output power $P_{OUT}$ has reached the positive power reference $P_{SET}$ and that the output current $I_{OUT}$ is below the positive output current reference $I_{SET}$, the method 8100 controls 8108 the output power $P_{OUT}$ to the positive power reference $P_{SET}$.

If the method 8100 determines 8106 that the output power $P_{OUT}$ has not reached the positive power reference $P_{SET}$ and that the output current $I_{OUT}$ is below the positive output current reference $I_{SET}$, the method 8100 determines 8110 if output power $P_{OUT}$ is between a positive power reference $P_{SET}$ and a negative power reference $P_{SET}$ and if the output current $I_{OUT}$ is less than an output current reference $I_{SET}$. If the method 8100 determines 8110 that the output power $P_{OUT}$ is between a positive power reference $P_{SET}$ and a negative power reference $P_{SET}$ and that the output current $I_{OUT}$ is less than an output current reference $I_{SET}$, the method 8100 controls 8112 output voltage $V_{OUT}$ to the output voltage reference $V_{SET}$.

If the method 8100 determines 8110 that the output power $P_{OUT}$ is not between a positive power reference $P_{SET}$ and a negative power reference $P_{SET}$ or that the output current $I_{OUT}$ is not less than an output current reference $I_{SET}$, the method 8100 determines 8114 if the output power $P_{OUT}$ has reached the negative power reference $P_{SET}$ and if the output power $P_{OUT}$ is below a maximum negative power limit. If the method 8100 determines 8114 that the output power $P_{OUT}$ has reached the negative power reference $-P_{SET}$ and that the output power $P_{OUT}$ is below a maximum negative power limit, the method 8100 controls 8116 output power $P_{OUT}$ to the negative power reference $-P_{SET}$. The method 8100 returns and continues to monitor output power $P_{OUT}$, output current $I_{OUT}$, and output voltage $V_{OUT}$ against the setpoints and limits described above.

Figure 82:
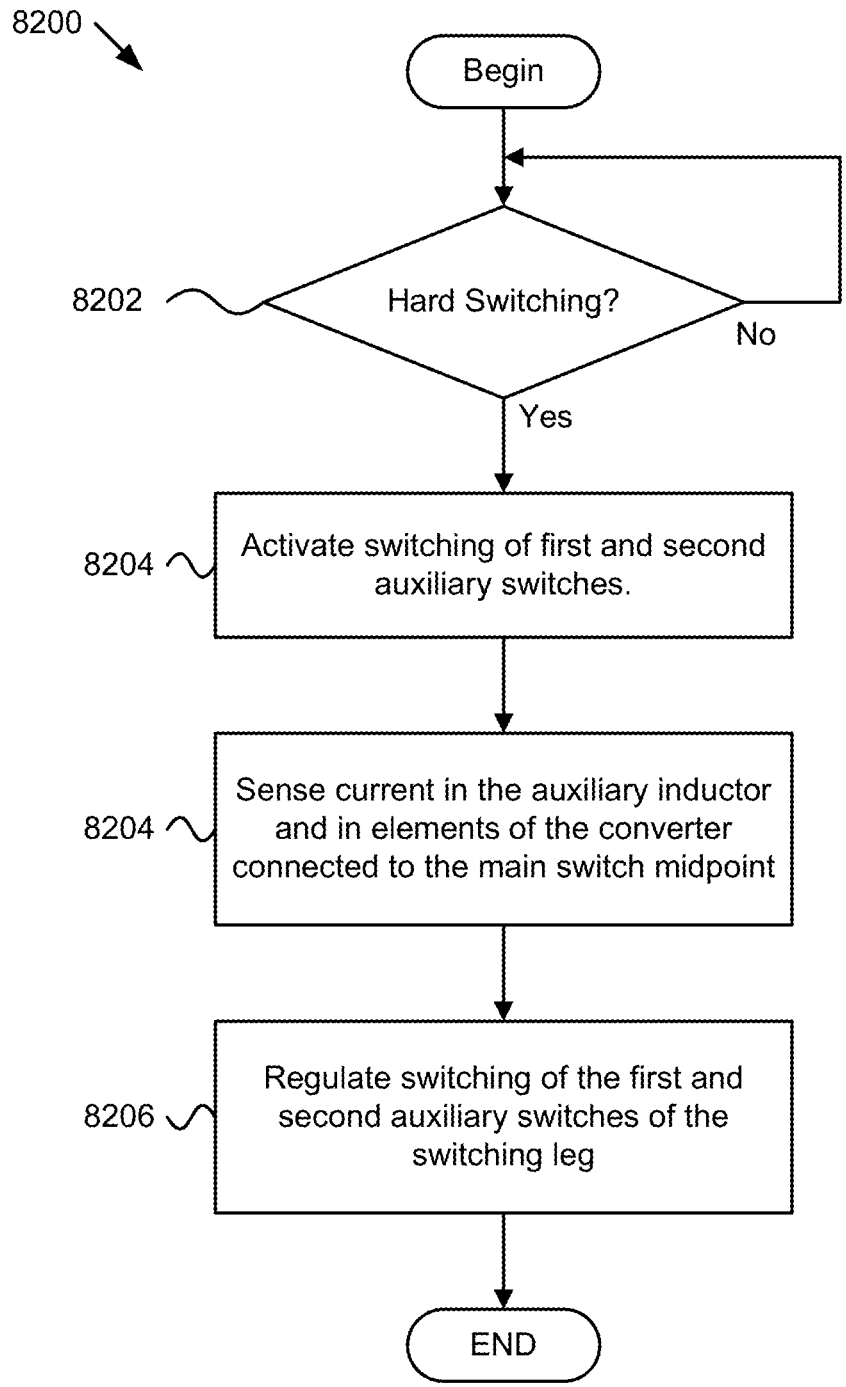
FIG. 82 is a schematic flowchart diagram illustrating another embodiment of a method 8200 for assisted ZVS.

FIG. 82 is a schematic flowchart diagram illustrating another embodiment of a method 8200 for assisted ZVS. The method 8200 begins optionally determines 8202 if a switching leg of a DC to DC converter 10 is in a hard switching mode. If the method 8200 determines that the switching leg of the converter 10 is not in a hard switching mode, for example in ZVS, the method 8200 returns and determines 8202 if the switching leg of the converter 10 is in a hard switching mode. If the method 8200 determines that the switching leg of the converter 10 is in a hard switching mode, the method 8200 activates 8204 switching of the first and second auxiliary switches $Q_1'$, $Q_2'$. The method 8200 senses 8204 senses current $i_{aux}$ in the auxiliary inductor $L_{aux}$ and senses 8204 current $i_x$ in the connection between elements of the converter 10 and the main switch midpoint $V_N$ and regulates 8206 switching in the first and second auxiliary switches $Q_1$, $Q_2$ of the switching leg, and the method 8200 ends.

The method 8200 may use the current $i_{aux}$ sensed 8204 in the auxiliary inductor $L_{aux}$ and current $i_x$ in the connection between the elements of the converter 10 and the main switch midpoint $V_N$ and may use switching states of the first and second main switches $Q_1$, $Q_2$ to regulate 8206 switching in the first and second auxiliary switches $Q_1'$, $Q_2'$ to adjust current $i_{aux}$ in the auxiliary inductor to adjust voltage across the first and second main switches $Q_1$, $Q_2$ to achieve zero voltage switching. In another embodiment, regulating 8206 switching of the first and second auxiliary switches $Q_1'$, $Q_2'$ may include controlling current $i_{aux}$ in the auxiliary inductor $L_{aux}$ by controlling a phase angle $\Phi_N$ between a voltage transition at the auxiliary midpoint and the main switch midpoint.

Figure 85:
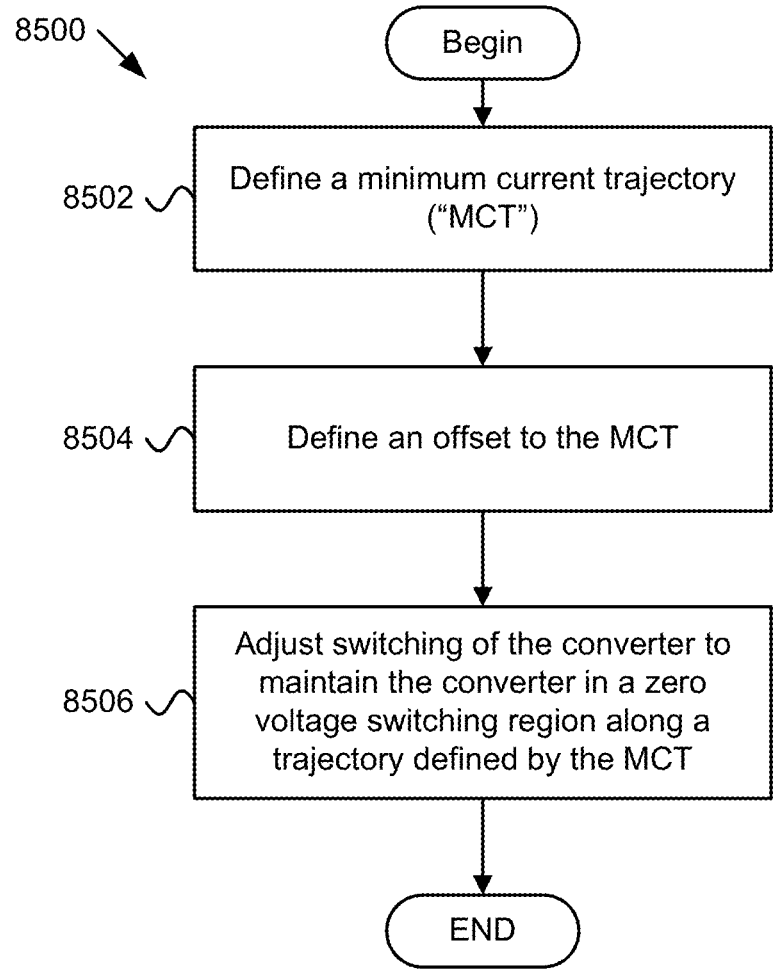
FIG. 85 is a schematic flowchart diagram illustrating an embodiment of a method 8500 for modified MCT control.

FIG. 85 is a schematic flowchart diagram illustrating an embodiment of a method 8500 for modified MCT control. The method 8500 begins by defining 8502 a MCT for operation between a maximum positive power output to a maximum negative power output of the converter 10, where the converter includes a DABSRC 100, 101. The MCT defines a boundary between a ZVS region and a hard switching region. In one embodiment, the MCT region module 8302 defines 8502 the MCT. The method 8500 includes defining 8504 an offset to the MCT, where the offset is in the ZVS region, and adjusting 8506 switching of switches of the converter 10 to maintain operation of the converter in the ZVS region between the maximum positive power output to a maximum negative power output along a trajectory defined by the MCT and the offset, and the method 8500 ends. In one embodiment, the offset module 8304 defines 8304 the offset and the MCT control module 8306 adjusts 8506 switching of the converter 10.

Figure 86:
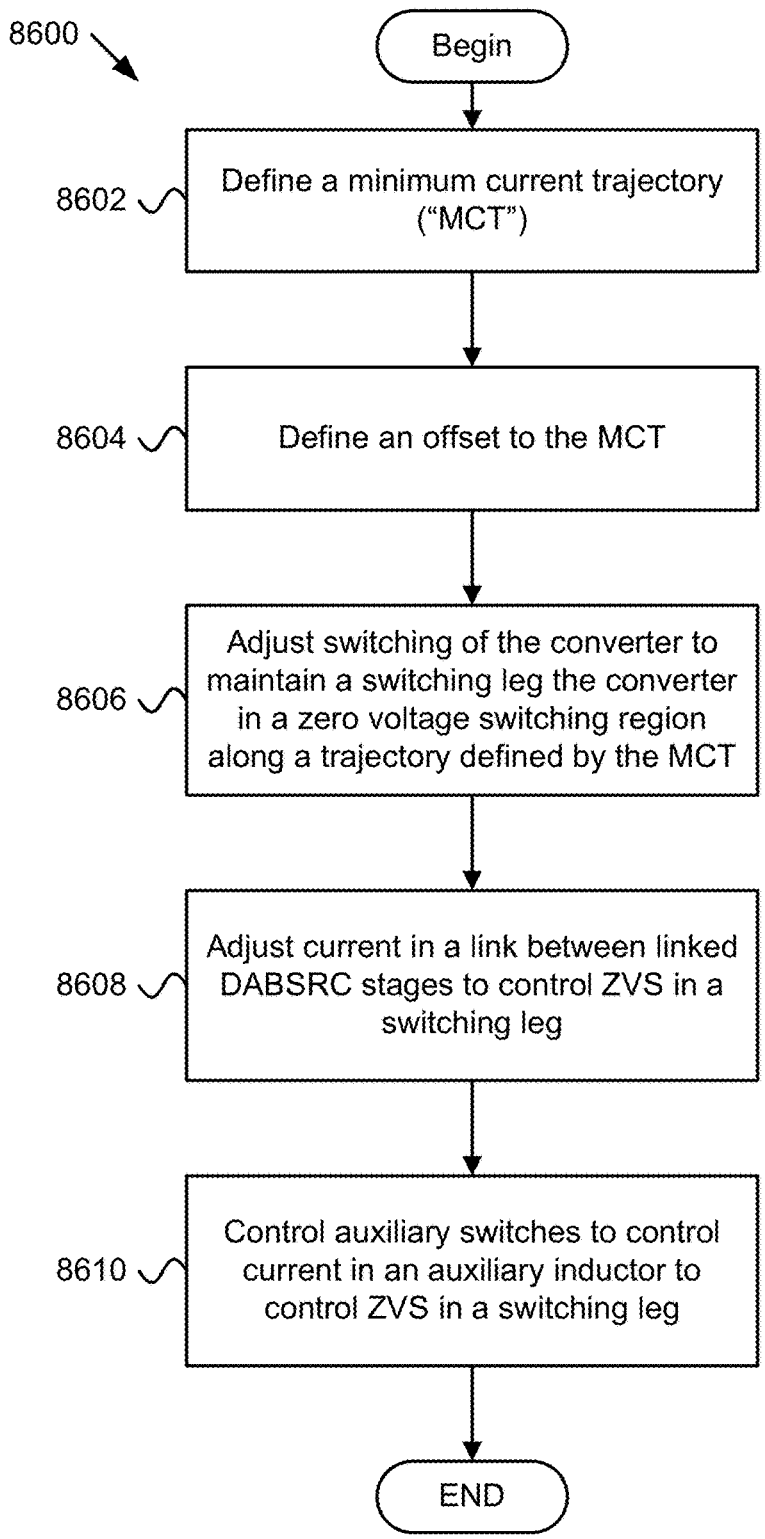
FIG. 86 is a schematic flowchart diagram illustrating another embodiment of a method 8600 for modified MCT control.

FIG. 86 is a schematic flowchart diagram illustrating another embodiment of a method 8600 for modified MCT control. The method 8600 begins by defining 8602 a MCT for operation between a maximum positive power output to a maximum negative power output of the converter 10, where the converter includes a DABSRC 100, 101. The MCT defines a boundary between a ZVS region and a hard switching region. The method 8600 includes defining 8604 an offset to the MCT, where the offset is in the ZVS region, and adjusting 8606 switching of switches of the converter 10 to maintain operation of the converter in the ZVS region between the maximum positive power output to a maximum negative power output along a trajectory defined by the MCT and the offset.

The method 8600 adjusts 8608 current a link between linked DABSRC stages to control ZVS in one or more switching legs. For example, the converter 10 may include linked DABSRC stages as depicted in FIG. 30, which may be controlled as described above in section V.3. The method 8600 may also include controlling 8610 auxiliary switches $Q_1'$, $Q_2'$ to control current in an auxiliary inductor $L_{aux}$ to control ZVS in a switching leg, as described above in section V.2, and the method 8600 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a first auxiliary switch connected to a positive connection of a switching leg of a direct current ("DC") to DC converter, the switching leg comprising a first main switch and a second main switch, the first and second main switches connected at a main switch midpoint;
a second auxiliary switch connected between a negative connection of the switching leg and the first auxiliary switch, wherein a connection point between the first and second auxiliary switches comprises an auxiliary midpoint;
an auxiliary inductor connected between the auxiliary midpoint and the main switch midpoint, the main switch midpoint further connected to elements of the converter in addition to the first and second main switches and the auxiliary inductor, wherein the first and second main power switches turn on and off as part of operation of the converter, the first main switch comprising a first capacitance and the second main switch comprising a second capacitance; and
a switch regulation module that regulates switching of the first and second auxiliary switches to control current in the auxiliary inductor, the auxiliary inductor providing or removing charge from the first capacitance and the second capacitance to adjust voltage across the first main switch and the second main switch to induce zero voltage switching for the first and second main switches, wherein the switch regulation module controls current in the auxiliary inductor by controlling a phase angle between a voltage transition at the auxiliary midpoint and the main switch midpoint, and wherein the switch regulation module controls the phase angle according to the equation:

$$\Phi_N \geq \frac{4\pi f_s L_{aux}}{t_d}\left(2C_N - \frac{\lambda}{V_A}\int_{t_d} i_x(t)dt\right)$$

where
$\Phi_N$ is the phase angle between the voltage transition at the auxiliary midpoint and the main switch midpoint;
$f_s$ is the switching frequency of the converter;
$L_{aux}$ is inductance of the auxiliary inductor;
$t_d$ is a dead time between switching of the first main switch and the second main switch;
$C_N$ is capacitance of one of the first capacitance and the second capacitance;
$V_A$ is voltage of the power source;
$i_x$ (t) is current in the connection between the elements of the converter and the main switch midpoint; and
$\lambda$ is +1 when the first main switch is on and −1 when the second main switch is on.

2. The apparatus of claim 1, wherein the first capacitance comprises one or more of capacitance of the first main switch and a capacitor connected in parallel with the first main switch, and wherein the second capacitance comprises one or more of capacitance of the second main switch and a capacitor connected in parallel with the second main switch.

3. The apparatus of claim 1, further comprising a current sensing module that senses current in the auxiliary inductor and in the connection between the elements of the converter and the main switch midpoint, wherein the switch regulation module uses current sensed by the current sensing module and switching states of the first and second main switches to regulate switching in the first and second auxiliary switches to adjust current in the auxiliary inductor to adjust voltage across the first and second main switches to achieve zero voltage switching.

4. The apparatus of claim 1, wherein the converter comprises a resonant power converter.

5. The apparatus of claim 4, wherein the resonant power converter comprises at least one stage of a dual active bridge series resonant converter ("DABSRC").

6. The apparatus of claim 1, wherein the first and second main switches comprise a first switching leg of a full bridge switching network of the converter, wherein the converter comprises a third main switch connected to the positive connection of a second switching leg and a fourth main switch connected to negative connection of the second switching leg, the first and second switching legs forming a full bridge switching network, and further comprising:
a third auxiliary switch connected to the positive connection of the second switching leg;
a fourth auxiliary switch connected to a negative connection of the second switching leg; and
a second auxiliary inductor connected to a second auxiliary midpoint between the third and fourth auxiliary switches and a second main switch midpoint between the third and fourth main switches, the third main switch comprising a third capacitance and the fourth main switch comprising a fourth capacitance, wherein the switch regulation module regulates switching of the third and fourth auxiliary switches to control current in the second auxiliary inductor, the second auxiliary inductor providing or removing charge from the third capacitance and the fourth capacitance to adjust voltage across the third main switch and the fourth main switch to induce zero voltage switching for the third and fourth main switches.

7. The apparatus of claim 6, wherein the converter comprises a DABSRC converter, wherein the full bridge switching network comprises a first full bridge switching network on a primary side of the converter and further comprising a second full bridge switching network on a secondary side of the converter and wherein each switching leg of the second full bridge switching network comprises two auxiliary switches and an auxiliary inductor controlled by a switch regulation module to achieve zero voltage switching of switches in the second full bridge switching network.

8. The apparatus of claim 1, wherein the switch regulation module operates independent of feedback control loops of the converter.

9. The apparatus of claim 1, further comprising a ZVS activation module that activates switching of the first and second auxiliary switches and the switch regulation module when the converter is in a hard switching condition.

10. The apparatus of claim 1, wherein the converter comprises a DABSRC converter comprising a current feedback loop, wherein the current feedback loop further comprises compensation implemented using a gain scheduled feedback controller, the gain scheduled feedback controller comprising one or more output control signals that vary over a plurality of control regions, the gain scheduled feedback controller implementing a different compensation equation for each control region.

11. The apparatus of claim 10, wherein the converter comprises one or more phase shift modulators controlled by the one or more output control signals, wherein the one or more output control signals control according to a minimum current trajectory ("MCT") control technique, the MCT substantially minimizing circulating current within the converter.

12. The apparatus of claim 10, wherein the gain scheduled feedback controller maintains at least a portion of the main switches of the converter in a zero-voltage switching ("ZVS") region while minimizing circulating current by following a trajectory a fixed distance from an MCT for a portion of operating regions of the converter and the switching regulation module controls auxiliary switches connected to at least a portion of the main switches of the converter to maintain zero voltage switching when the main switches connected to the auxiliary switches operate in a hard switching operating region.

13. A system comprising:
a direct current ("DC") to DC converter comprising one or more switching legs, each switching leg comprising two main switches connected at a main switch midpoint wherein a first main switch of the switching leg is connected between a positive connection of the switching leg and the main switch midpoint and a second main switch of the switching leg is connected between the main switch midpoint and a negative connection of the switching leg, wherein each switching leg comprises a portion of one of a half bridge switching network and a full bridge switching network; and an assisted zero voltage switching ("ZVS") apparatus connected to one or more switching legs of the converter, each ZVS apparatus of a switching leg comprising
a first auxiliary switch connected between an auxiliary midpoint of the switching leg and the positive connection of the switching leg;
a second auxiliary switch connected between the auxiliary midpoint and the negative connection of the switching leg;
an auxiliary inductor connected between the auxiliary midpoint and the main switch midpoint of the switching leg, the main switch midpoint connected to elements of the converter in addition to the first and second main switches of the switching leg, wherein the first and second main power switches turn on and off as part of operation of the converter, the first main switch comprising a first capacitance and the second main switch comprising a second capacitance; and
a switch regulation module that regulates switching of the first and second auxiliary switches to control current in the auxiliary inductor, the auxiliary inductor providing or removing charge from the first capacitance and the second capacitance to adjust voltage across the first main switch of the switching leg and the second main switch of the switching leg to induce zero voltage switching for the first and second main switches, wherein the switch regulation module controls current in the auxiliary inductor by controlling a phase angle between a voltage transition at the auxiliary midpoint and the main switch midpoint, and wherein the switch regulation module controls the phase angle according to the equation:

$$\Phi_N \geq \frac{4\pi f_s L_{aux}}{t_d}\left(2C_N - \frac{\lambda}{V_A}\int_{t_d} i_x(t)dt\right)$$

where
$\Phi_N$ is the phase angle between the voltage transition at the auxiliary midpoint and the main switch midpoint;
$f_s$ is the switching frequency of the converter;
$L_{aux}$ is inductance of the auxiliary inductor;
$t_d$ is a dead time between switching of the first main switch and the second main switch;
$C_N$ is capacitance of one of the first capacitance and the second capacitance;
$V_A$ is voltage of the power source;
$i_x(t)$ is current in the connection between the elements of the converter and the main switch midpoint; and
$\lambda$ is +1 when the first main switch is on and −1 when the second main switch is on.

14. The system of claim 13, further comprising an electronic device powered by the converter.

15. A method comprising:
regulating switching of a first auxiliary switch and a second auxiliary switch to control current in an auxiliary inductor, the auxiliary inductor providing or removing charge from a first capacitance of a first main switch of a switching leg and a second capacitance of a second main switch of the switching leg to adjust voltage across the first main switch and the second main switch to induce zero voltage switching for the first and second main switches, the switching leg comprising a portion of a direct current ("DC") to DC converter, wherein the first and second main power switches turn on and off as part of operation of the converter, wherein
- the first auxiliary switch is connected to a positive connection of the switching leg and to an auxiliary midpoint;
- the second auxiliary switch is connected between the auxiliary midpoint and a negative connection of the switching leg;
- the auxiliary inductor is connected between the auxiliary midpoint and a main switch midpoint, the main switch midpoint comprising a connection between the first main switch and the second main switch, the main switch midpoint connected to elements of the converter in addition to the first and second main switches and the auxiliary inductor and
- controlling current in the auxiliary inductor comprises controlling a phase angle between a voltage transition at the auxiliary midpoint and the main switch midpoint, and wherein the switch regulation module controls the phase angle according to the equation:

$$\Phi_N \geq \frac{4\pi f_s L_{aux}}{t_d}\left(2C_N - \frac{\lambda}{V_A}\int_{t_d} i_x(t)dt\right)$$

where
- $\Phi_N$ is the phase angle between the voltage transition at the auxiliary midpoint and the main switch midpoint;
- $f_s$ is the switching frequency of the converter;
- $L_{aux}$ is inductance of the auxiliary inductor;
- $t_d$ is a dead time between switching of the first main switch and the second main switch;
- $C_N$ is capacitance of one of the first capacitance and the second capacitance;
- $V_A$ is voltage of the power source;
- $i_x(t)$ is current in the connection between the elements of the converter and the main switch midpoint; and
- $\lambda$ is +1 when the first main switch is on and −1 when the second main switch is on.

16. The method of claim 15, further comprising sensing current in the auxiliary inductor and in the connection between the elements of the converter and the main switch midpoint and wherein regulating switching of the first and second auxiliary switches further comprises using the current sensed in the auxiliary inductor and in the connection between the elements of the converter and the main switch midpoint and using switching states of the first and second main switches to regulate switching in the first and second auxiliary switches to adjust current in the auxiliary inductor to adjust voltage across the first and second main switches to achieve zero voltage switching.

17. The method of claim 15, wherein regulating switching of the first and second auxiliary switches further comprises controlling current in the auxiliary inductor by controlling a phase angle between a voltage transition at the auxiliary midpoint and the main switch midpoint.

18. The method of claim 15, wherein the switching leg comprises a first switching leg of the converter and wherein the converter comprises additional switching legs and further comprising regulating switching of first and second auxiliary switches to control current in an auxiliary inductor associated with each additional switching leg to achieve zero voltage switching in the main switches of each additional switching leg.

* * * * *